United States Patent
Al-Herz et al.

(10) Patent No.: US 9,165,297 B2
(45) Date of Patent: Oct. 20, 2015

(54) VIRTUAL ACCOUNT AND TOKEN-BASED DIGITAL CASH PROTOCOLS

(75) Inventors: Ahmed Ibrahim Al-Herz, Dhahran (SA); Lahouari Ghouti, Dhahran (SA); Mohammad K. Ibrahim, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 694 days.

(21) Appl. No.: 13/609,197

(22) Filed: Sep. 10, 2012

(65) Prior Publication Data

US 2014/0074720 A1    Mar. 13, 2014

(51) Int. Cl.
- *G06Q 20/00* (2012.01)
- *G06Q 20/40* (2012.01)
- *G06Q 20/38* (2012.01)
- *H04L 9/32* (2006.01)
- *G06Q 20/02* (2012.01)

(52) U.S. Cl.
CPC ............ *G06Q 20/40* (2013.01); *G06Q 20/02* (2013.01); *G06Q 20/382* (2013.01); *H04L 9/32* (2013.01); *H04L 9/321* (2013.01); *G06Q 20/38215* (2013.01)

(58) Field of Classification Search
None
See application file for complete search history.

(56) References Cited

U.S. PATENT DOCUMENTS

| | | | | |
|---|---|---|---|---|
| 4,914,698 | A * | 4/1990 | Chaum | 380/30 |
| 5,889,862 | A * | 3/1999 | Ohta et al. | 705/69 |
| 6,446,052 | B1 * | 9/2002 | Juels | 705/69 |
| 7,877,331 | B2 * | 1/2011 | Al-Herz et al. | 705/64 |
| 8,160,966 | B2 * | 4/2012 | Al-Herz et al. | 705/67 |
| 2004/0083182 | A1 * | 4/2004 | Moribatake et al. | 705/64 |
| 2008/0243703 | A1 * | 10/2008 | Al-Herz et al. | 705/69 |
| 2009/0048979 | A1 * | 2/2009 | Al-Herz et al. | 705/67 |
| 2009/0182673 | A1 * | 7/2009 | Al-Herz et al. | 705/66 |
| 2009/0210349 | A1 * | 8/2009 | Al-Herz et al. | 705/75 |
| 2011/0099113 | A1 * | 4/2011 | Al-Herz et al. | 705/69 |
| 2011/0191251 | A1 * | 8/2011 | Al-Herz et al. | 705/69 |
| 2011/0302088 | A1 * | 12/2011 | Al-Herz et al. | 705/67 |

OTHER PUBLICATIONS

Lysyanskaya, Anna, Ronald Rivest, Amit Sahai, and Stefan Wolf. "Pseudonym Systems." N.p., Sep. 28, 2004. Web. Aug. 19, 2015. <http://www.princeton.edu/~rblee/ELE572Papers/Fa1104Readings/lrsw.pdf>.*
Androulaki, Elli, Seung Choi, Steven Bellovin, and Tal Malkin. Reputation Systems for Anonymous Networks. Rep. N.p., 2008. Web. Aug. 19, 2015.*

* cited by examiner

*Primary Examiner* — Ryan D Donlon
*Assistant Examiner* — Shacole C Tibljas
(74) *Attorney, Agent, or Firm* — Richard C. Litman

(57) ABSTRACT

The virtual account and token-based digital cash token protocols use a combination of blind digital signatures and pseudonym authentication with at least two pairs of public and private keys. A user has one master pair of private and public keys and many pseudonym pairs of private and public keys. The new protocols combine blind digital signature and pseudonym-based authentication. Blind digital signatures based on the master pair of keys are used to withdraw digital cash from the user's bank account under the user's real identity. A pseudonym pair of keys is used for depositing digital cash with a digital cash issuer. Pseudonym key pairs are used for spending the digital cash. Digital cash includes digital cash tokens in virtual accounts, which can be managed from a user's fixed or mobile computing platform.

4 Claims, 56 Drawing Sheets

Main diagram of the protocol

User Registration Protocol according to the first embodiment

Withdrawal Protocol according to the first embodiment

Withdrawal Digital Cash Token Protocol according to the first embodiment

Payment Protocol according to the first embodiment

User Registration process part1 according to the first embodiment

Withdrawal process part1 according to the first embodiment

Withdrawal process part2 according to the first embodiment

Withdrawal process part3 according to the first embodiment

Payment process part1 according to the first embodiment

Payment process part2 according to the first embodiment

Payment process part3 according to the first embodiment

Payment Protocol according to the second embodiment

Fig. 17 Payment process part1 according to the second embodiment

Payment process part2 according to the second embodiment

Payment process part3 according to the second embodiment

Transferring Protocol according to the third embodiment

Transferring process part1 according to the third embodiment

Transferring process part2 according to the third embodiment

Transferring process part3 according to the third embodiment

Withdrawal process part1 according to the fourth embodiment

Withdrawal process part2 according to the fourth embodiment

Withdrawal process part3 according to the fourth embodiment

Withdrawal process part4 according to the fourth embodiment

Fig. 31 Withdrawal process part5 according to the fourth embodiment

Withdrawal process part6 according to the fourth embodiment

Withdrawal Digital Cash Token Protocol according to the fourth embodiment

Withdrawal Digital Cash Token process part1 according to the fourth embodiment

Withdrawal Digital Cash Token process part2 according to the fourth embodiment

Withdrawal Digital Cash Token process part3 according to the fourth embodiment

Payment Protocol according to the fourth embodiment

Payment process part1 according to the fourth embodiment

Payment process part2 according to the fourth embodiment

Payment process part3 according to the fourth embodiment

Payment process part4 according to the fourth embodiment

Payment Protocol according to the fifth embodiment

Payment process part1 according to the fifth embodiment

Payment process part2 according to the fifth embodiment

Payment process part3 according to the fifth embodiment

Payment process part4 according to the fifth embodiment

Transferring Protocol according to the sixth embodiment

Dividing Digital Cash Token Protocol according to the sixth embodiment

Transferring process part1 according to the sixth embodiment

Transferring process part2 according to the sixth embodiment

Transferring process part3 according to the sixth embodiment

Transferring process part4 according to the sixth embodiment

Transferring process part5 according to the sixth embodiment

Dividing Digital Cash Token process part1 according to the sixth embodiment

Dividing Digital Cash Token process part2 according to the sixth embodiment

Dividing Digital Cash Token process part3 according to the sixth embodiment

VIRTUAL ACCOUNT AND TOKEN-BASED DIGITAL CASH PROTOCOLS

BACKGROUND OF THE INVENTION

1. Field of the Invention

The present invention relates to digital payment methods, and more particularly to digital cash tokens spendable from virtual accounts using secure protocol methods.

2. Description of the Related Art

In the near future, digital cash will come into wider use, and it is expected that people will use the Internet to make digital cash payments for their purchases. Electronic transactions should be convenient, reliable, accurate, and resistant to fraud. Certain electronic transactions also should protect the privacy of payees. For example, a customer purchasing a service from a vendor over a network should be able to pay for the service in an electronic transaction without revealing their identity.

Some schemes using on-line banking may prevent double spending by checking each coin against reuse during the time of payment on-line, rather than detecting double spending afterwards. However, on-line banking is obviously not suitable for micro-payments of the average consumer. Banks are too few compared with the vast number of small cash transactions that would need to be processed if average consumer transactions were to be supported. Processing on-line requests for such transactions will result in banks becoming serious bottlenecks to handle these transactions.

Blind signature systems that use off-line digital cash techniques have high system complexity. In some other conventional techniques, a coin has a data size that is too big to be economically used, since the coin contains a large number of challenge terms to detect cheating. In addition, some techniques also require using complex challenge-response interactions between the payer and payee for each coin spent. Again, such complex schemes are also not suitable for micro payments.

Some systems have implemented digital coins that are both secure (in the bank's interest) and afford a heightened assurance of consumer privacy by providing some anonymity to users with respect to both merchants and banks. Informally, a digital cash scheme is referred to as unconditionally blind or anonymous if the bank that issues a coin is unable to determine, either at the time of withdrawal, or later upon examining circulating or deposited coins, which coin was withdrawn by which user. In an unconditionally blind scheme, the user can withdraw money from the bank, spend it at a merchant, and be confident that when the merchant deposits the money at the bank, the bank will not be able to recognize the money as the same cash given to the user.

However, researchers have observed that unconditional anonymity in payment systems might be exploited to facilitate crimes, like blackmail. In addition, there is a fear that such schemes of unconditional anonymity may be abused to perfect crimes of money laundering and kidnapping because this system can make the flow of cash completely untraceable. This observation has spurred research into the idea of making anonymity in payment systems conditional, and, in particular, revocable by a third party. This notion is referred to as a trustee-based coin tracing.

One trustee-based tracing scheme is based on a blind Schnorr-like signature scheme that involves use of interactive proofs between trustees and the bank. Another trustee-based tracing scheme is based on blind RSA signatures, but makes use of a cut-and-choose protocol that results in a scheme that is flexible. Although this scheme may be somewhat flexible, it has rather large coin sizes and computational requirements.

According to another scheme that makes use of a blind signature, a user requests a pseudonym and registration information from a trustee. The user presents this registration information to the bank, and incorporates the information into the coins that are withdrawn.

Another scheme makes use of blind DSS signatures. In this scheme, signing and anonymity revocation may be conducted by differing quorums of trustees. However, the scheme is implemented on-line only and is rather computationally intensive for most operations.

A slightly different approach to trustee-based tracing is a system based on blind Schnorr signatures in which a user transfers funds from a non-anonymous to an anonymous account, where a trustee is capable of linking the two accounts. The chief disadvantage of this approach is that once the two accounts are linked, anonymity is eliminated.

Another approach is based on blind Schnorr signatures in which the trustee is off-line. This system is complex and involves well over a dozen modular exponentiations by the user at each coin withdrawal. Later developments have reduced the computational load required in the withdrawal protocol, as well as the database search requirements in owner tracing. However, the withdrawal protocol still requires over a dozen modular exponentiations on the part of the user.

The use of blinding alone that protects the anonymity of the customer is not sufficient to safeguard against certain types of fraud. For example, a customer can submit a blinded nonce (a nonce is a piece of data that, for practical purposes, is used only once, for example, a random number) to the certification authority along with $20, receive the blinded certificate, un-blind it, and then submit the un-blinded certificate as being worth $100. This is possible because the certification authority never really sees the actual certificate it is signing because of the blinding factor. Thus, although blinding alone protects privacy, it does not by itself provide adequate reliability against fraud and misuse.

Another problem of a blind signature protocol is that it is a homomorphism, i.e., $Sign(kx)=Sign(k)Sign(x)$. It is possible to create pairs r, Sign(r) for a random message r. More precisely, anyone can choose Sign(r) at random, and then compute r as the function Sign−1, which is known publicly. The basic idea is as follows. Customer C chooses a message x, which is going to be the coin. C also generates a pair, k and Sign(k), for a random number k. C sends the product kx to a bank B, which computes Sign(kx). B then sends Sign(kx) to C, using, for instance, a public encryption scheme provided by C (using some session key exchanged between C and B using a Diffie-Heliman session) or some other form of communication (e.g., delivery on a diskette transported by an armored carrier). C may then compute Sign(x) by dividing Sign (kx) by Sign (k). The pair (x, Sign(x)) is now redeemable by B at a value usually determined by the signature being used, and B cannot recognize C when some payee P presents (x, Sign(x)) (since the knowledge of kx does not allow practical recognition of x nor of Sign(x)).

A problem with this approach is that a signature scheme having such properties is not secure. This scheme provides that (1) it is easy to forge signatures on random messages, and (2) after seeing the signatures on two messages x1 and x2, it is easy to compute the signature on the message x=x1x2. In order to overcome this problem, valid messages are required to have a special "structure" (e.g., the message x must be encoded using the PKCS#1 standard for digital signature). The hope is that messages with this structure are sparse and hard to forge, even given properties (1) and (2) (since messages with that structure will not appear with a significant probability). However, this is simply a hope and is not a proven mathematical property of the signature scheme or of the encoding. The drawback is that it may be possible to discover an algorithm to forge messages, even when we restrict them to this structured sparse set.

Schemes that use virtual accounts have several problems. For example, some virtual accounts do not provide adequate privacy of the user, while others are complex, requiring a blind signature to protect the privacy of the user. Still other schemes have the bank storing an encrypted pseudonym corresponding to the user identification, which makes linking identity to the pseudonym easy, either by cooperation or leakage of the secret key of the issuer. Accordingly, the privacy of all users can be catastrophically destroyed. In addition, there is a problem of proving the ownership of the user identity between the user and the bank.

Thus, a virtual account and token-based digital cash protocols solving the aforementioned problems is desired.

SUMMARY OF THE INVENTION

The virtual account and token-based digital cash protocols use a combination of blind digital signatures and pseudonym authentication having at least two pairs of public and private keys. A user has one master pair of private and public keys and many pseudonym pairs of private and public keys. The new protocols combine the advantages of blind digital signature and pseudonym-based authentication. Blind digital signatures based on the master pair of keys are used to withdraw digital cash from the user's bank account under the user's real identity. A pseudonym pair of keys is used for depositing digital cash with a digital cash issuer. Pseudonym key pairs are used for spending the digital cash. The method comprises a combination of digital cash tokens and virtual accounts. These protocols ensure anonymity when withdrawing digital cash tokens from the user's account under the user's real identity, in addition to providing pseudonym authentication when spending digital cash tokens from pseudonym-identified virtual accounts.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
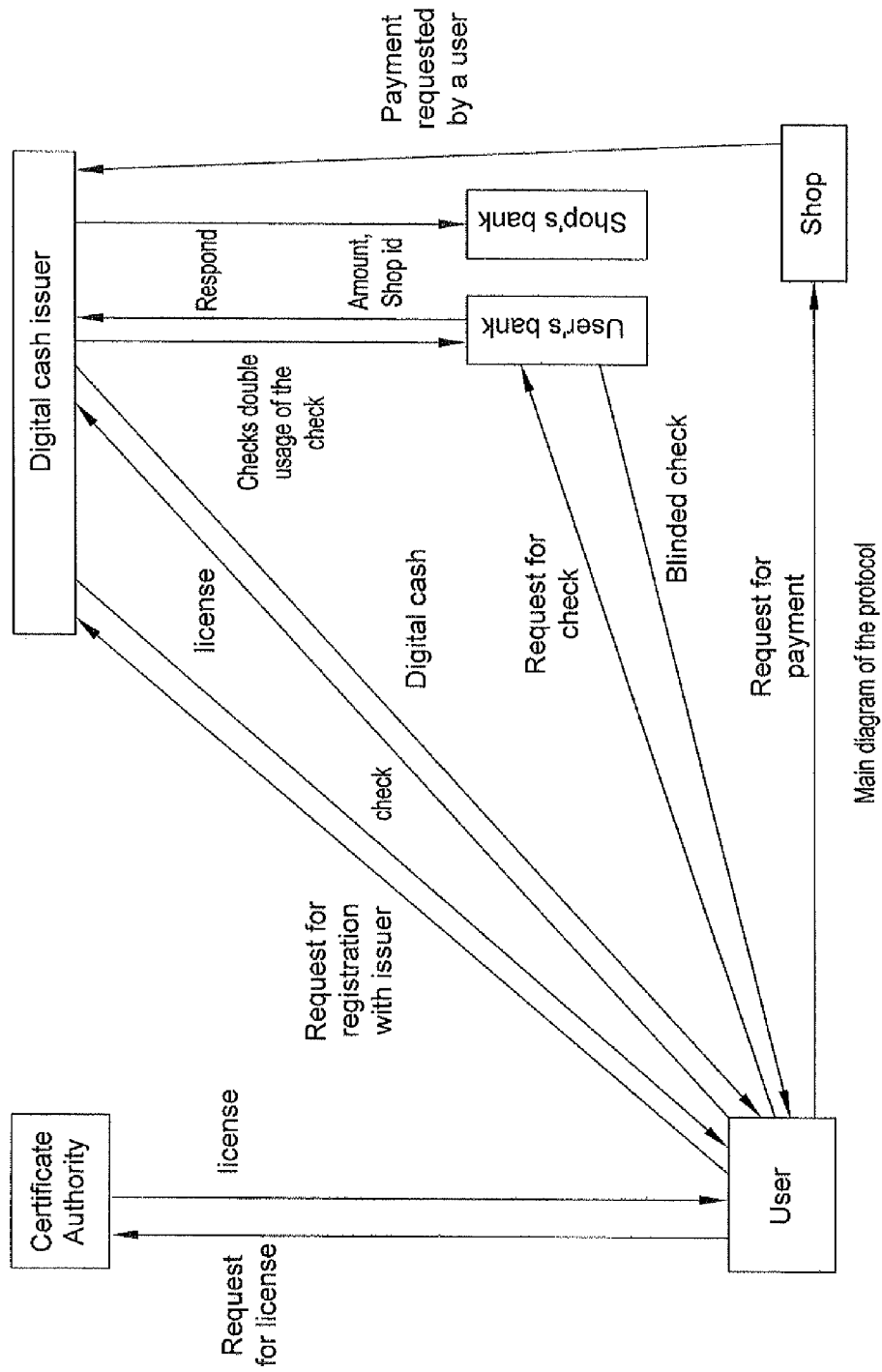
FIG. 1 is an exemplary system diagram for implementing the virtual account and token-based digital cash protocols according to the present invention.

The virtual account and token-based digital cash protocols combine blind digital signature and pseudonym key-based digital cash protocols, wherein a user has one master pair of private and public keys and many pseudonym pairs of private and public keys. The new protocols comprise blind digital signature and pseudonym-based authentication. Blind digital signatures based on the master pair of keys are used for withdrawal of digital cash from the user's bank account under the user's real identity.

A pseudonym pair of keys is used for depositing digital cash with a digital cash issuer. All pseudonyms pair of keys can be used for spending the digital cash. Digital cash in the disclosed protocols are a combination of digital cash tokens as well as virtual accounts.

The protocols combine the advantage of ensuring anonymity when withdrawing digital cash from the user's account under the user's real identity, and the low overhead of pseudonym authentication when spending digital cash under a pseudonym.

Combining blind digital signature and pseudonym keys based digital cash implementation methods provide (i) strong protection of user's privacy (ii) authenticated protocol, (iii) traceability, and (iv) efficiency of computation. The protocols separate withdrawal of digital cash from the user's bank accounts identified with the real identity of the user from depositing and expenditure of digital cash. The protocol methods ensure no link between information about the digital cash withdrawn using the master pair of keys of the user and the digital cash deposited and spent under the pseudonyms of the same user. The protocol method also ensures that there is no link between the different pseudonyms of the same user.

Moreover, the protocols method provides blind digital signature using the user's pair of master keys, thereby allowing authentication of the user with an entity that holds information that is linked to the user's real identity such as a bank. The method allows for the user to use one pair of the pseudonym keys to deposit the withdrawn digital cash with a digital cash issuer and for authenticated expenditure of the digital cash under the user's pseudonym pair of keys. Thus, the method provides no link between the master public key of the user with the pseudonym public keys of the same user, nor a link between the different pseudonym public keys of the same user, and hence there is no link between the real identity of the user and the user's pseudonyms, or between the different pseudonyms of the same user. The only exception is a certificate authority which certifies a pseudonym public key of a user given a user's master public key and id.

The method de-links the information about the user between the user's bank and an issuer of digital cash. The bank stores the user id and the amount of money, and the user's master pubic key as the user account information. The issuer of digital cash can store the user's pseudonym public key and the digital cash either in the form of virtual accounts or tokens which are issued to the user. This separation makes the cooperation very difficult in order to link the real identity of the user with the user's pseudonym pubic key. Any leak of the secret key of the bank or an issuer of digital cash is useless to break the privacy of the user. Since the user's master public key is not linked to digital cash virtual accounts or tokens and is not used for payments, the user's privacy is maintained.

With respect to authentication, the user has one pair of master keys and many pairs of pseudonym keys and where each pubic key is certified by a CA using separate certificates. Blind digital signatures with master keys are used for authentication with the bank, wherein digital signatures with a pair of pseudonym keys is used for authentication with an issuer of digital cash and shops. Also, since all transactions are authenticated using digital signatures, this will prevent anyone from pretending to be someone else by providing information related to the real user.

With respect to traceability, the method ensures traceability by making all transactions with certified public keys, (ii) a CA can link the master public key with a pseudonym public key, and (iii) by keeping records of digital cash virtual accounts and or tokens issued to/spent by a user's pseudonym public key.

The protocols method is efficient, since pseudonym pair of keys, rather than blind signature, is used for authentication during the spending of the digital cash. Efficiency is maintained, since the method avoids using a blind digital signature for authentication, since the blind digital signature has a high authentication overhead.

The disclosed protocols require the following entities: (i) certificate authority, (ii) user's bank, (iii) issuers of digital cash, and (iv) a shop and its bank.

The certificate authority has storage to store a pseudonym public key in correspondence to a user id and/or master public key, issues a license for the pseudonym public key in response to a request which is signed by the master secret key of the user. The certificate authority reveals the identity of the owner of a pseudonym public key if there is any misuse of digital cash or frauds.

The user's Bank holds the user's account with his ID and the certified user's master public key, which is used to authenticate a user.

The issuer of digital cash has a storage space for each registered user which is known under one or more pseudonyms, issues digital cash virtual accounts or tokens, and stores information related to the issued digital cash virtual accounts and tokens. The type of stored information about a digital virtual account or tokens differs depending on whether traceable or untraceable digital cash is being issued.

One possible embodiment is described below where a user opens and credits a virtual account with an issuer and then withdraws digital cash in the form of tokens from the virtual account. A user registers the master public key (mPKU) and pseudonym public keys with a certificate authority, and obtains for each public key a separate certificate that is signed by the certificate authority.

The user sends a certified pseudonym public key (pPKU) with its license to an issuer of digital cash for registration. The issuer of digital cash sends to the user a user's pseudonym public key (pPKU) certificate that is signed by the private key of the issuer of digital cash (SKI) and encrypted by the user's pseudonym public key (pPKU).

Using the public key cryptography and a blind digital signature protocol, the user and the bank cooperate to allow the user to obtain a blinded digital cash voucher with the requested amount after decrementing the user's account.

The user sends the digital cash voucher to a digital cash issuer together under the registered pseudonym pair of keys.

The issuer of digital cash authenticates the digital cash voucher with the bank, and if accepted credits the user's virtual account under the pseudonym with the amount of the voucher.

Information about Digital cash virtual accounts contain the following: (i) digital cash amount added, (ii) pseudonym public key, (iii) together with a digital signature for all information in the digital cash virtual account using the private key of the issuer of digital cash virtual accounts.

The issuer of digital cash encrypts using the user's pseudonym public key the digital cash information, and sends the information to the user pseudonym with digital signature of the information using the public key of the issuer of digital cash.

The user decrypts the information about the digital cash using the user's pseudonym private key and authenticates the information about the digital cash virtual account using the public key of the issuer of digital cash. Information about the digital cash virtual accounts is stored by the user.

When the user requires to withdraw digital cash tokens from a virtual account, the user encrypts using the issuer's public key (i) the user's pseudonym, (ii) amount of requested digital cash in tokens, (iii) digital signature of all the information in (i)-(ii) using the user's pseudonym private key, and sends the encrypted information to the issuer of digital cash.

The issuer of digital cash decrypts using its private key (SKI) (i) the user's pseudonym, (ii) amount of requested digital cash in tokens. The issuer also uses the pseudonym public key to authenticate the user.

The issuer of digital cash encrypts, using the user's pseudonym public key, digital cash tokens and sends the encrypted information to the user. Digital cash tokens contain the following information: (i) digital cash amount, (ii) random number, (iii) identity of issuer, (iv) together with a digital signature for all information in the digital cash token using the private key of the issuer of digital cash tokens.

In cases where a user would like to deposit a digital cash token, even if it is issued from another digital cash issuer, into a virtual account, the user encrypt using the issuer's public key (PKI) (i) user's pseudonym public key, (ii) digital cash tokens, (iii) action to be taken, and (iv) digital signature of all the information in (i)-(iii) using the user's pseudonym private key, and sends the encrypted information to the issuer which holds her virtual account.

Issuer of digital cash decrypts the message using its private key (SKI), the message including (i) user's pseudonym public key, (ii) digital cash tokens, and (iii) action to be taken. The issuer also uses the pseudonym public key to authenticate the user. The issuer digital cash virtual account also authenticates the tokens with the issuer of the digital cash tokens and sends encrypted information to this issuer to this effect. The issuer credits the corresponding user's virtual account.

The issuer of digital cash encrypts, using the user's pseudonym public key, information confirming the credit transaction signed by the private key of the issuer (SKI), and sends the encrypted information to the user. A combination of crediting and withdrawal from a virtual account using digital cash tokens can be used to divide a digital cash token into several smaller tokens.

The following notation is used in the following description: $PK_y$ denotes the public key of the entity y, $Sk_y$ denotes the private key of the entity y, $mPK_y$ and $mSK_y$ denotes the master public and private key of entity y respectively, $pPK_y$ and $pSK_y$ denotes the pseudonym public and private key of entity y respectively, $PK_y(.)$ indicates that the quantity between brackets is encrypted using the public key of entity y, $Sk_y(.)$ indicates that the quantity between brackets is encrypted using the private key of entity y, $[.]SK_y$ indicates that the quantity between square brackets is signed by the private key of entity y. FIG. 1 shows the entities that are involved in the virtual account and token-based new digital cash protocols method and how they relate to each other.

Each of these entities may send and receive data via any number of communications paths. Each entity may include one or more processing devices, such as, for example, a general or special-purpose computer, such as a processor, a microprocessor, a microcomputer, a personal computer ("PC"), a workstation, a mainframe, a server, a laptop, a mobile communications device/phone, a personal digital assistant ("PDA"), an on-board (i.e., vehicle-mounted) computer, or a combination of two or more of these devices capable of responding to, generating, and/or executing instructions in a defined manner. The processing device may include or be associated with any number of other devices, components, and/or peripherals, such as additional computing devices, memory/storage devices, input devices, output devices, user interfaces, and/or communications interfaces.

Each entity also may include one or more software applications including, for example, encryption decryption software, signature generating software, key generating software, random number generating software, signature verification software, in addition to other system and operating system software loaded to command and direct the processing device. Software applications may be implemented as a computer program, a piece of code, an instruction, or some combination thereof, for independently or collectively instructing the processing device to interact and operate as desired.

The applications may be embodied permanently or temporarily in any type of machine, component, physical or virtual equipment, storage medium, or propagated signal wave capable of providing instructions to the processing device. In particular, the applications may be stored on a storage medium or device including volatile and non-volatile (e.g., a read only memory (ROM), a random access memory (RAM), a flash memory, a floppy disk, a hard disk, a tape, a DROM, a flip-flop, a register, an SRAM, DRAM, PROM, EPROM, OPTROM, EEPROM, NOVRAM, or RAMBUS), such that if the storage medium or device is read by the processing device, the specified steps, processes, and/or instructions are performed.

The processing device also may include one or more communications interfaces that allow the processing device to send and receive information using the communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, switches, hubs, repeaters, and storage devices). The one or more networks may include a local area network (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths may include one or more wireless links (e.g., cellular, mobile, GSM, CDMA, TDMA, and satellite) that transmit and receive electromagnetic signals, such as, for example, radio, infrared, and microwave signals, to convey information. Because the communications paths may cover any number of networks and media, generally, they are considered unsecured.

The user may be any entity (person, group, business, government and/or organization) that requires the issuance of digital cash for use a payment to a shop. The certificate authority comprises a storage device, a signature verifying program, an encryption program, a decryption program, and a signature generating program. The user may include a processing device, a storage device, an encryption program, a decryption program, a signature verifying program and a key generating program and a signature generating program.

First Embodiment

Figure 2:
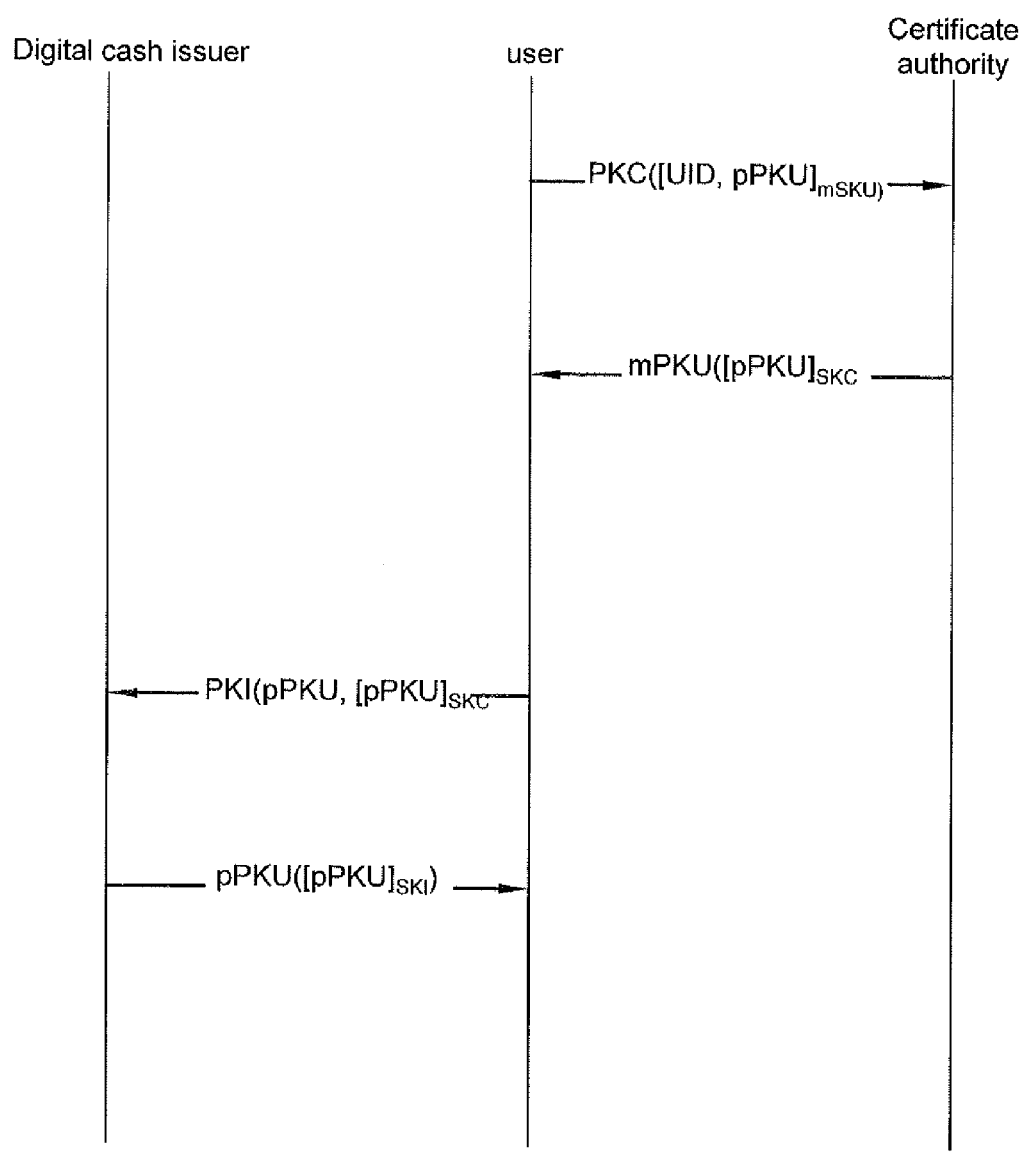
FIG. 2 is an exemplary user registration protocol according to a first embodiment of virtual account and token-based digital cash protocols according to the present invention.

FIG. 2 shows the diagrammatic representation of the registration protocol. The certificate authority comprises, a storage device, signature verifying program, encryption program, decryption program and a signature generating program. The public key PKC is known to all entities. The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities. Additional details regarding signing protocols, digital tokens, blind signatures, identity verification protocols, anonymous amounts associated with random numbers to ensure single use of digital cash, and the like can be found in U.S. Pat. No. 7,877,331, issued on Jan. 25, 2011 to Al-Herz et. al., which is hereby incorporated by reference in its entirety. Moreover, background information regarding digital cash tokens and virtual accounts can be found in U.S. Patent Application No. 20110302088, published on Dec. 8, 2011, which is hereby incorporated by reference in its entirety, and in U.S. Pat. No. 8,160,966, issued on Apr. 17, 2012 to Al-Herz et. al., which is hereby incorporated by reference in its entirety.

Figure 6:
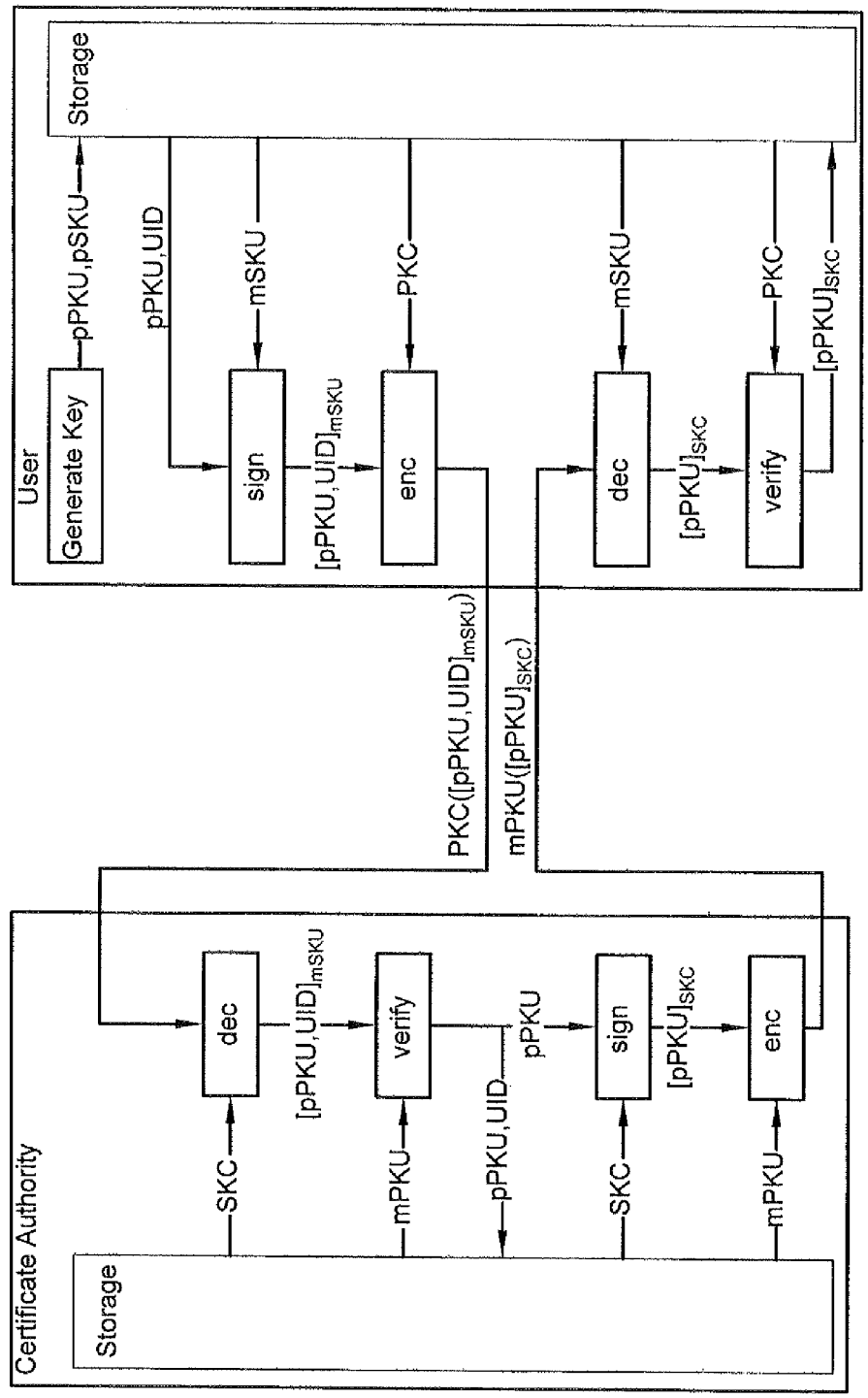
FIG. 6 is an exemplary user registration process, part 1, according to the first embodiment.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU] SKC) then decrypts it by decryption program using the user's master secret key mSKU then verifies the validity of the license [pPKU]SKC by the signature verifying program using the public key of the certificate authority PKC, if it is valid stores the license in the storage device.

Figure 7:
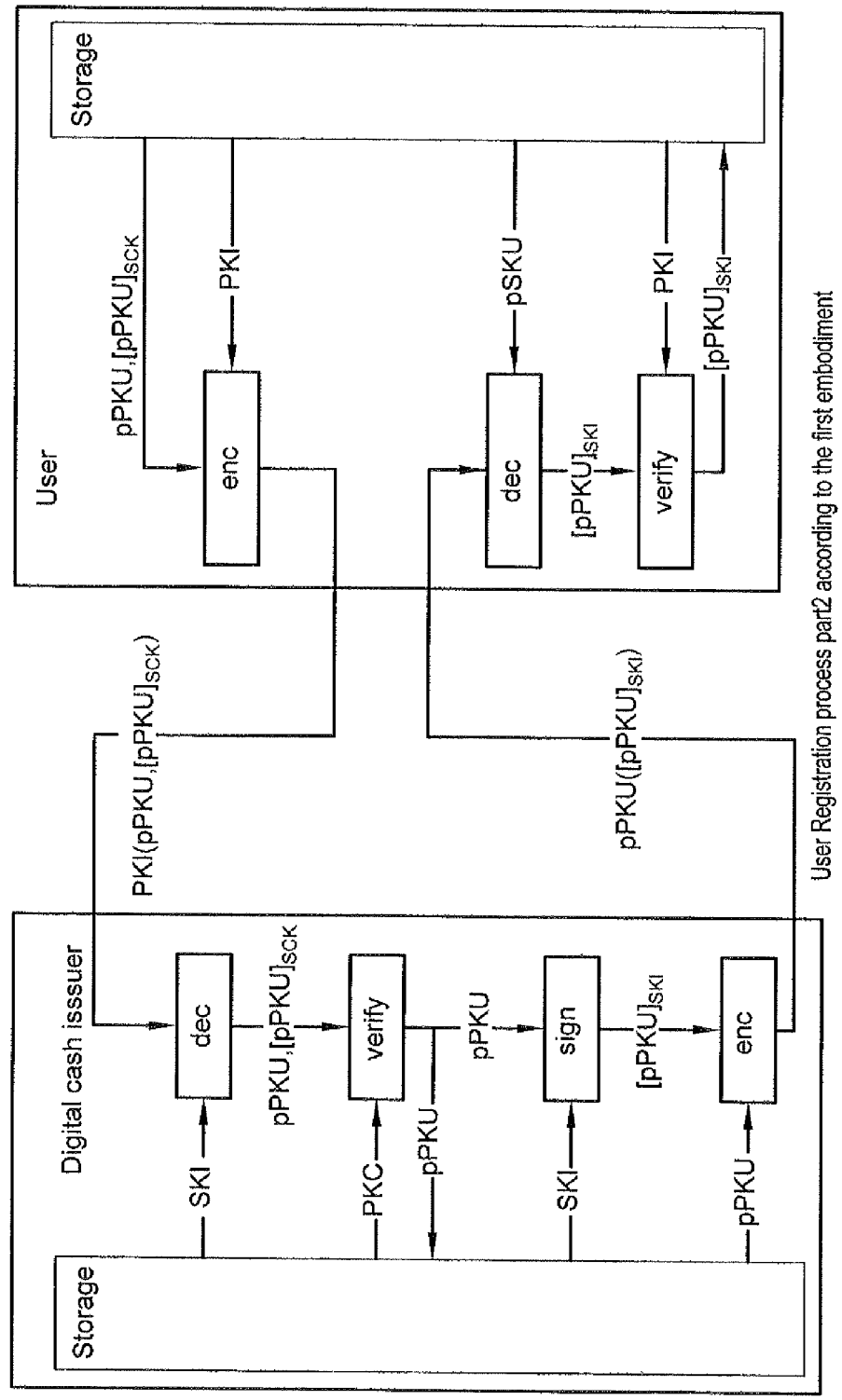
FIG. 7 is an exemplary user registration process, part 2, according to the first embodiment.

Referring to FIG. 7, the user encrypts the license [pPKU] SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU] SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

Figure 3:
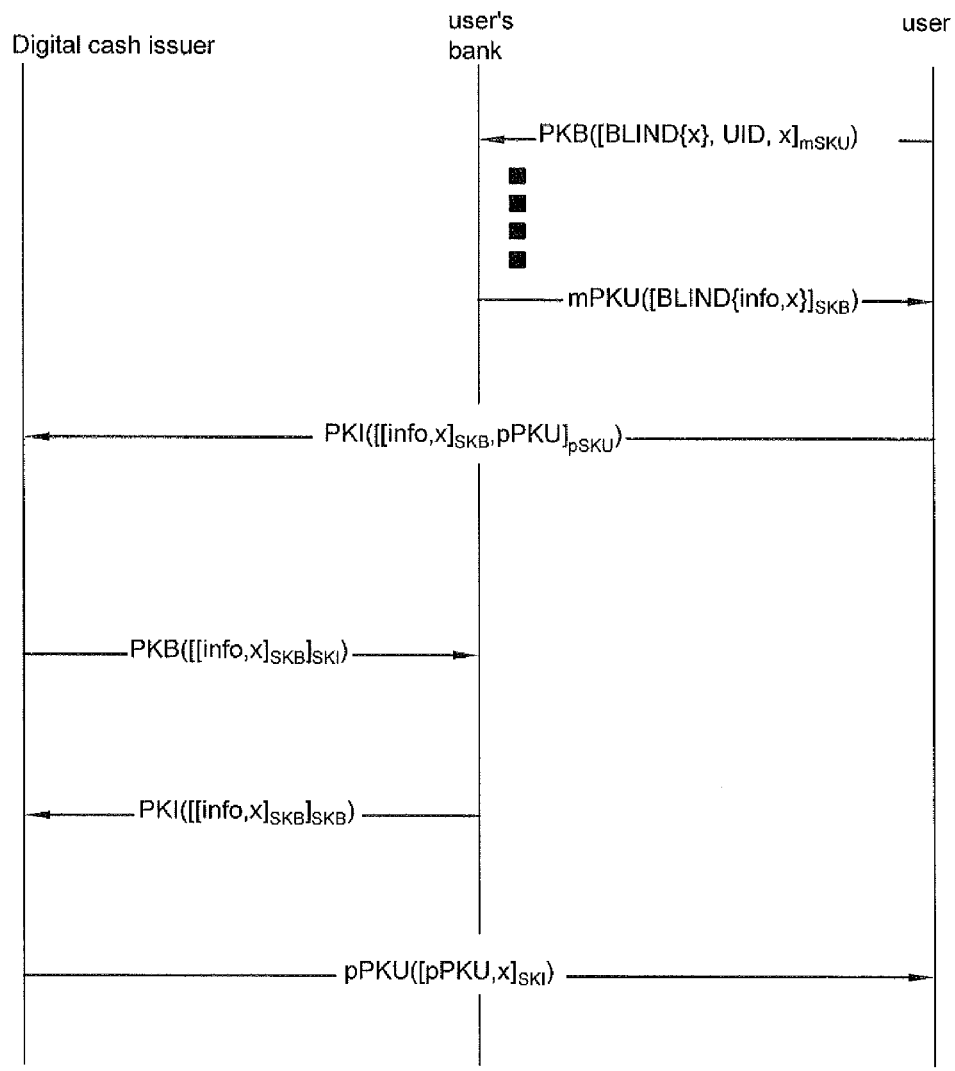
FIG. 3 is an exemplary withdrawal protocol according to the first embodiment.

FIG. 3 shows the diagrammatic representation of the withdrawal protocol. The user's bank comprises a storage device, a signature verifying program encryption program, decryption program and a signature generating program. The bank's public key PKB are known to all entities.

Figure 8:
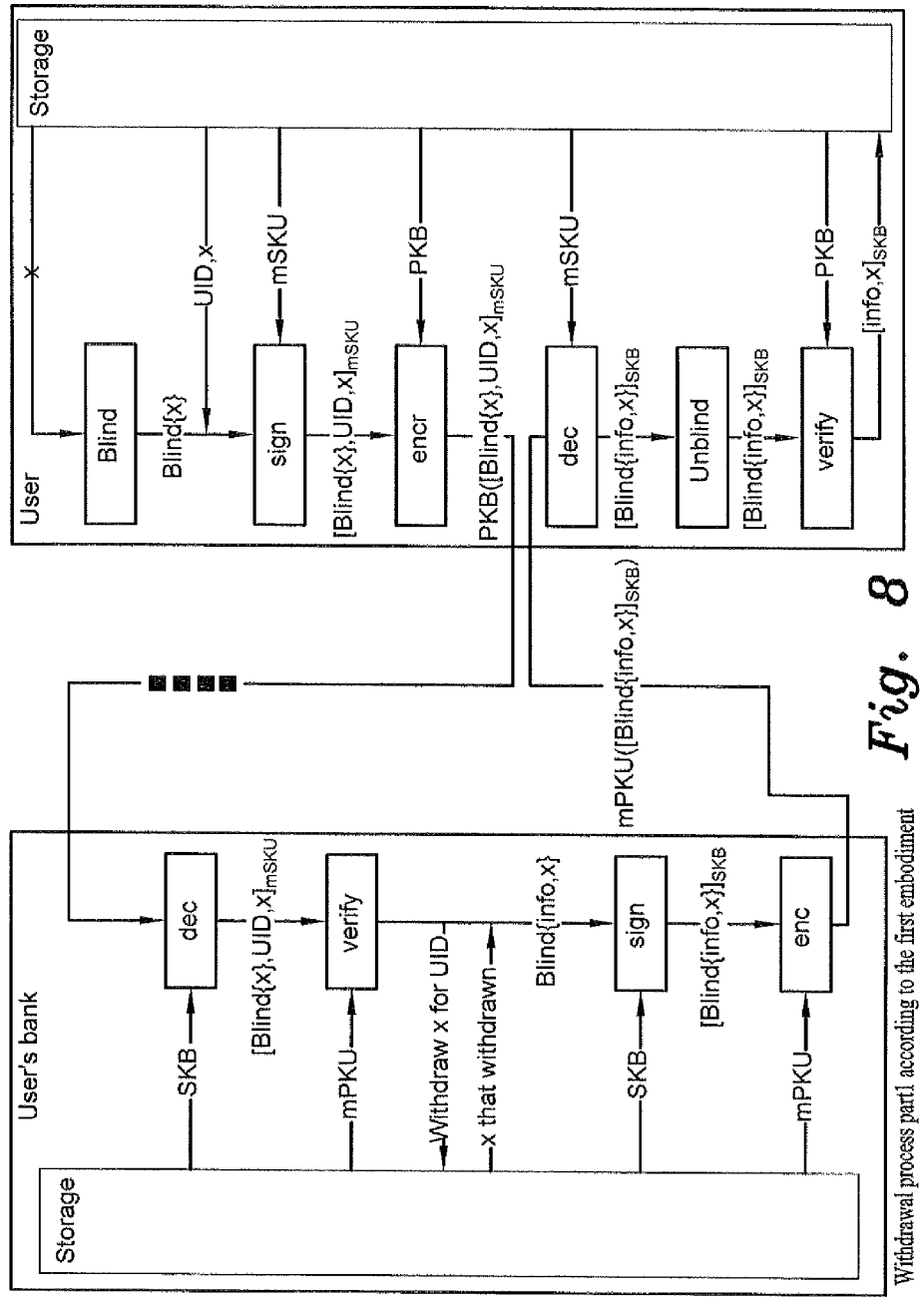
FIG. 8 is an exemplary withdrawal process, part 1, according to the first embodiment.

Referring to FIG. 8, the user blinds the amount of digital cash x using any proposed blinding signature scheme, then signs the blinded amount of digital cash Blind {x}, the user real identification UID, the amount of money to be withdrawn x, by the signature generating program using the user's master secret key mSKU and encrypts the information by encryption program using the public key of the user's bank PKB then sends PKB([Blind{x},UID,x]mSKU) to the user's bank.

The user's bank decrypts PKB([Blind{x},UID,x]mSKU) by decryption program using the user's bank's secret key SKB and verifies the validity of the signature for authentication by the signature verifying program using the master public key of the user mPKU, if it is valid withdraw the amount of money x from the user account and signs the blinded information and the amount of digital cash amount Blind(info,x), which is created by the cooperation between the user's bank and the user using any proposed blind signature scheme, by the signature generating program using the bank's secret key SKB, then encrypts [Blind{info,x}]SKB by encryption program using the master public key of the user mPKU then sends mPKU([BLIND{info,x}]SKB) to the user.

The user receives mPKU([BLIND{info,x}]SKB) and decrypts it by decryption program using the user's master secret key mSKU, then unblind the signed blinded information and the amount of digital cash using any proposed blind signature scheme, then the user verifies the validity of the bank's signature by signature verifying program using the public key of the user's bank PKB if it is valid the user stores the signed information and the amount of digital cash [info, x]SKB as a check in the storage device.

Figure 9:
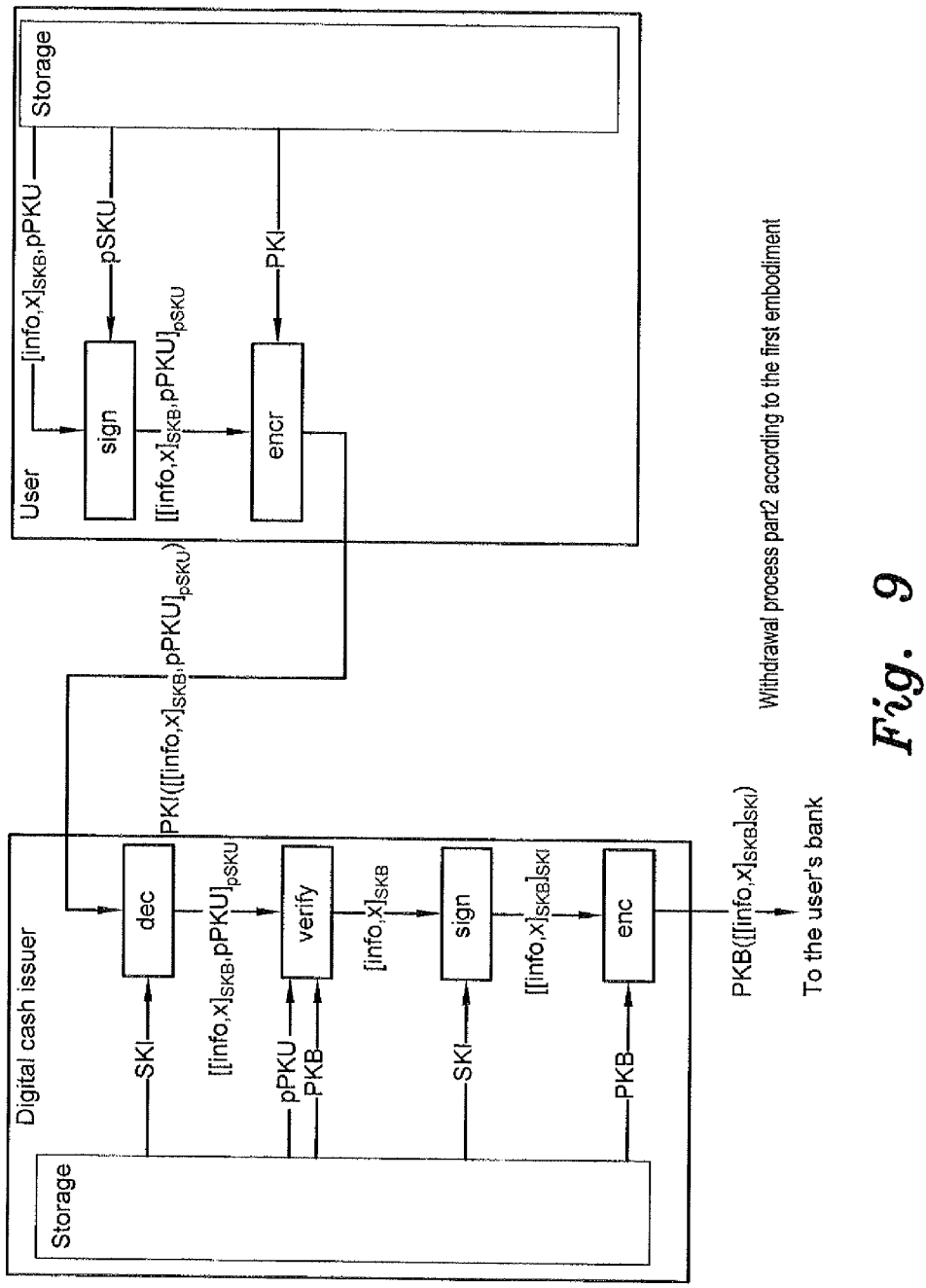
FIG. 9 is an exemplary withdrawal process, part 2, according to the first embodiment.

Referring to FIG. 9, the user signs the check [info,x]SKB and the user's pseudonym public key pPKU by signature generating program using the user's pseudonym secret key pSKU, and then encrypts [[info,x]SKB,pPKU]pSKU by encryption program using the digital cash issuer's public key PKI and send PKI([[info,x]SKB,pPKU]pSKU) to the digital cash issuer.

The digital cash issuer receives PKI([[info,x]SKB,pPKU]pSKU), then decrypts the information by decryption program using the digital cash issuer's secret key SKI and verities the signature of the user, for authentication, by signature verifying program using the user's pseudonym public key pPKU if it is valid the digital cash issuer verifies the signature of the bank [info,x]SKB by signature generating program using the public key of the user's bank PKB if it valid, the digital cash issuer sign the check [info,x]SKB by signature generating program using the digital cash issuer's secret key SKI and encrypts [[info,x]SKB]SKI by encryption program using the public key of the user's bank PKB then sends PKB([[info,x]SKB]SKI) to the user's bank.

Figure 10:
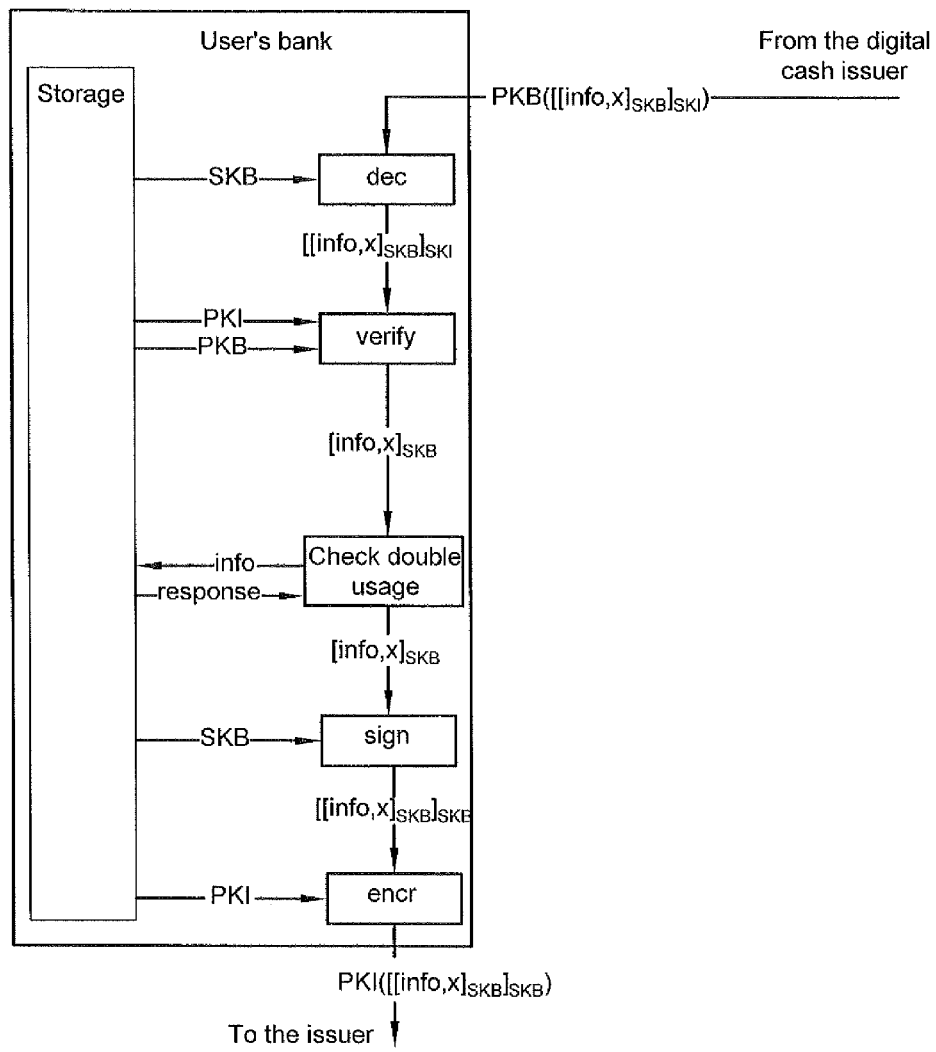
FIG. 10 is an exemplary withdrawal process, part 3, according to the first embodiment.

Referring to FIG. 10, the user's bank receives PKB([[info,x]SKB]SKI) and decrypts the information by decryption program using the secret key of the user's bank, then verifies the signature of the digital cash issuer signature by signature verifying program using the digital cash issuer's public key PKI if it is valid verifies the signature of the user's bank by signature verifying program using the public key of the user's bank if it is valid, the bank checks if the check [info,x]SKB was used if it was not used the user's bank stores the check in the storage device and signs the check [info,x]SKB by signature generating program using the secret key of the user's bank SKB then encrypts [[info,x]SKB]SKB by encryption program using the digital cash issuer's public key PKI then sends PKI([[info,x]SKB]SKB) to the digital cash issuer.

Figure 11:
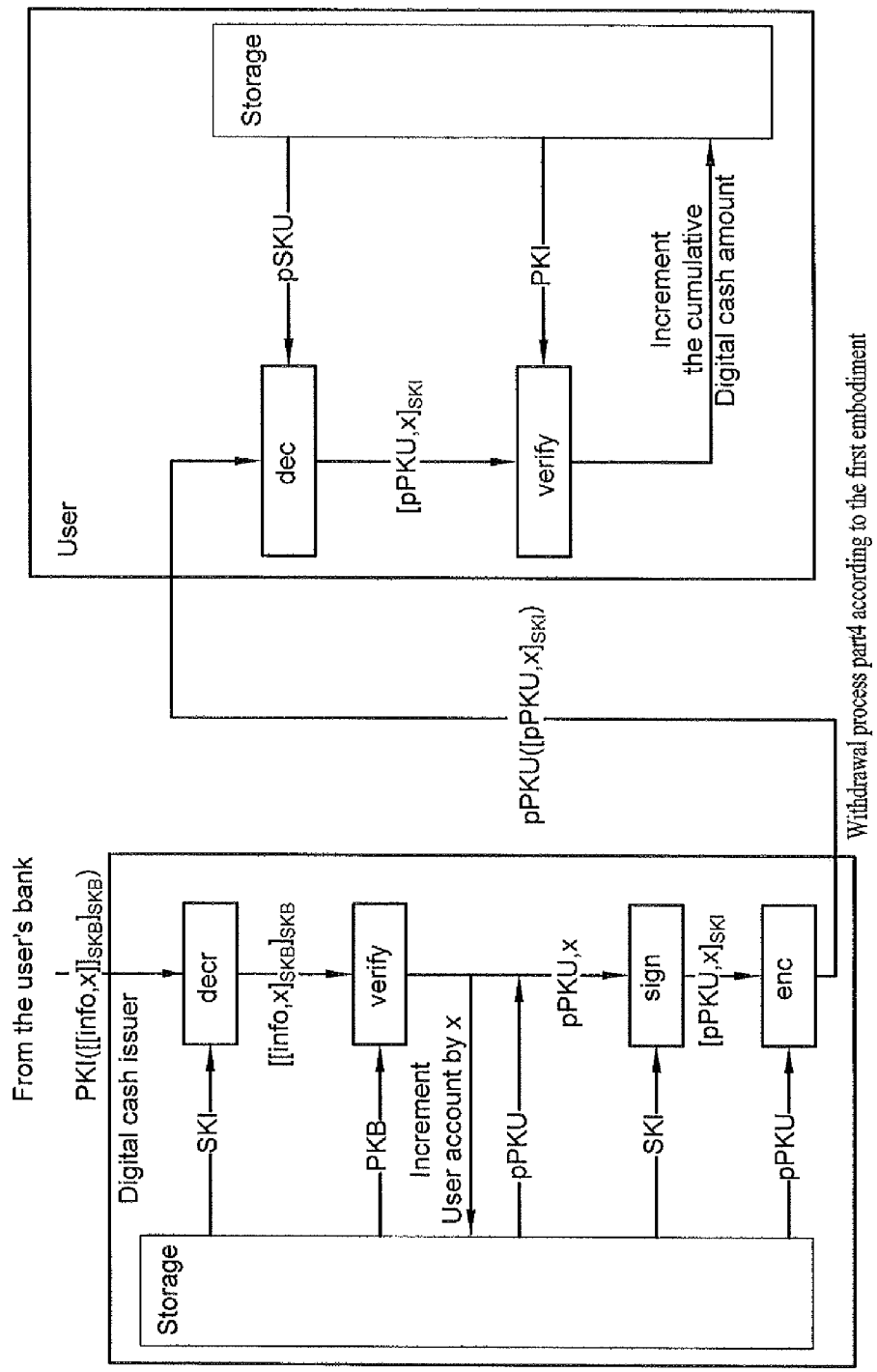
FIG. 11 is an exemplary withdrawal process, part 4, according to the first embodiment.

Referring to FIG. 11, the digital cash issuer receives PKI ([[info,x]SKB]SKB) and decrypts the information by decryption program using the digital cash issuer's secret key SKI, then verify the signature of the user's bank twice if they are valid, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then sends pPKU([pPKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

Figure 4:
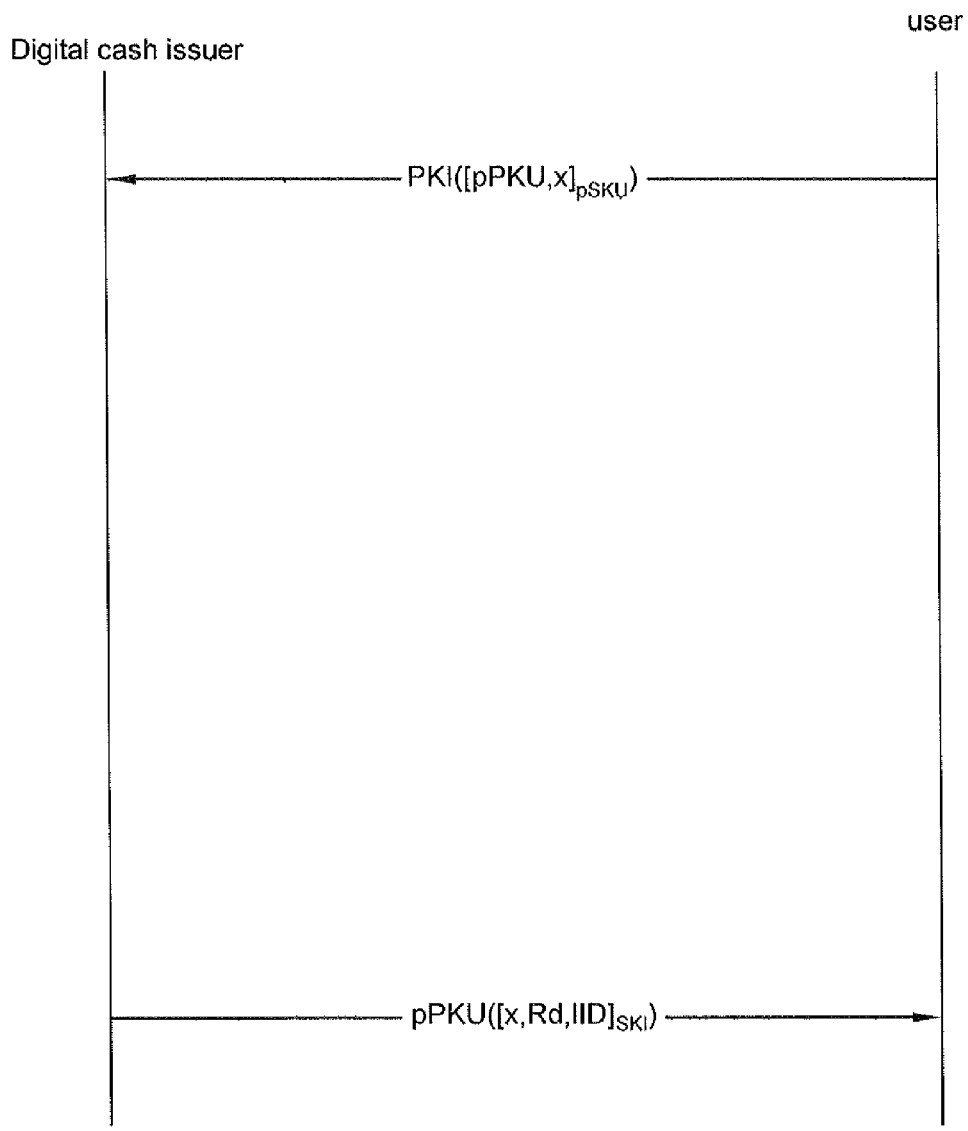
FIG. 4 is an exemplary digital cash token protocol according to the first embodiment.
Figure 12:
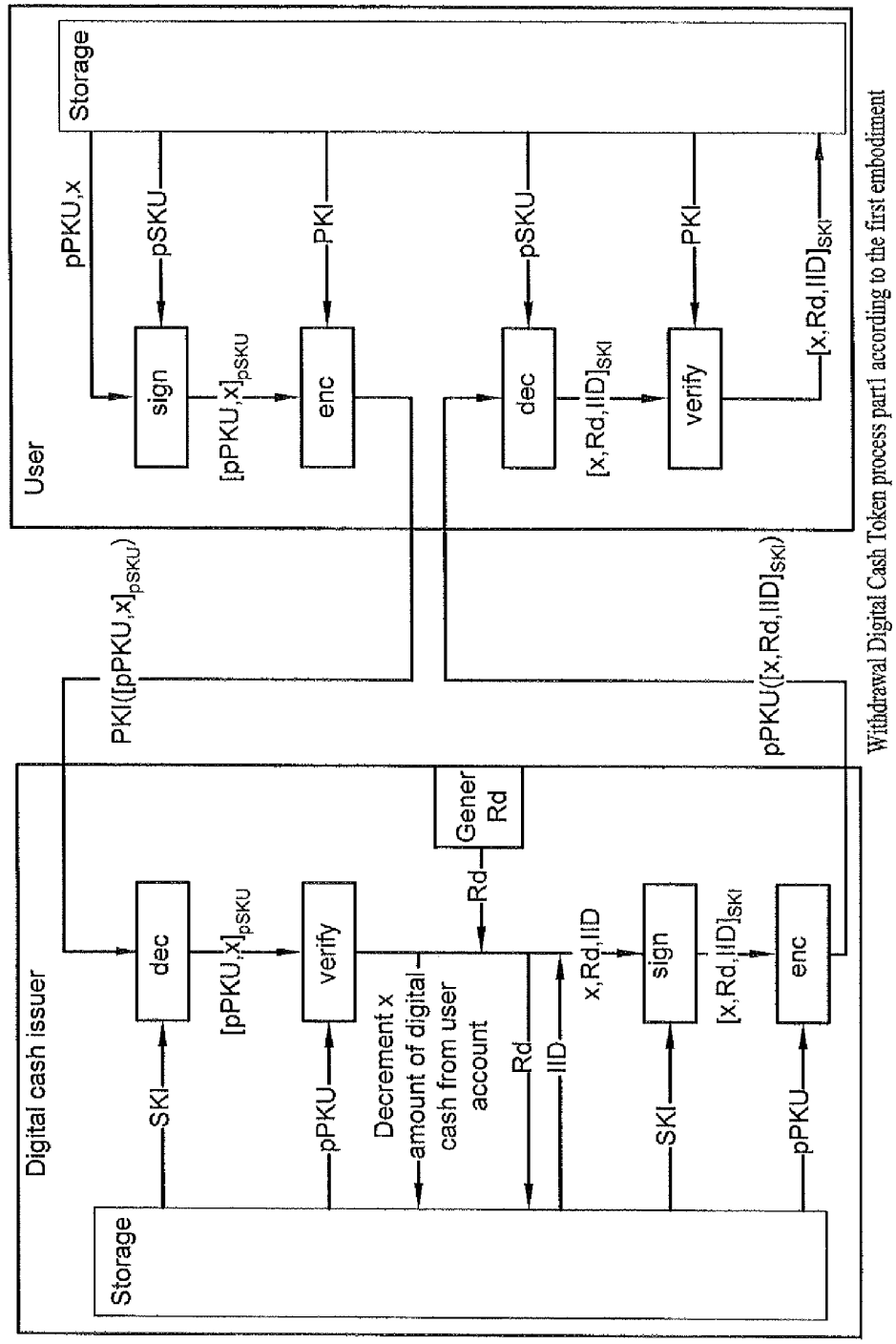
FIG. 12 is an exemplary withdrawal digital cash token process, part 1, according to the first embodiment.

FIG. 4 shows the diagrammatic representation of the digital cash token withdrawal protocol. Referring to FIG. 12, the user signs the user's pseudonym public key pPKU and the amount of digital cash x by the signature generating program using the user's pseudonym secret key pSKU, then encrypts the signed user's pseudonym public key and the amount of digital cash [pPKU,x]pSKU by encryption program using the digital cash issuer's public key PKI, and then sends PKI ([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU to authenticate the user. If it is valid, the digital cash issuer issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU, then decrements the user's virtual account by x then sends pPKU([x,Rd,IID]SKI) to the user.

The user receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user stores the digital cash token [x,Rd,IID]SKI and the cumulative amount of digital cash is decremented by the amount of the digital cash token x, then stores the new cumulative amount of digital cash in the storage device by the user.

Figure 5:
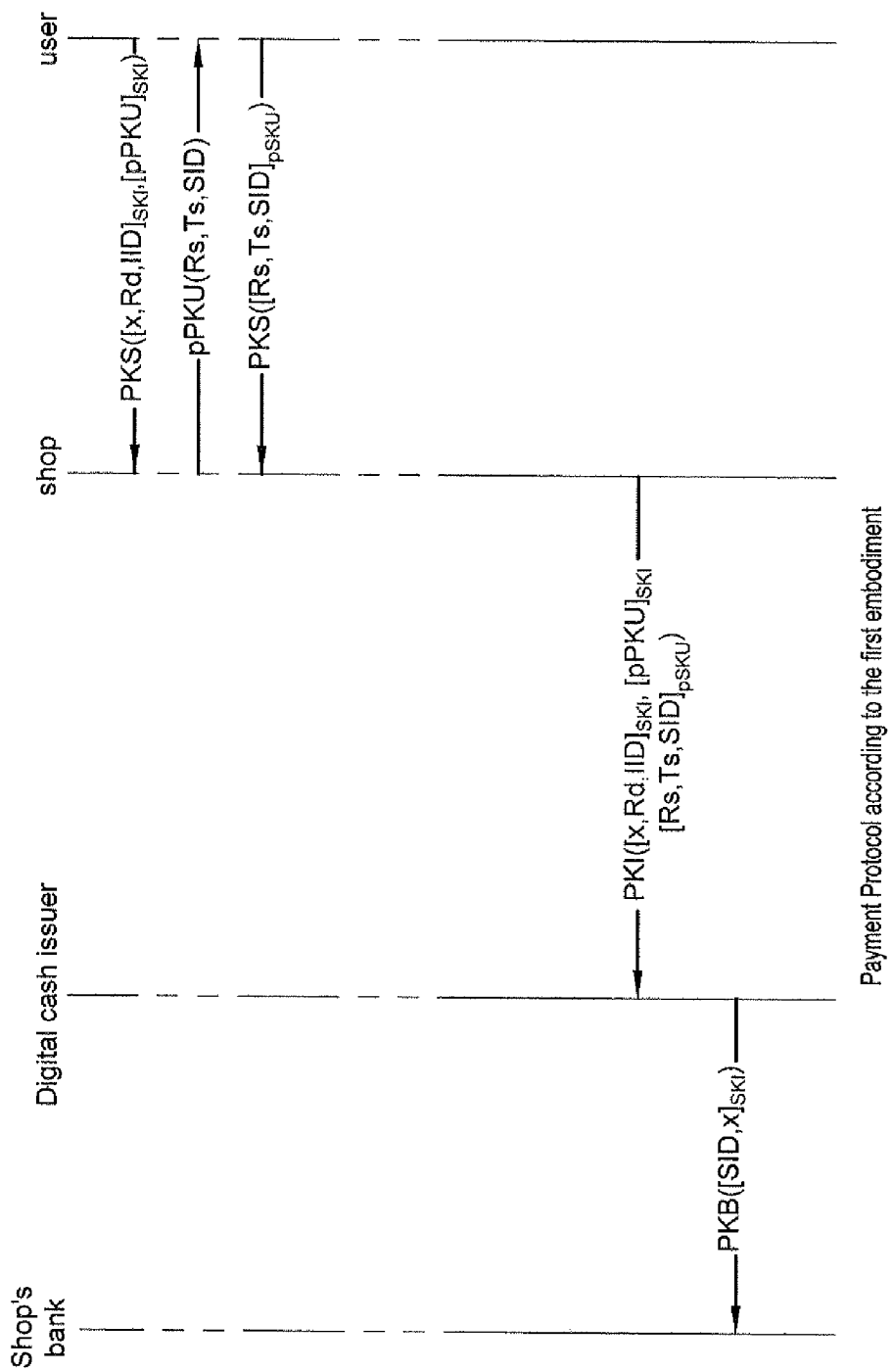
FIG. 5 is an exemplary payment protocol according to the first embodiment.

FIG. 5 shows the diagrammatic representation of the payment protocol. The shop comprises a storage device, a signature verifying program encryption program, decryption program, a signature generating program, a random number generating program and a time generating program the shop public key PKS is known to all entities.

Figure 13:
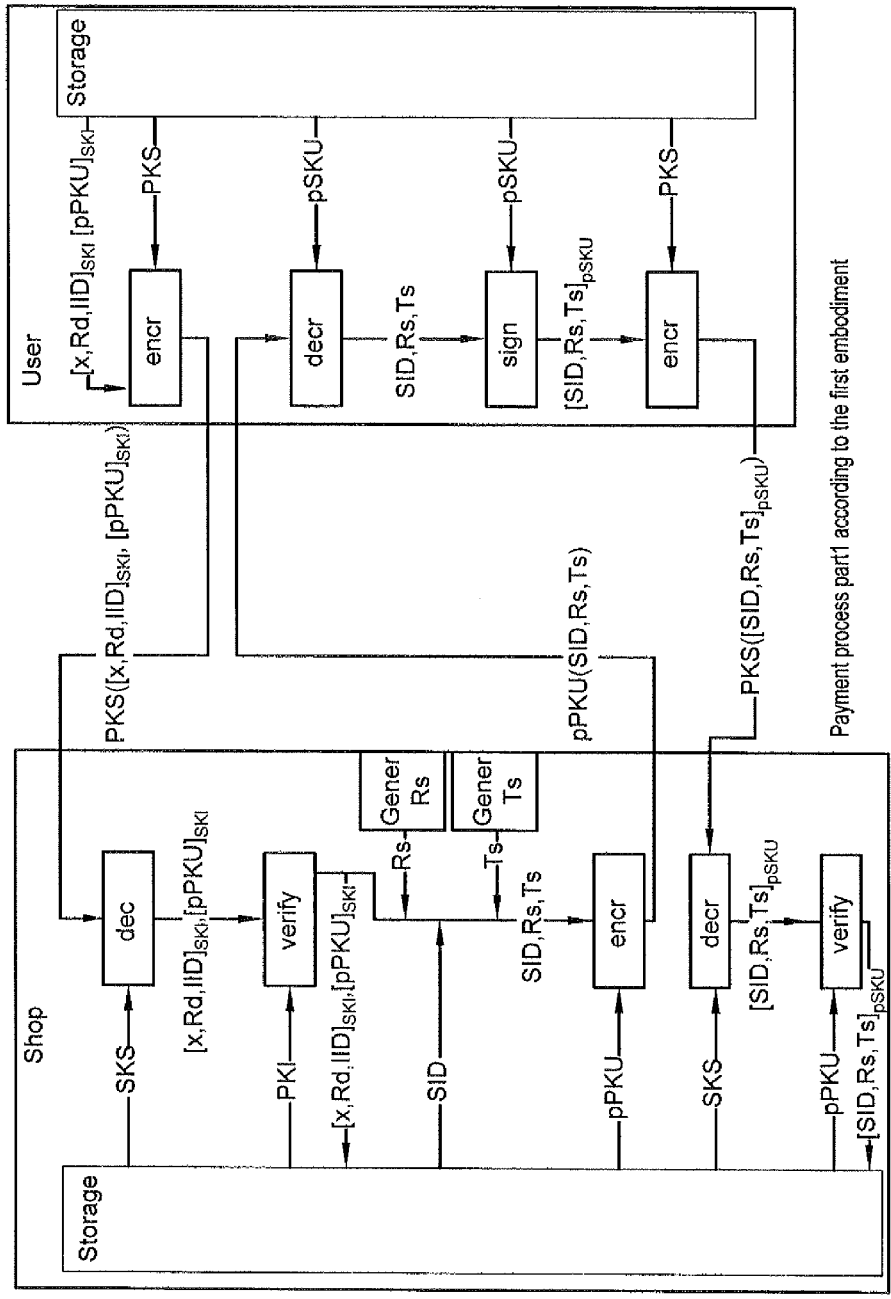
FIG. 13 is an exemplary payment process, part 1, according to the first embodiment.

Referring to FIG. 13, the user encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, and the shop identification SID by encryption program using the user's pseudonym public key pPKU and sends pPKU(Rs,Ts,SID) to the user.

The user receives pPKU(Rs,Ts,SID) and decrypts it by decryption program using the user's pseudonym secret key pSKU and signs the random number Rs, the time Ts, and the shop identification SID by signature generating program using the user's pseudonym secret key pSKU and encrypts the information by encryption program using the public key of the shop PKS then sends PKS([Rs,Ts,SID]pSKU) to the shop.

The shop receives the information PKS([Rs,Ts,SID] pSKU) and decrypts it by decryption program using the shop's secret key SKS and verifies the signature by signature verifying program using the user's pseudonym public key pPKU if it is valid the shop stores the challenge and the shop regards the payment as valid.

Figure 14:
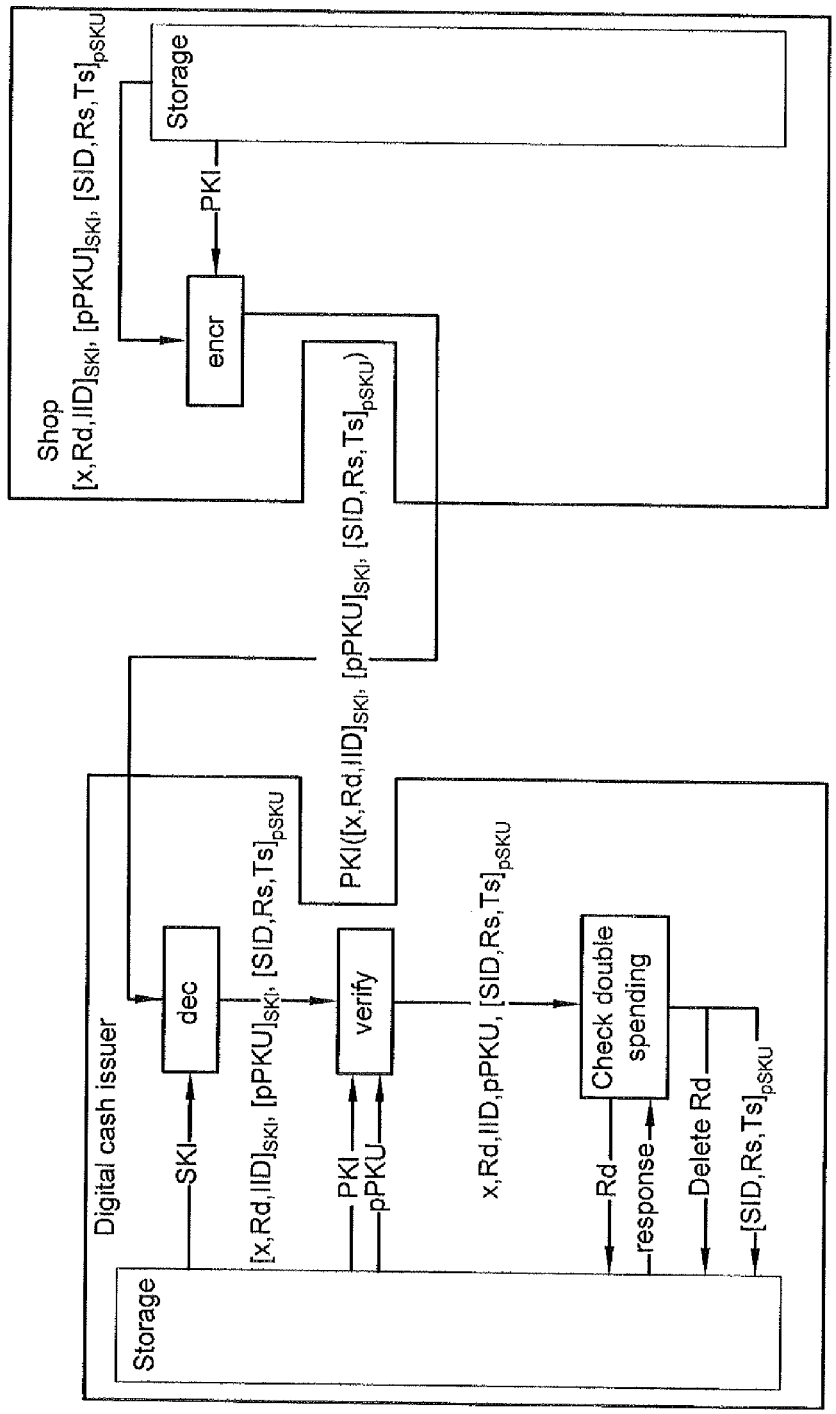
FIG. 14 is an exemplary payment process, part 2, according to the first embodiment.

Referring to FIG. 14, after a period of time, the shop encrypts the information that contains the challenge that was signed by the user [Rs,Ts,SID]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by x then the digital cash issuer stores the challenge [Rs,Ts,SID]pSKU in the storage device.

Figure 15:
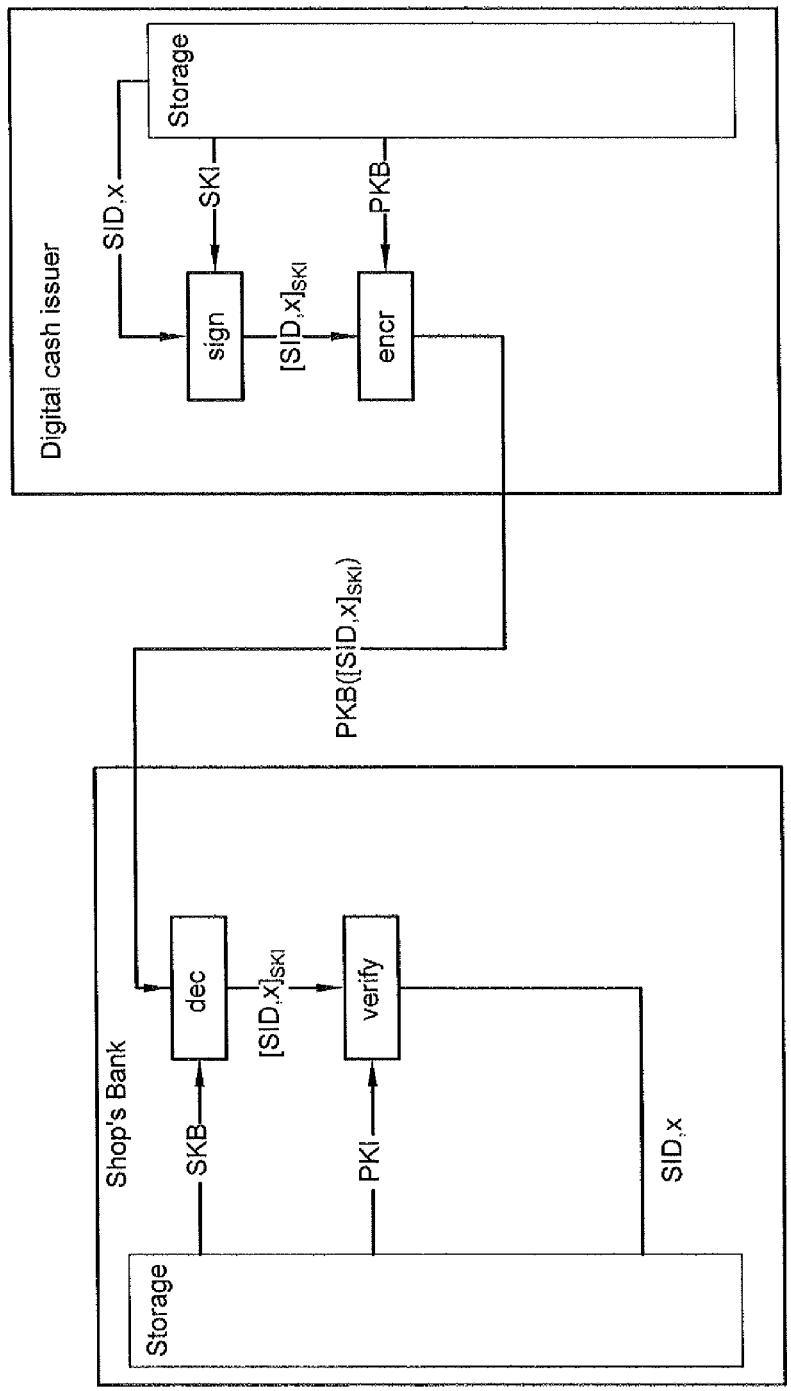
FIG. 15 is an exemplary payment process, part 3, according to the first embodiment.

Referring to FIG. 15, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Second Embodiment

The previous embodiment assumes that the price of goods is equal to the value of the digital cash token. To add more flexibility, the second embodiment allows the user to spend a digital cash token that has a value more than the price of goods. The digital cash issuer can then credit the difference in the user's virtual account.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU] SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU] SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU] SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

FIG. 3 shows the diagrammatic representation of the withdrawal protocol. The user's bank comprises a storage device, a signature verifying program encryption program, decryption program and a signature generating program. The bank's public key PKB are known to all entities.

Referring to FIG. 8, the user blinds the amount of digital cash x using any proposed blinding signature scheme then signs the blinded amount of digital cash Blind{x}, the user real identification UID, the amount of money to be withdrawn x, by the signature generating program using the user's master secret key mSKU and encrypts the information by encryption program using the public key of the user's bank PKB then sends PKB([Blind{x},UID,x]mSKU) to the user's bank.

The user's bank decrypts PKB([Blind{x},UID,x]mSKU) by decryption program using the user's bank's secret key SKB and verifies the validity of the signature for authentication by the signature verifying program using the master public key of the user mPKU, if it is valid withdraw the amount of money x from the user account and signs the blinded information and the amount of digital cash amount Blind(info,x), which is created by the cooperation between the user's bank and the user using any proposed blind signature scheme, by the signature generating program using the bank's secret key SKB, then encrypts [Blind{info,x}]SKB by encryption program using the master public key of the user mPKU then sends mPKU([BLIND{info,x}]SKB) to the user.

The user receives mPKU([BLIND{info,x}]SKB) and decrypts it by decryption program using the user's master secret key mSKU, then unblind the signed blinded information and the amount of digital cash using any proposed blind signature scheme, then the user verifies the validity of the bank's signature by signature verifying program using the public key of the user's bank PKB if it is valid the user stores the signed information and the amount of digital cash [info, x]SKB as a check in the storage device.

Referring to FIG. 9, the user signs the check [info,x]SKB and the user's pseudonym public key pPKU by signature generating program using the user's pseudonym secret key pSKU and then encrypts [[info,x]SKB,pPKU]pSKU by encryption program using the digital cash issuer's public key PKI and send PKI([[info,x]SKB,pPKU]pSKU) to the digital cash issuer.

The digital cash issuer receives PKI([[info,x]SKB,pPKU]pSKU), then decrypts the information by decryption program using the digital cash issuer's secret key SKI and verifies the signature of the user, for authentication, by signature verifying program using the user's pseudonym public key pPKU if it is valid the digital cash issuer verifies the signature of the bank [info,x]SKB by signature generating program using the public key of the user's bank PKB if it valid, the digital cash issuer sign the check [info,x]SKB by signature generating program using the digital cash issuer's secret key SKI and encrypts [[info,x]SKB]SKI by encryption program using the public key of the user's bank PKB then sends PKB([[info,x]SKB]SKI) to the user's bank.

Referring to FIG. 10, the user's bank receives PKB([[info,x]SKB]SKI) and decrypts the information by decryption program using the secret key of the user's bank then verifies the signature of the digital cash issuer signature by signature verifying program using the digital cash issuer's public key PKI if it is valid verifies the signature of the user's bank by signature verifying program using the public key of the user's bank if it is valid, the bank checks if the check [info,x]SKB was used if it was not used the user's bank stores the check in the storage device and signs the check [info,x]SKB by signature generating program using the secret key of the user's bank SKB then encrypts [[info,x]SKB]SKB by encryption program using the digital cash issuer's public key PKI then sends PKI([[info,x]SKF]SKB) to the digital cash issuer.

Referring to FIG. 11, the digital cash issuer receives PKI [[info,x]SKB]SKB) and decrypts the information by decryption program using the digital cash issuer's secret key SKI then verify the signature of the user's bank twice if they are valid, the digital cash issuer increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then sends pPKU([pPKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol. Referring to FIG. 12, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI ([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program Using the digital cash issuer's secret key SKI and encrypts the information by encryption program using the user's pseudonym public key pPKU then decrements the user's virtual account by x then sends pPKU([x, Rd,IID]SKI) to the user.

The user receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user stores the digital cash token [x,Rd,IID]SKI and the cumulative amount of digital cash is decremented by the amount of the digital cash token x then stores the new cumulative amount of digital cash in the storage device by the user.

Figure 16:
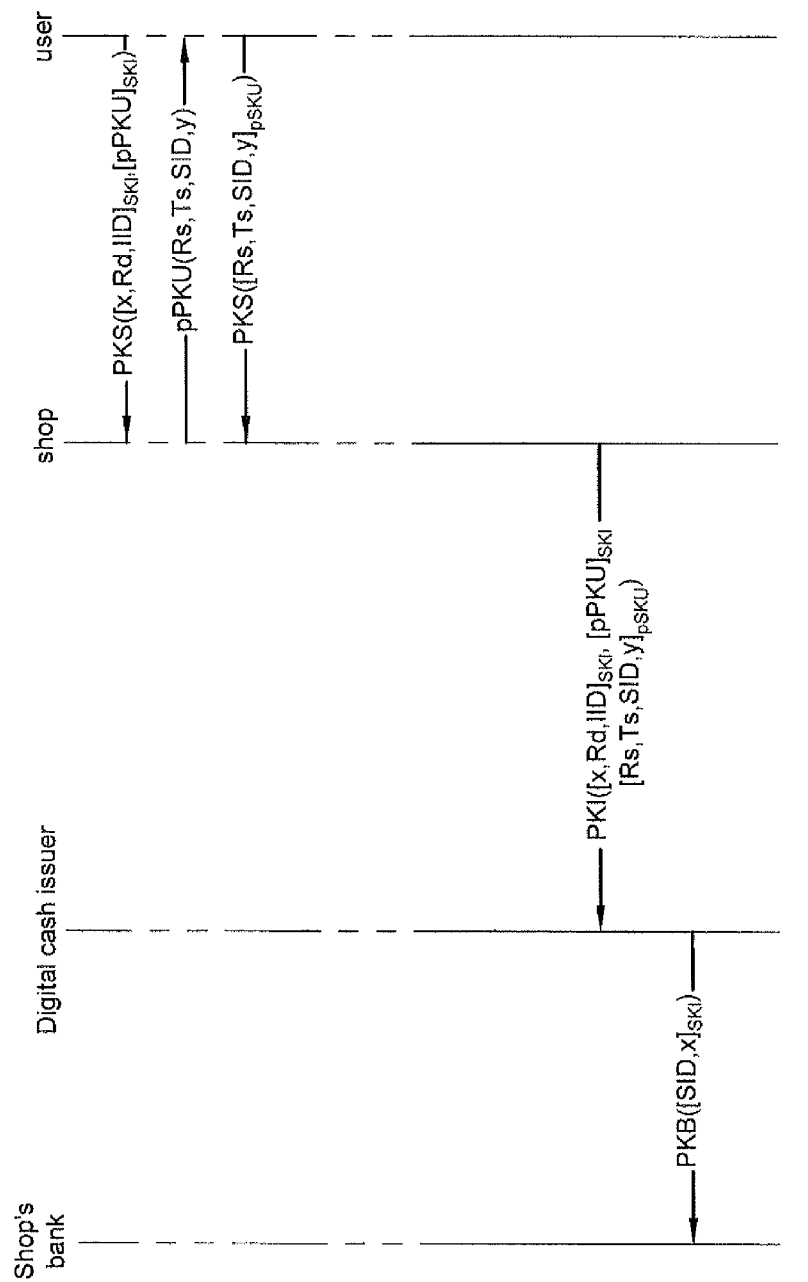
FIG. 16 is an exemplary payment protocol according to a second embodiment of virtual account and token-based digital cash protocols according to the present invention.

FIG. 16 shows the diagrammatic representation of the payment protocol. The shop comprises a storage device, a signature verifying program encryption program, decryption program, a signature generating program, a random number generating program and a time generating program the shop public key PKS is known to all entities.

Figure 17:
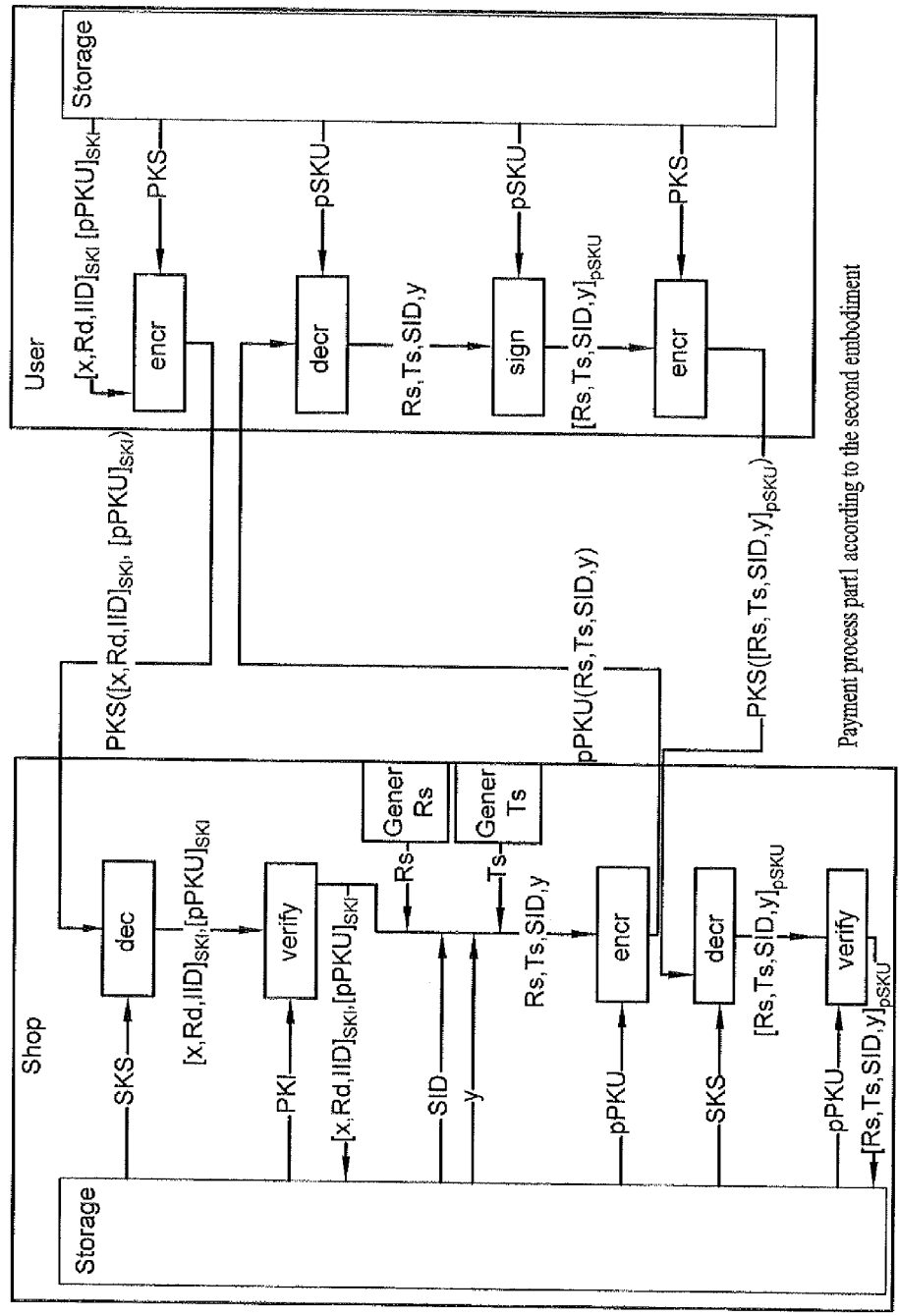
FIG. 17 is an exemplary payment process, part 1, according to the second embodiment.

Referring to FIG. 17, the user encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, the shop identification SID and the price of the good y by encryption program using the user's pseudonym public key pPKU and sends pPKU(Rs,Ts,SID,y) to the user.

The user receives pPKU(Rs,Ts,SID,y) and decrypts it by decryption program using the user's pseudonym secret key pSKU and signs the random number Rs, the time Ts, the shop identification SID and the price of the good y by signature generating program using the user's pseudonym secret key pSKU and encrypts the information by encryption program using the public key of the shop PKS then sends PKS([Rs,Ts,SID,y]pSKU) to the shop.

The shop receives the information PKS([Rs,Ts,SID,u]pSKU) and decrypts it by decryption program using the shop's secret key SKS and verifies the signature by signature verifying program using the user's pseudonym public key pPKU if it is valid the shop stores the challenge and the shop regards the payment as valid.

Figure 18:
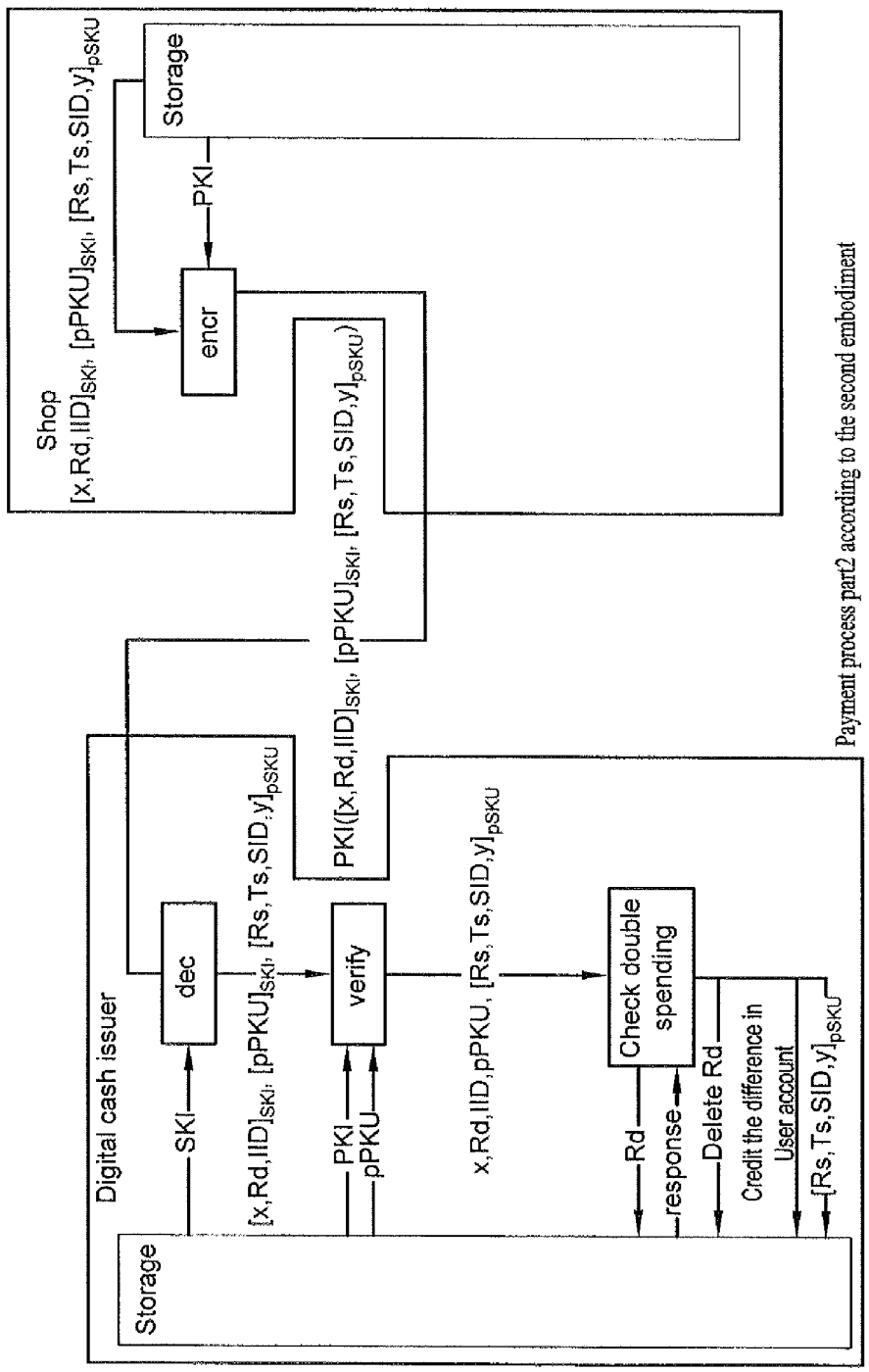
FIG. 18 is an exemplary payment process, part 2, according to the second embodiment.

Referring to FIG. 18, after a period of time, the shop encrypts the information that contains the challenge that was signed by the user [Rs,Ts,SID,y]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID,y]pSKU, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU in the storage device.

Figure 19:
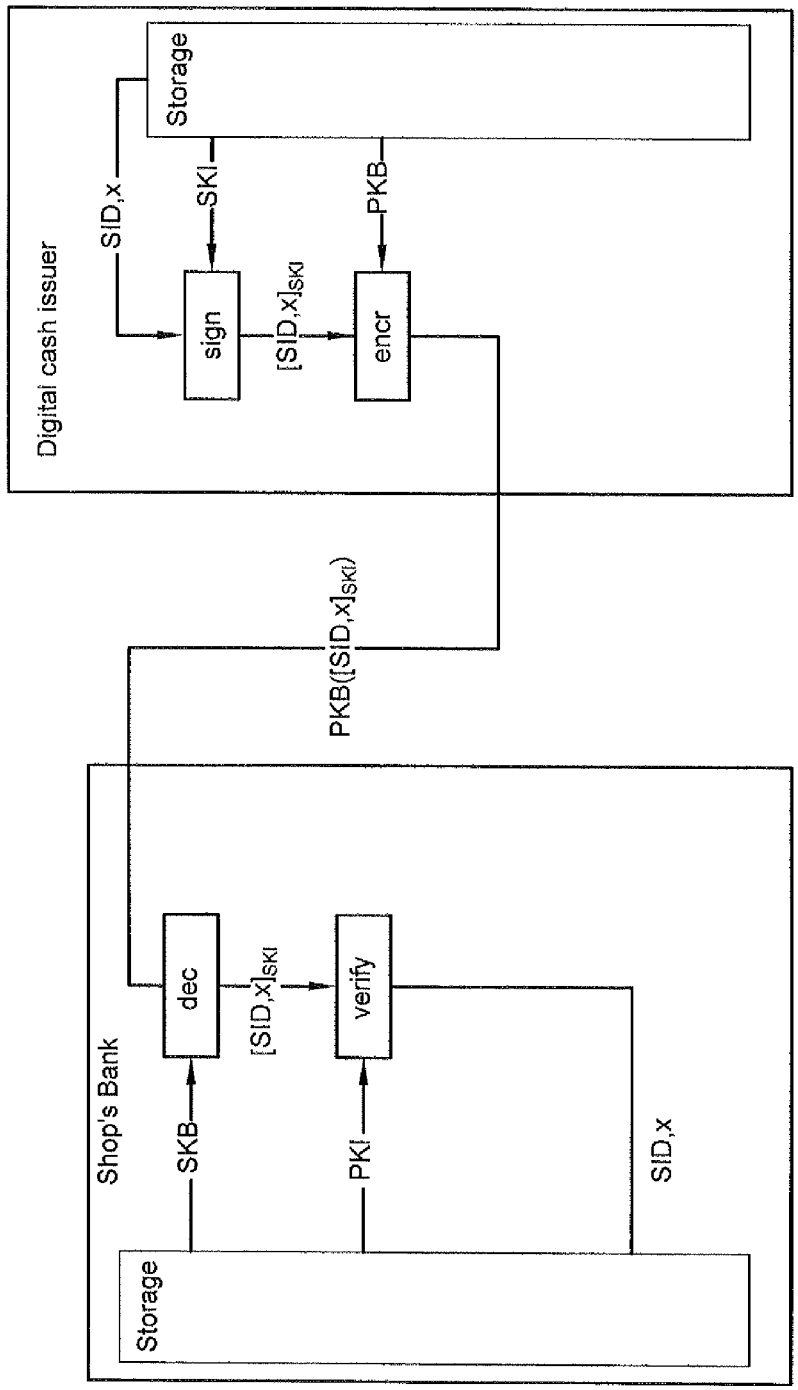
FIG. 19 is an exemplary payment process, part 3, according to the second embodiment.

Referring to FIG. 19, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Third Embodiment

To add more flexibility, in the third embodiment, the user can transfer digital cash between two virtual accounts opened by different digital cash issuers divide a digital cash token to smaller tokens as needed.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer1 and the issuer2 comprises a storage device, an encryption program, a decryption program, a signature generating program, a signature verifying program, and a random number generating program. The public key PKI1 and PKI2 is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU1]mSKU by encryption program using the public key of the certificate authority and sends PKC([UID,pPKU1]mSKU) to the certificate authority as a request for certified pseudonym public key (a request for the issuance of a license).

The certificate authority receives the request (PKC([UID,pPKU1]mSKU)) then decrypts it by decryption program using the secret key of the certificate authority SKC and verifies the validity of the user signature by the signature verifying program using the user's master public key mPKU. If it is valid the certificate authority generates a signature (license) [pPKU1]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU1]SKC by encryption program using the user's master public key mPKU then sends mPKU([pPKU1]SKC) to the user.

The user receives the encrypted license mPKU([pPKU1]SKC) then decrypts it by decryption program using the user's master secret key mSKU then verifies the validity of the license [pPKU1]SKC by the signature verifying program using the public key of the certificate authority PKC, if it is valid stores the license in the storage device.

Referring to FIG. 7, the user encrypts the license [pPKU1]SKC, pseudonym public key pPKU1 by the encryption program using the public key of the digital cash issuer1 PKI1 then sends PKI1([pPKU1]SKC,pPKU1) to the digital cash issuer1 as a request for registration in the digital cash issuer1 and for the digital cash issuer license.

The digital cash issuer1 receives PKI([pPKU1]SKC, pPKU1) and decrypts this information by decryption program using the secret key of the digital cash issuer1 SKI1. The digital cash issuer1 searches for pPKU1 in the storage, this will prevents the uses of other users' pseudonym public key, if this user's pseudonym public key pPKU1 is not already registered the digital cash issuer verifies the validity of the license [pPKU1]SKC by the signature verifying program using the certificate authority's public key PKC, if it is valid the digital cash issuer1 sets an empty space storage to the user and stores the user's pseudonym public key pPKU1 in the storage device. The digital cash issuer1 signs the user's pseudonym public key pPKU1 by the signature generating program using the secret key of the digital cash issuer1 SKI1 and encrypts the information by encryption program using the user's pseudonym public key pPKU1 then sends pPKU1 ([pPKU1]SKI1) as a license to the user.

The user receives pPKU1([pPKU1]SKI1), and decrypts this information by the decryption program using the user's pseudonym secret key pSKU1 then verifies the validity of the digital cash issuer signature by the signature verifying program using the digital cash issuer1's public key PKI1 if it is valid, store the license [pPKU1]SKI1 in the storage device.

The user registers using a second pseudonym public key pPKU2 with the second digital cash issuer2 by the same procedures described above.

FIG. 3 shows the diagrammatic representation of the withdrawal protocol. The user's bank comprises a storage device, a signature verifying program encryption program, decryption program and a signature generating program. The bank's public key PKB are known to all entities.

Referring to FIG. 8, the user blinds the amount of digital cash x using any proposed blinding signature scheme, then signs the blinded amount of digital cash Blind{x}, the user real identification UID, the amount of money to be withdrawn x, by the signature generating program using the user's master secret key mSKU and encrypts the information by encryption program using the public key of the user's bank PKB then sends PKB([Blind{x},UID,x]mSKU) to the user's bank.

The user's bank decrypts PKB([Blind{x},UID,x]mSKU) by decryption program using the user's bank's secret key SKB and verifies the validity of the signature for authentication by the signature verifying program using the master public key of the user mPKU, if it is valid withdraw the amount of money x from the user account and signs the blinded information and the amount of digital cash amount Blind(info,x), which is created by the cooperation between the user's bank and the user using any proposed blind signature scheme, by the signature generating program using the bank's secret key SKB, then encrypts [Blind{info,x}]SKB by encryption program using the master public key of the user in PKU then sends mPKU([BLIND{info,x}]SKB) to the user.

The user receives mPKU([BLIND{info,x}]SKB) and decrypts it by decryption program using the user's master secret key mSKU, then unblind the signed blinded information and the amount of digital cash using any proposed blind signature scheme, then the user verifies the validity of the bank's signature by signature verifying program using the public key of the user's bank PKB if it is valid the user stores the signed information and the amount of digital cash [info, x]SKB as a check in the storage device.

Referring to FIG. 9, the user signs the check [info,x]SKB and the user's pseudonym public key pPKU1 by signature generating program using the user's pseudonym secret key pSKU1 and then encrypts [[info,x]SKB,pPKU1]pSKU1 by encryption program using the digital cash issuer1's public key PKI1 and send PKI1([[info,x]SKB,pPKU1]pSKU1) to the digital cash issuer1.

The digital cash issuer1 receives PKI1([[info,x]SKB, pPKU1]pSKU1), then decrypts the information by decryption program using the digital cash issuer1's secret key SKI and verifies the signature of the user, for authentication, by signature verifying program using the user's pseudonym public key pPKU1 if it is valid the digital cash issuer1 verifies the signature of the bank [info,x]SKB by signature generating program using the public key of the user's bank PKB if it valid, the digital cash issuer1 sign the check [info,x]SKB by signature generating program using the digital cash issuer1's secret key SKI1 and encrypts [[info,x]SKB]SKI1 by encryption program using the public key of the user's bank PKB then sends PKB([[info,x]SKB]SKI1) to the user's bank.

Referring to FIG. 10, the user's bank receives PKB([[info, x]SKB]SKI) and decrypts the information by decryption program using the secret key of the user's bank then verifies the signature of the digital cash issuer1 signature by signature verifying program using the digital cash issuer1's public key PKI1 if it is valid verifies the signature of the user's bank by signature verifying program using the public key of the user's bank if it is valid, the bank checks if the check [info,x]SKB was used if it was not used the user's bank stores the check in the storage device and signs the check [info,x]SKB by signature generating program using the secret key of the user's bank SKB then encrypts [[info,x]SKB]SKB by encryption program using the digital cash issuer1's public key PKI1 then sends PKI1[[info,x]SKB]SKB) to the digital cash issuer1.

Referring to FIG. 11, the digital cash issuer1 receives PKI1 ([[info,x]SKB]SKB) and decrypts the information by decryption program using the digital cash issuer1's secret key SKIT then verify the signature of the user's bank twice if they are valid, the digital cash issuer1 will increments the user's virtual account by the amount x of digital cash, then signs the pseudonym public key pPKU1, digital cash amount x, by the signature generating program using the digital cash issuer1's secret key SKI1 then encrypts the signed pseudonym public key and the amount of the digital cash [pPKU1,x]SKI1 by encryption program using the user's pseudonym public key pPKU1 then sends pPKU1([pPKU1,x]SKI1) to the user.

The user receives pPKU1([pPKU1,x]SKI1), then decrypts the information by the decryption program using the user's pseudonym secret key then verifies the validity of the digital cash issuer1 signature by the signature verifying program with the digital cash issuer1's public key PKI1. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol. Referring to FIG. 12, The user signs the user's pseudonym public key pPKU1 and the amount of digital cash x by the signature generating program using the user's pseudonym secret key pSKU1 then encrypts the signed user's pseudonym public key and the amount of digital cash [pPKU1,x]pSKU1 by encryption program using the digital cash issuer1's public key PKI1, and then sends PKI1([pPKU1,x]pSKU1) to the digital cash issuer1.

The digital cash issuer1 receives PKI1([pPKU1,x] pSKU1), then decrypts PKI1([pPKU1,x]pSKU1) by decryption program using the digital cash issuer1's secret key and verifies the signature of the user by signature verifying program using the user's pseudonym public key pPKU1, to authenticate the user, if it is valid, the digital cash issuer will issues digital cash token which contains the following information: (i) digital cash amount, (ii) random number, (iii) the issuer identity, the digital cash issuer1 generates random number Rd and stores it in the storage device, then signs digital cash amount x, random number Rd and the issuer identity IID1 by signature generating program using the digital cash issuer1's secret key SKI1 and encrypts the information by encryption program using the user's pseudonym public key pPKU1 then decrements the user's virtual account by x then sends pPKU1([x,Rd,IID1]SKI1) to the user.

The user receives pPKU1([x,Rd,IID1]SKI1), then decrypts the information by the decryption program using the user's pseudonym secret key then verifies the validity of the digital cash issuer1 signature by the signature verifying program with the digital cash issuer1's public key PKI1. If the signature is valid, the user stores the digital cash token [x,Rd,IID1]SKI1 and the cumulative amount of digital cash is decremented by the amount of the digital cash token x then stores the new cumulative amount of digital cash in the storage device by the user.

Figure 20:
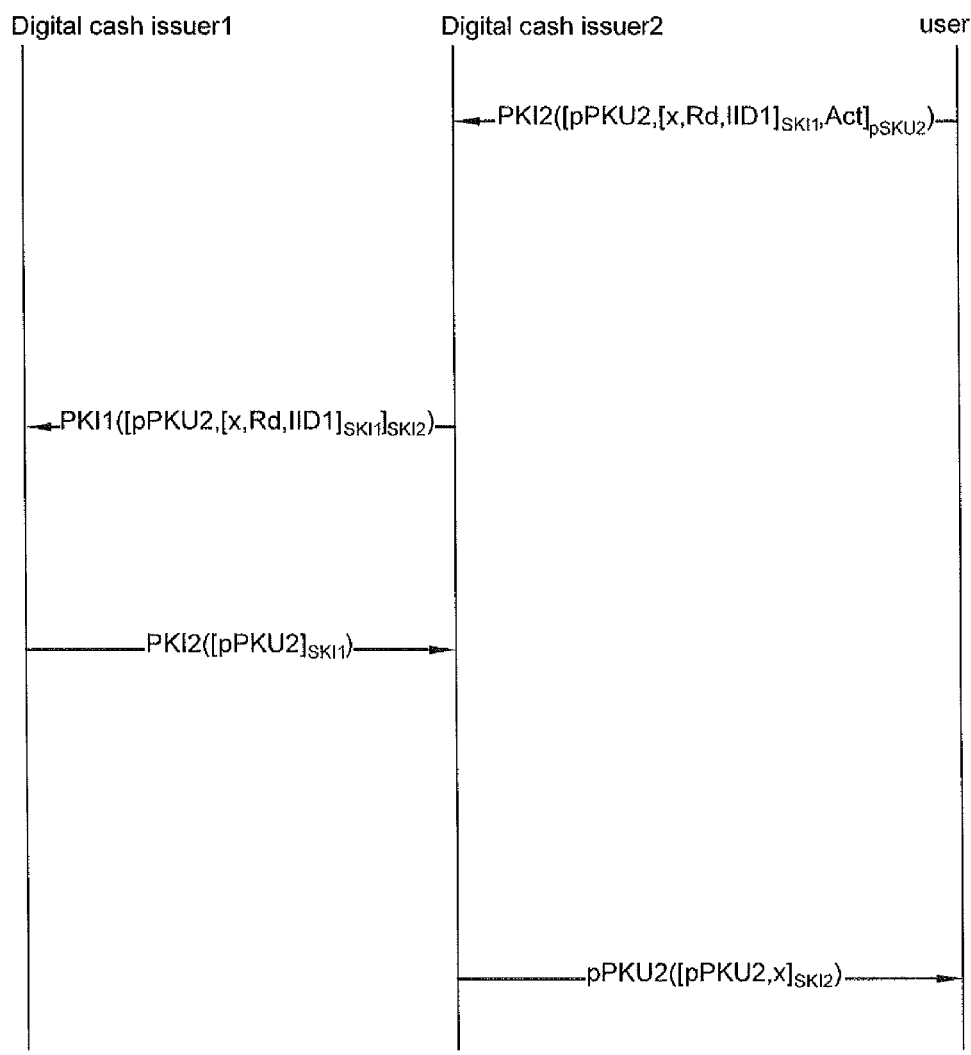
FIG. 20 is an exemplary transferring protocol according to a third embodiment of virtual account and token-based digital cash protocols according to the present invention.
Figure 22:
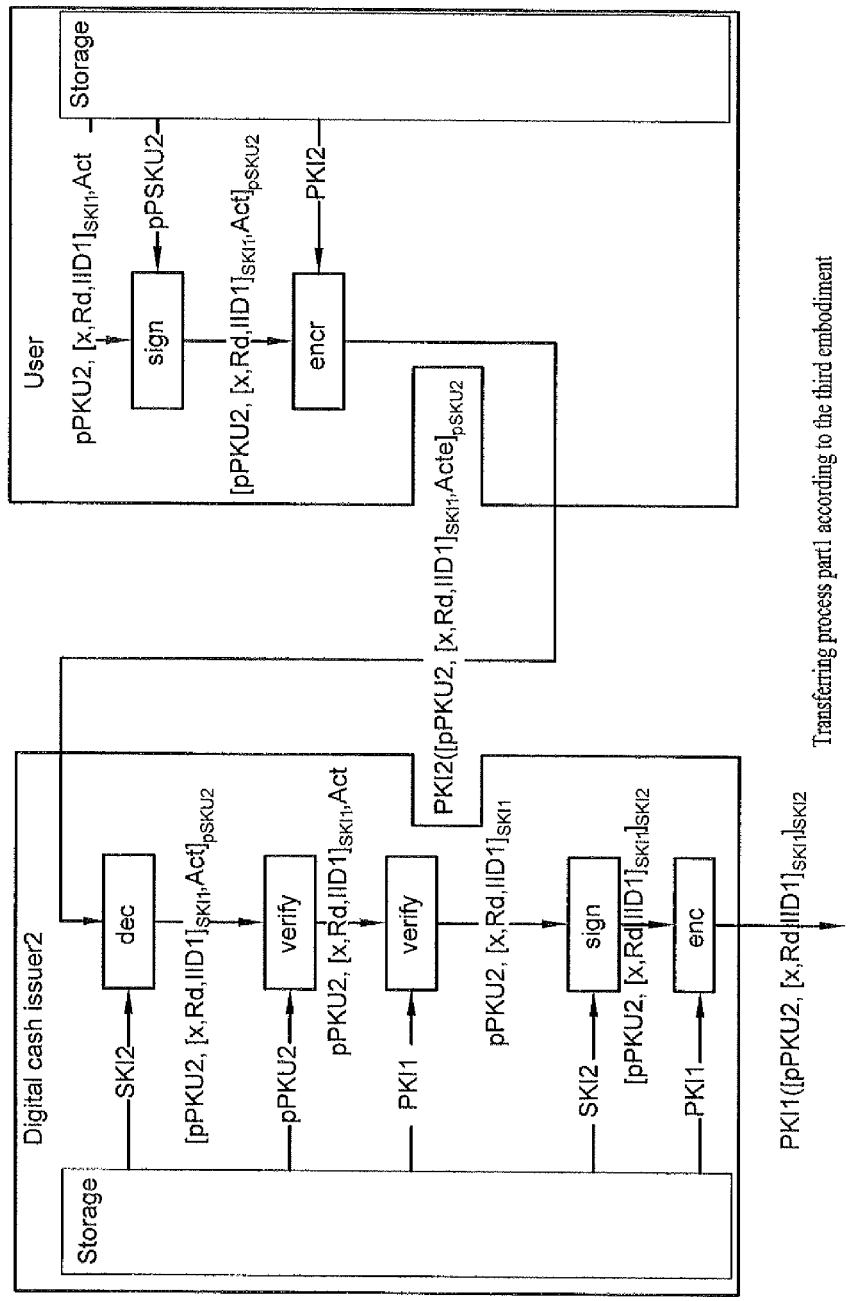
FIG. 22 is an exemplary transferring process, part 1, according to the third embodiment.

FIG. 20 shows the diagrammatic representation of the transferring protocol. Referring to FIG. 22, the user signs the user's pseudonym public key pPKU2, the digital cash token [x,Rd,IID1]SKI1 and the action to be taken Act by signature generating program using the user's secret pseudonym key pSKU2 then encrypts [pPKU2, [x,Rd,IID1]SKI1,Act] pSKU2 by encryption program using the public key of the digital cash issuer2 PKI2 then sends it to the digital cash issuer2 as request for transfer digital cash.

The digital cash issuer2 receives PKI2([pPKU2,[x,Rd,IID1]SKI1,Act]pSKU2), then decrypts the information by decryption program using the digital cash issuer2's secret key and verifies the signature of the user by signature verifying program using the user's pseudonym public key pPKU2, to authenticate the user, if it is valid, the digital cash issuer2 signs the user's pseudonym public key pPKU2 and the digital cash token [x,Rd,IID1]SKI1 by signature generating program using the digital cash issuer2 secret key SKI2 then encrypts [pPKU2,[x,Rd,IID1]SKI1]SKI2 by encryption program using the digital cash issuer1's public key PKI1 then sends PKI1([pPKU2,[x,Rd,IID1]SKI1]SKI2) to the digital cash issuer1

Figure 23:
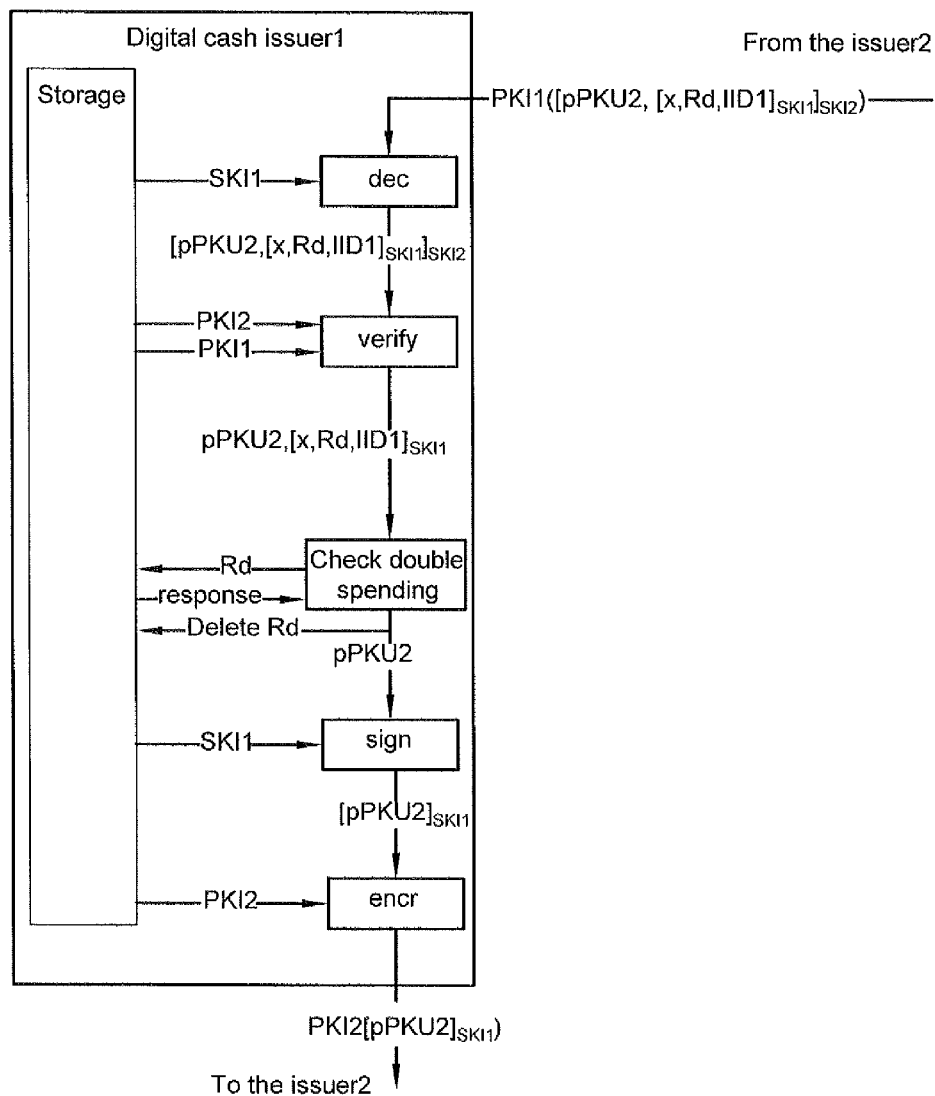
FIG. 23 is an exemplary transferring process, part 2, according to the third embodiment.

Referring to FIG. 23, the digital cash issuer1 receives PKI1 ([pPKU2,[x,Rd,IID1]SKI1]SKI2) and decrypts it by decryption program using the digital cash issuer1 secret key SKI1 and verifies the digital cash issuer2 signature by signature verifying program using the digital cash issuer2's public key PKI2 if it is valid, check the Rd if the random number Rd does not exist, this mean there is double spending and the real identity will be revealed by sending the user's pseudonym public key pPKU2 to the certificate authority, if it is not, the digital cash issuer1 signs the pseudonym public key pPKU2 by signature generating program using the digital cash issuer1's secret key SKI1, then encrypts [pPKU2]SKI1 by encryption program using the digital cash issuer2's public key PKI2 and sends it to the digital cash issuer2.

Figure 24:
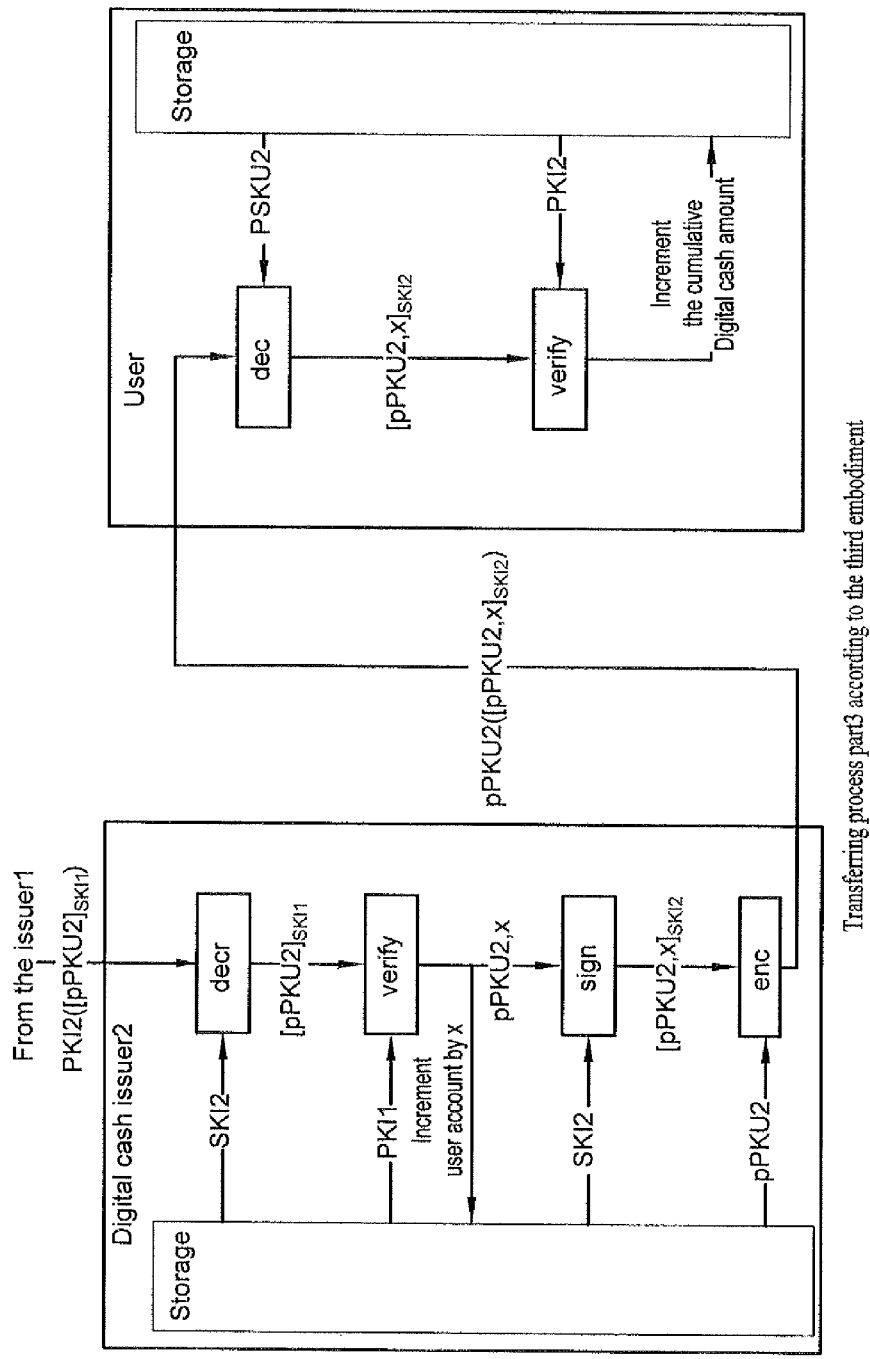
FIG. 24 is an exemplary transferring process, part 3, according to the second embodiment.

Referring to FIG. 24, the digital cash issuer2 receives PKI2 ([pPKU2]SKI1) and decrypts it by decryption program using the digital cash issuer2 secret key SKI2 and verifies the digital cash issuer1 signature by signature verifying program using the digital cash issuer1's public key PKI1 if it is valid, the digital cash issuer2 increments the user's virtual account by the amount x of digital cash, then signs the pseudonym public key pPKU2, digital cash amount x, by the signature generating program using the digital cash issuer2's secret key SKI2 then encrypts [pPKU2,x]SKI2 by encryption program using the user's pseudonym public key pPKU2 then sends pPKU2 ([pPKU2,x]SKI2) to the user.

The user receives pPKU2([pPKU2,x]SKI2), then decrypts the information by the decryption program using the user's pseudonym secret key then verifies the validity of the digital cash issuer2 signature by the signature verifying program with the digital cash issuer2's public key PKI2. If the signature is valid, the cumulative amount of digital cash is incremented by the amount of digital cash x then stores the new cumulative amount of digital cash in the storage device by the user.

Figure 21:
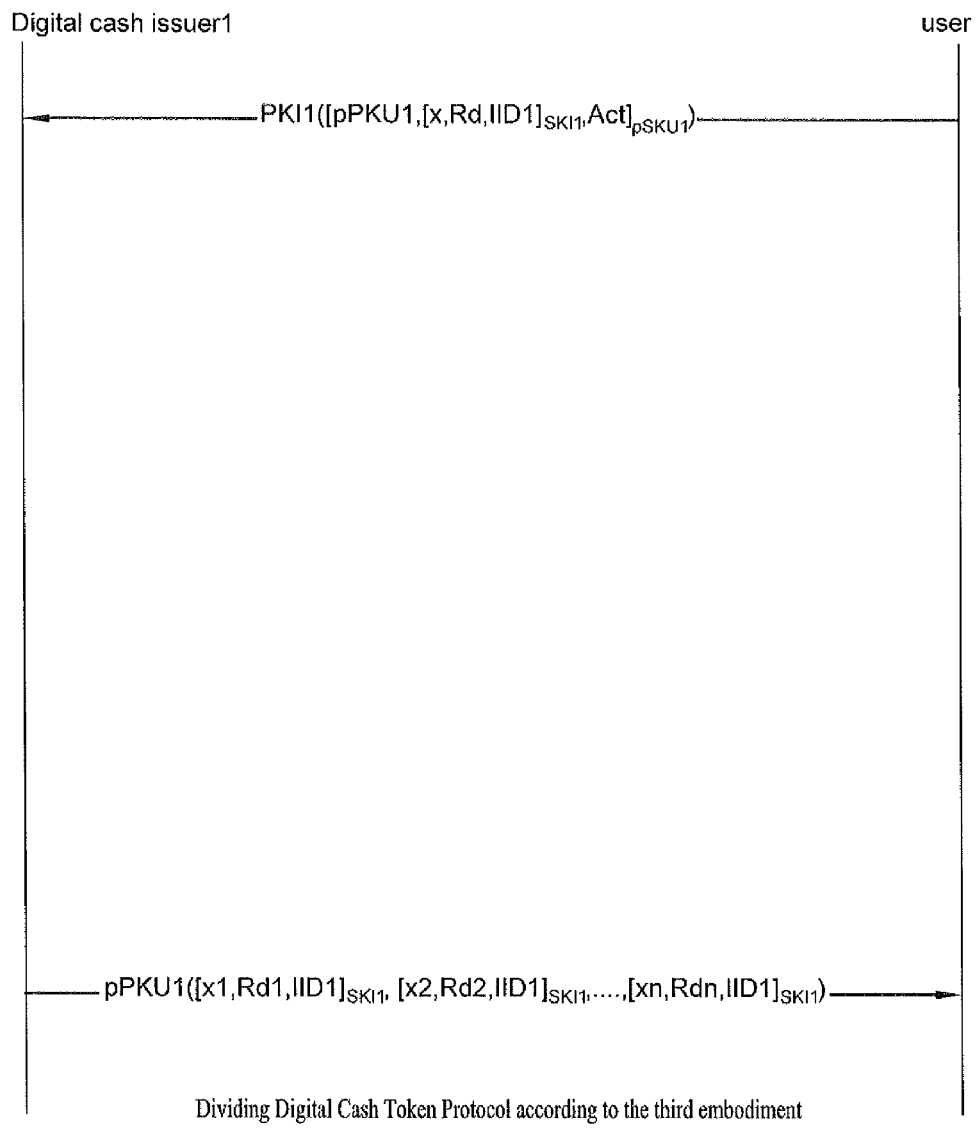
FIG. 21 is an exemplary dividing digital cash token protocol according to the third embodiment.
Figure 25:
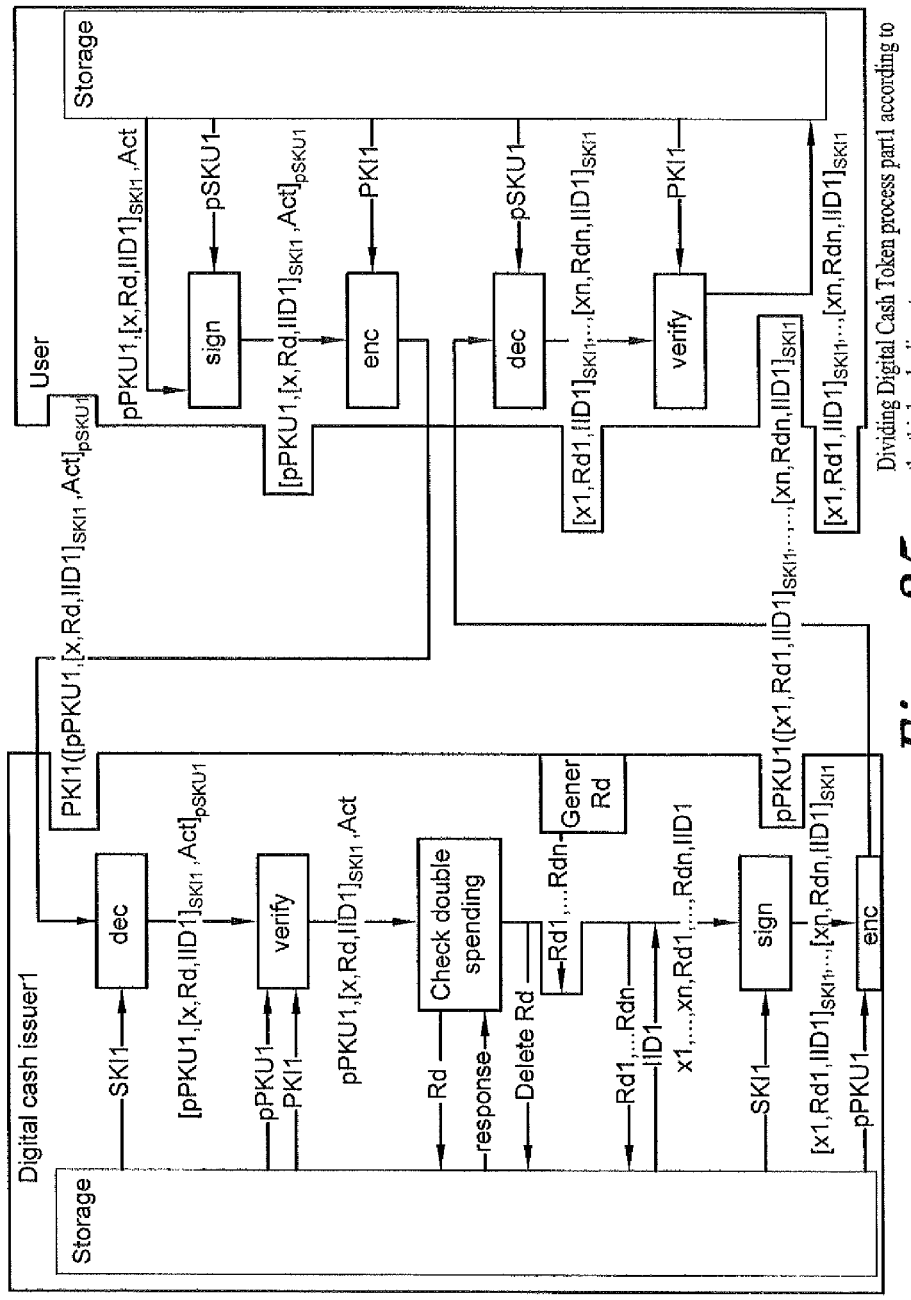
FIG. 25 is an exemplary dividing digital cash token process, part 1, according to the third embodiment.

FIG. 21 shows the diagrammatic representation of the dividing digital cash token protocol. Referring to FIG. 25, the user signs the user's pseudonym public key pPKU1, the digital cash token [x,Rd,IID1]SKI1 and the action to be taken Act by signature generating program using the user's secret pseudonym key pSKU1 then encrypts [pPKU1, [x,Rd,IID1] SKI1,Act]pSKU1 by encryption program using the public key of the digital cash issuer1 PKI1 then sends it to the digital cash issuer1 as request for transfer digital cash.

The digital cash issuer1 receives PKI1([pPKU1,[x,Rd,IID1]SKI1,Act]pSKU1), then decrypts the information by decryption program using the digital cash issuer1's secret key and verifies the signature of the user by signature verifying program using the user's pseudonym public key pPKU1, to authenticate the user, if it is valid, the digital cash issuer1 check the Rd if the random number Rd does not exist, this mean there is double spending and the real identity will be revealed by sending the user's pseudonym public key pPKU1 to the certificate authority, if it is not, the digital cash issuer1 deletes the random number Rd and will issues smaller digital cash tokens which contains the following information: (i) digital cash amount, (ii) random number, (iii) the issuer identity, the digital cash issuer1 generates random numbers Rd1, Rd2, ... Rdn and stores them in the storage device, then signs digital cash amounts x1, x2, ..., xn, random numbers Rd1, Rd2, ... Rdn and the issuer identity IID1 by signature generating program using the digital cash issuer1's secret key SKI1 and encrypts the information by encryption program using the user's pseudonym public key pPKU1 then sends pPKU1([x1,Rd1,IID]SKI1, [x2,Rd2,IID1]SKI1, ..., [xn, Rdn,IID1]SKI1) to the user.

The user receives pPKU1([x,Rd1,IID1]SKI1, [x2,Rd2, IID1]SKI1, ..., [xn,Rdn,IID1]SKI1), then decrypts the information by the decryption program using the user's pseudonym secret key then verifies the validity of the digital cash issuer1 signature by the signature verifying program with the digital cash issuer1's public key PKI1. If the signature is valid, the user stores the digital cash tokens [x1,Rd1,IID1] SKI1, [x2,Rd2,IID1]SKI1, ..., [xn,Rdn,IID1]SKI1) in the storage device.

FIG. 16 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 17, the user encrypts the digital cash token [x,Rd,IID1]SKI1 and the digital cash issuer license [pPKU1]SKI1 by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer1 license PKS([x,Rd,IID1]SKI1, [pPKU1] SKI1) by decryption program using the shop's secret key SKS then verify the signature of the issuer by the signature verifying program with the digital cash issuer1 public key PKI1 if the signatures are valid the shop stores the user's digital cash issuer1 license, the digital cash token and generates a random number Rs by random number generating program and generates the time Ts by the time generating program then encrypt Rs,Ts, the shop identification SID and the price of the good y by encryption program using the user's pseudonym public key pPKU1 and sends pPKU1(Rs,Ts,SID,y) to the user.

The user receives pPKU1(Rs,Ts,SID,y) and decrypts it by decryption program using the user's pseudonym secret key pSKU1 and signs the random number Rs, the time Ts, the shop identification SID and the price of the good y by signature generating program using the user's pseudonym secret key pSKU1 and encrypts the information by encryption program using the public key of the shop PKS then sends PKS([Rs,Ts,SID,y]pSKU1) to the shop.

The shop receives the information PKS([Rs,Ts,SID,u]pSKU1) and decrypts it by decryption program using the shop's secret key SKS and verifies the signature by signature verifying program using the user's pseudonym public key pPKU1 if it is valid the shop stores the challenge and the shop regards the payment as valid.

Referring to FIG. 18, after a period of time, the shop encrypts the information that contains the challenge that was signed by the user [Rs,Ts,SID,y]pSKU1, the digital cash token [x,Rd,IID1]SKI1, and the user's digital cash issuer1 license [pPKU1]SKI1, by encryption program using the public key of the digital cash issuer1 PKI1 and sends the information to the digital cash issuer1.

The digital cash issuer1 decrypts PKI([Rs,Ts,SID,y]pSKU1, [x,Rd,IID1]SKI1, [pPKU1]SKI1) by decryption program using the digital cash issuer1's secret key SKI1 and verifies the signature by the signature verifying program using the digital cash issuer1's public key PKI1 and the user's pseudonym public key pPKU1, if the signatures are valid the issuer1 check the Rd if the random number Rd does not exist, this mean there is double spending and the real identity will be revealed by sending the user's pseudonym public key pPKU1 to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU1 in the storage device.

Referring to FIG. 19, the digital cash issuer1 signs the shop identification SID, and the amount x to be deposited for the shop by the signature generating program with the digital cash issuer1's secret key SKI1 and encrypts the information by encryption program using the public key of the shop's bank PKB then sends PKB([SID,x] SKI1) to the shop's bank.

The shop's bank receives PKB([SID,x]SKI1) and decrypts the information by decryption program using the secret key SKB and verifies the signature by signature verifying program with the public key of the issuer1 PKI1 if the signature is valid the shop's bank will add x amount of money in the shop account.

Fourth Embodiment

In the previous embodiments, the processes are done in fixed station, so the user has to go to the fixed station to buy or to get digital cash. For more convenience and accessibility for the user, the user uses mobile-based devices to buy and to get digital cash. The mobile-based device has the minimum requirement to protect the security and privacy, because of the limit on storage and computational power.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID,pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU] SKC) to the user.

The user receives the encrypted license mPKU([pPKU]SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU]SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU]SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

Figure 26:
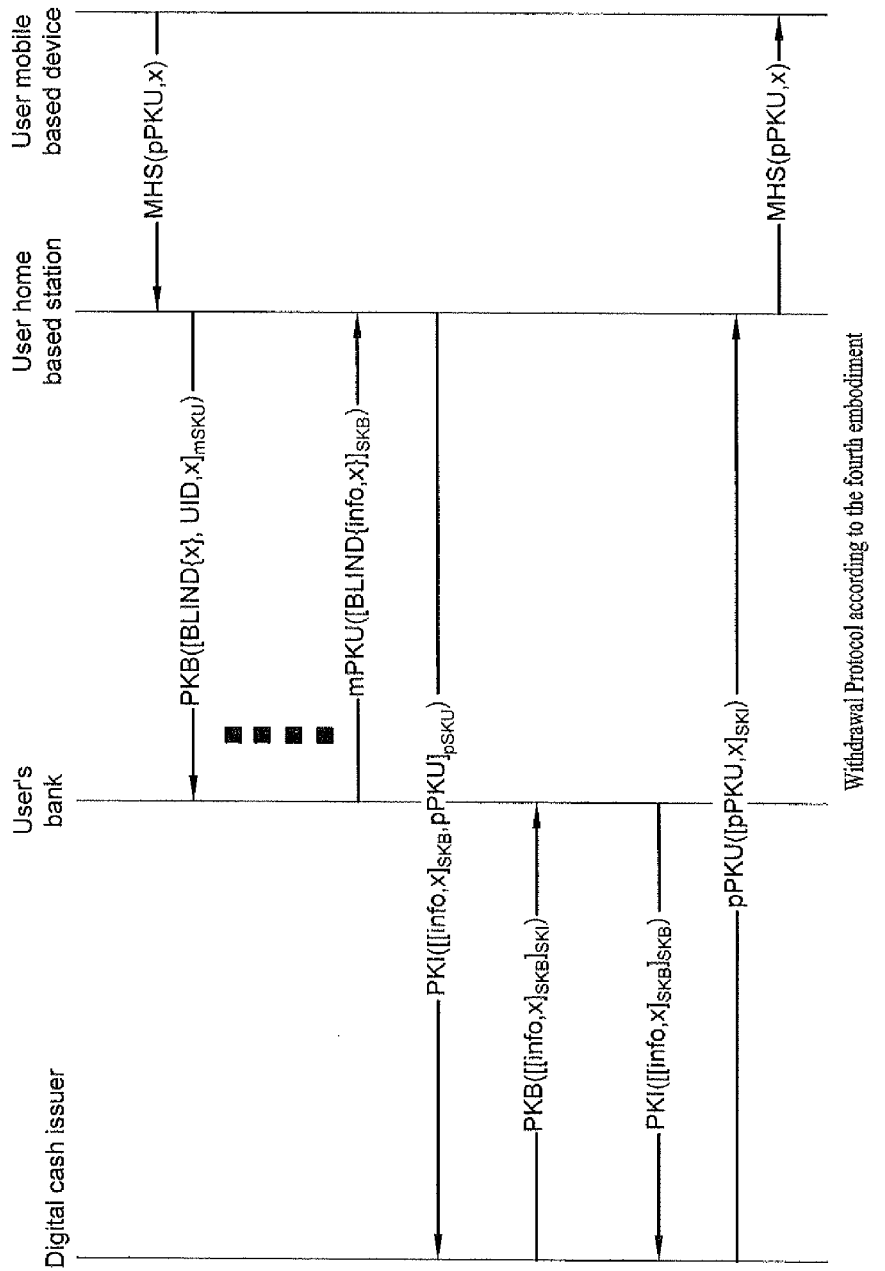
FIG. 26 is an exemplary withdrawal protocol according to a fourth embodiment of virtual account and token-based digital cash protocols according to the present invention.

FIG. 26 shows the diagrammatic representation of the withdrawal protocol. The user's bank comprises a storage device, a signature verifying program encryption program, decryption program and a signature generating program. The bank's public key PKB are known to all entities.

Figure 27:
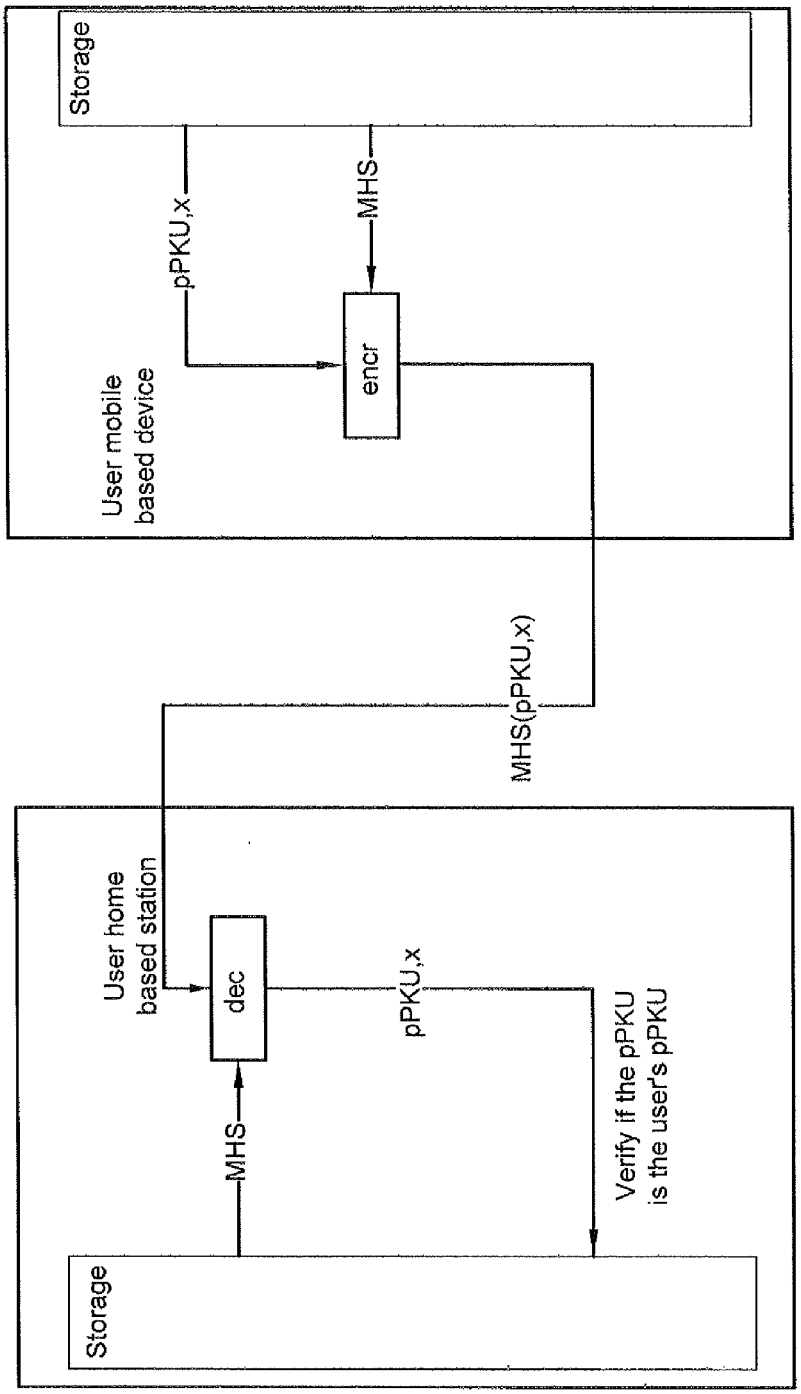
FIG. 27 is an exemplary withdrawal process, part 1, according to the fourth embodiment.

Referring to FIG. 27, the user's mobile device encrypts the user's pseudonym public key pPKU and the amount of digital cash x by encryption program using the mobile home based shared secret key MHS and sends the information MHS(pPKU,x) to the user's home based station.

Figure 28:
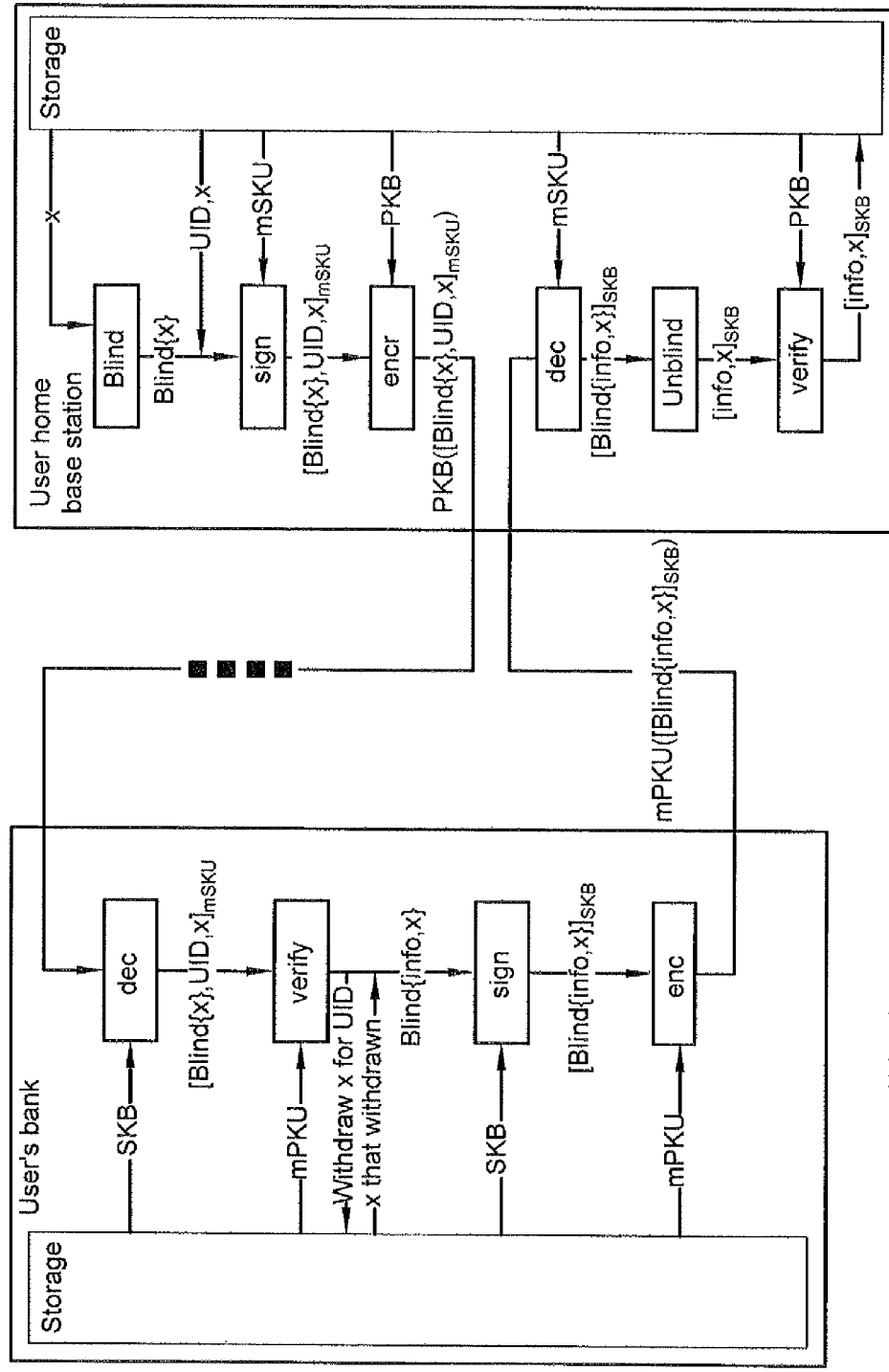
FIG. 28 is an exemplary withdrawal process, part 2, according to the fourth embodiment.

The user's home-based station receives the encrypted user's pseudonym public key and the amount of digital cash MHS(pPKU,x) and decrypts the information by decryption program using the mobile-home based shared secret key MHS and matches the user's pseudonym public key if they are equal the user's mobile device is authenticated by the user's home based then, referring to FIG. 28 The user's home based station blind the amount of digital cash x using any proposed blinding signature scheme then signs the blinded amount of digital cash Blind{x}, the user real identification. UID, the amount of money to be withdrawn x, by the signature generating program using the user's master secret key mSKU and encrypts the information by encryption program using the public key of the user's bank PKB then sends PKB([Blind{x},UID,x]mSKU) to the user's bank.

The user's bank decrypts PKB([Blind{x},UID,x]mSKU) by decryption program using the user's bank's secret key SKB and verifies the validity of the signature for authentication by the signature verifying program using the master public key of the user mPKU, if it is valid withdraw the amount of money x from the user account and signs the blinded information and the amount of digital cash amount Blind(info,x), which is created by the cooperation between the user's bank and the user's home based station using any proposed blind signature scheme, by the signature generating program using the bank's secret key SKB, then encrypts [Blind{info,x}]SKB by encryption program using the master public key of the user mPKU then sends mPKU ([BLIND{info,x}]SKB) to the user's home based station.

The user's home-based station receives mPKU ([BLIND{info,x}]SKB) and decrypts it by decryption program using the user's master secret key in SKU, then unblind the signed blinded information and the amount of digital cash using any proposed blind signature scheme, then the user's home based station verifies the validity of the bank's signature by signature verifying program using the public key of the user's bank PKB if it is valid the user's home based station stores the signed information and the amount of digital cash [info,x]SKB as a check in the storage device.

Figure 29:
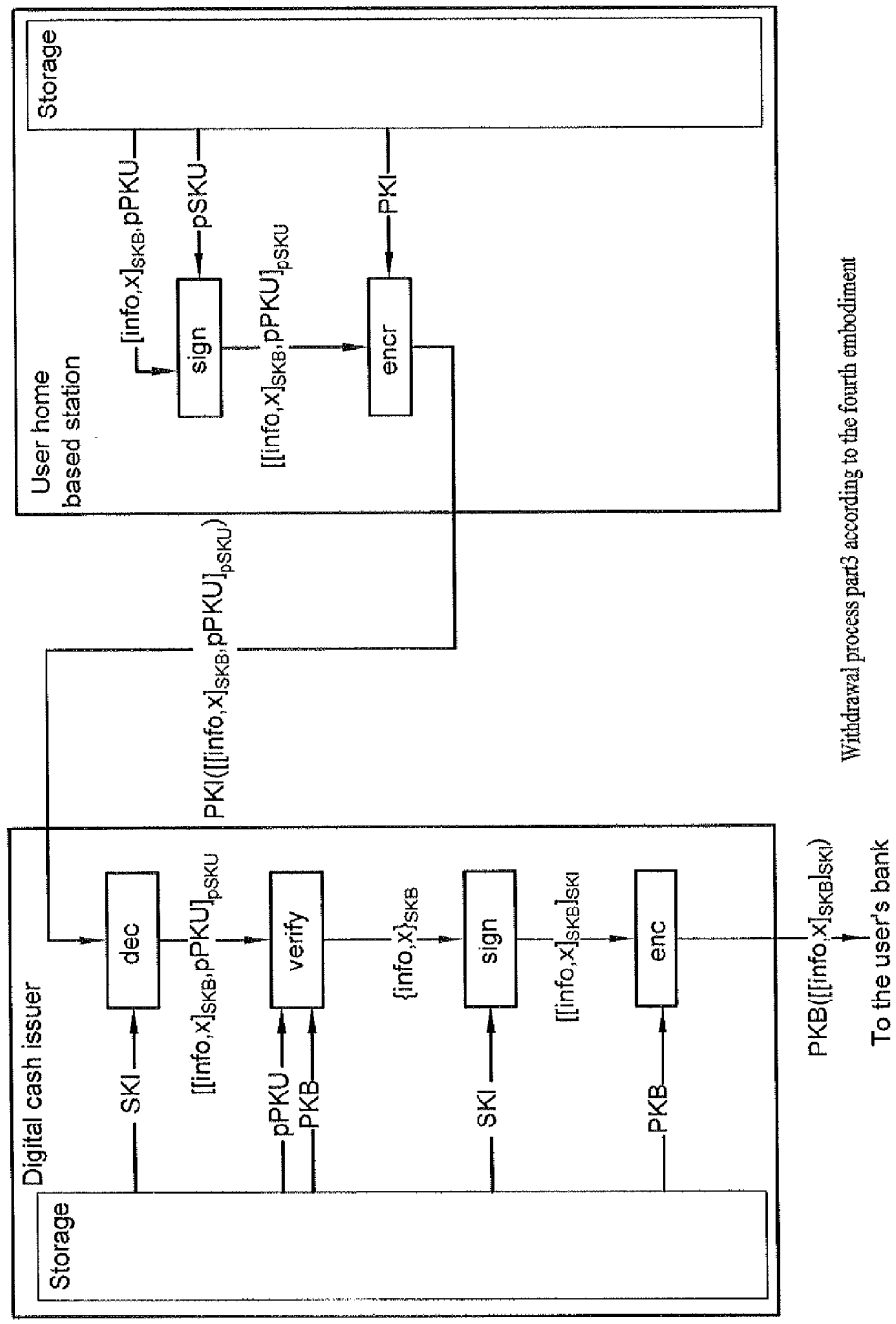
FIG. 29 is an exemplary withdrawal process, part 3, according to the fourth embodiment.

Referring to FIG. 29, the user's home-based station signs the check [info,x]SKB and the user's pseudonym public key pPKU by signature generating program using the user's pseudonym secret key pSKU and then encrypts [[info,x]SKB,pPKU]pSKU by encryption program using the digital cash issuer's public key PKI and send PKI([[info,x]SKB,pPKU]pSKU) to the digital cash issuer.

The digital cash issuer receives PKI([[info,x]SKB,pPKU] pSKU), then decrypts the information by decryption program using the digital cash issuer's secret key SKI and verifies the signature of the user, for authentication, by signature verifying program using the user's pseudonym public key pPKU if it is valid the digital cash issuer verifies the signature of the bank [info,x]SKB by signature generating program using the public key of the user's bank PKB if it valid, the digital cash issuer sign the check [info,x]SKB by signature generating program using the digital cash issuer's secret key SKI and encrypts [[info,x]SKB]SKI by encryption program using the public key of the user's bank PKB then sends PKB([[info,x] SKB]SKI) to the user's bank.

Figure 30:
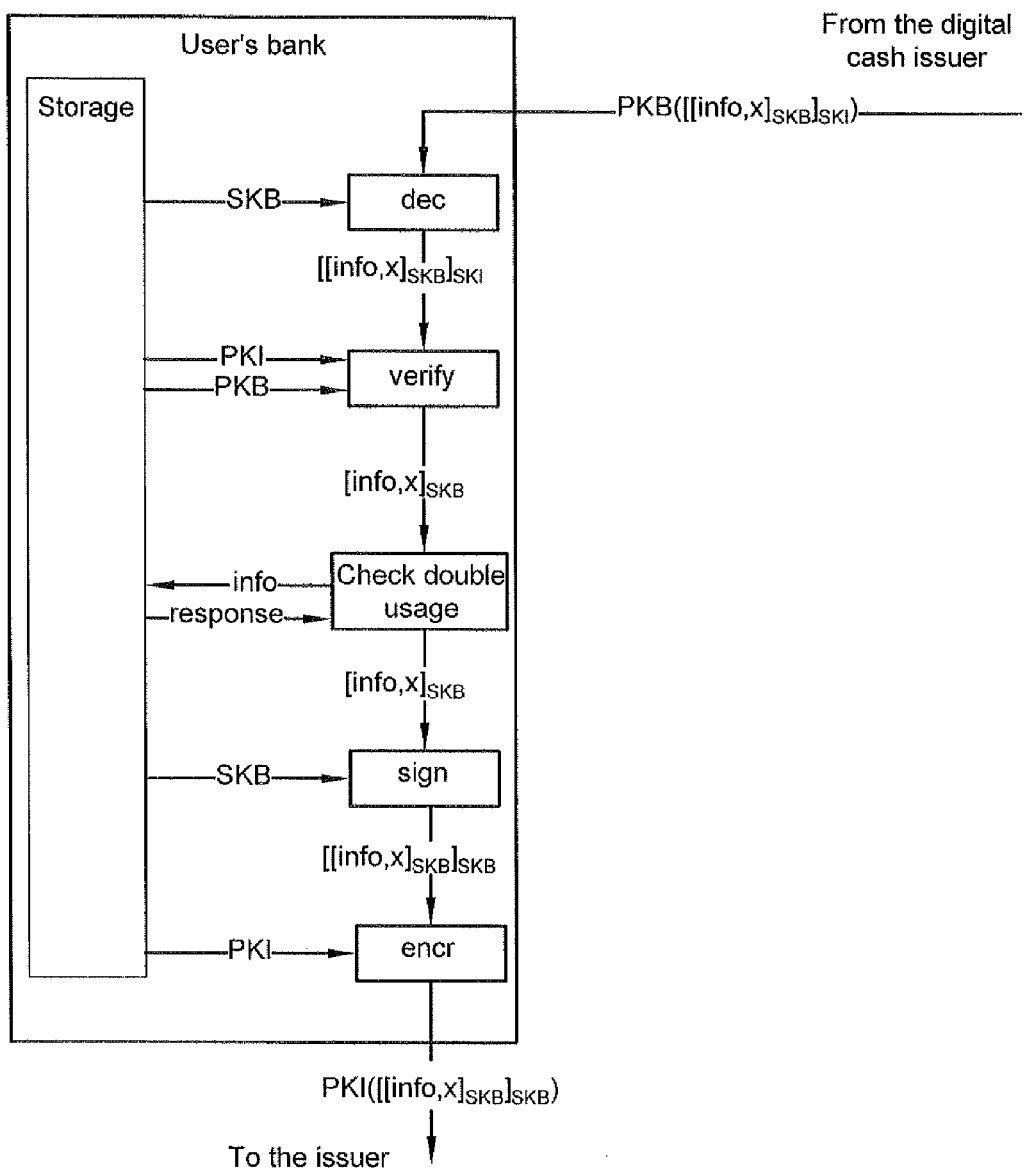
FIG. 30 is an exemplary withdrawal process, part 4, according to the fourth embodiment.

Referring to FIG. 30, the user's bank receives PKB([[info, x]SKB]SKI) and decrypts the information by decryption program using the secret key of the user's bank then verifies the signature of the digital cash issuer signature by signature verifying program using the digital cash issuer's public key PKI if it is valid verifies the signature of the user's bank by signature verifying program using the public key of the user's bank if it is valid, the bank checks if the check [info,x]SKB was used if it was not used the user's bank stores the check in the storage device and signs the check [info,x]SKB by signature generating program using the secret key of the user's bank SKB then encrypts [[info,x]SKB]SKB by encryption program using the digital cash issuer's public key PKI then sends PKI([[info,x]SKB]SKB) to the digital cash issuer.

Figure 31:
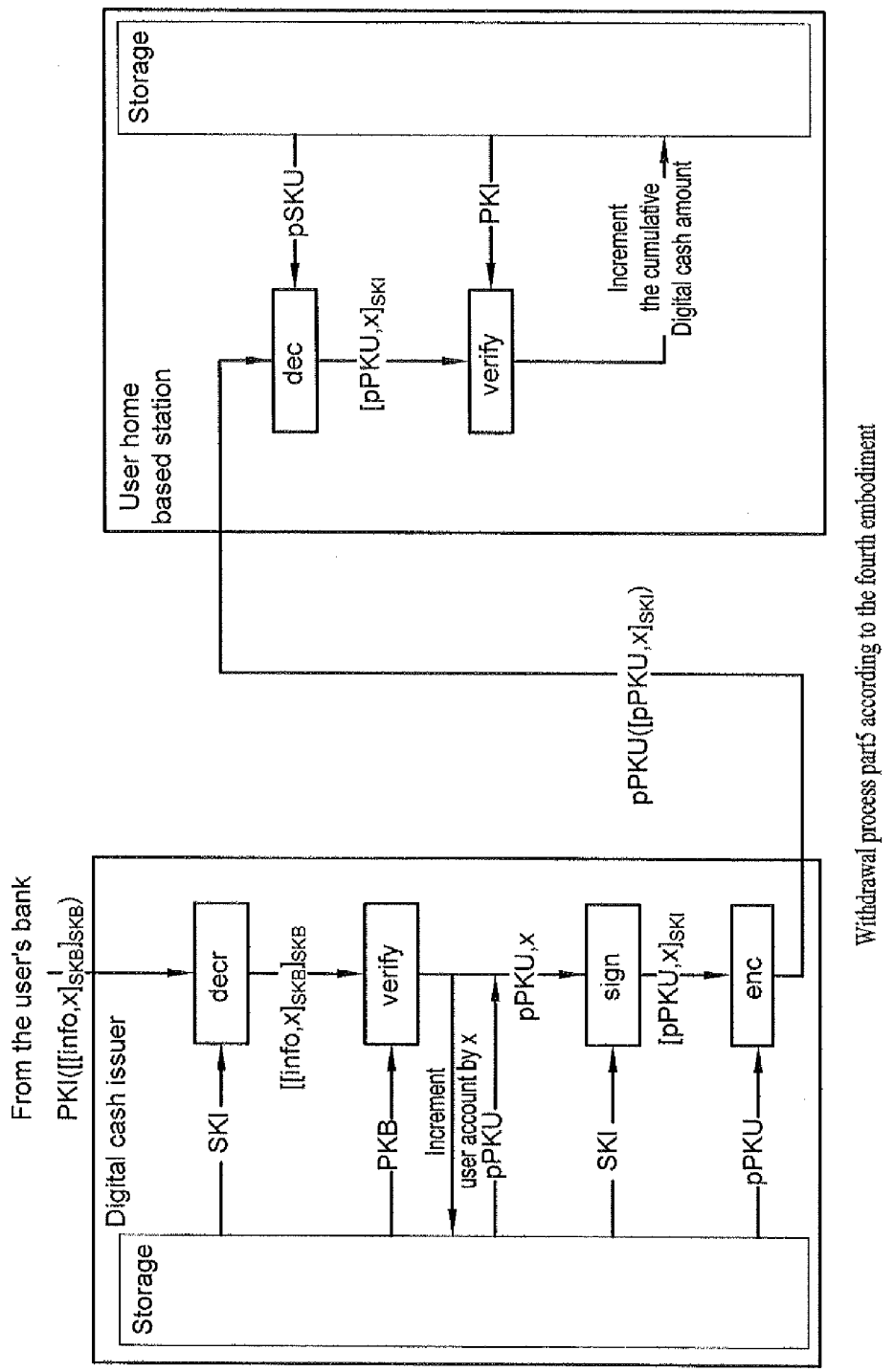
FIG. 31 is an exemplary withdrawal process, part 5, according to the fourth embodiment.

Referring to FIG. 31, the digital cash issuer receives PKI ([[info,x]SKB]SKB) and decrypts the information by decryption program using the digital cash issuer's secret key SKI then verify the signature of the user's bank twice if they are valid, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then sends pPKU([pPKU,x]SKI) to the user's home based station.

The user's home-based station receives pPKU([pPKU,x] SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user's home based station.

Figure 32:
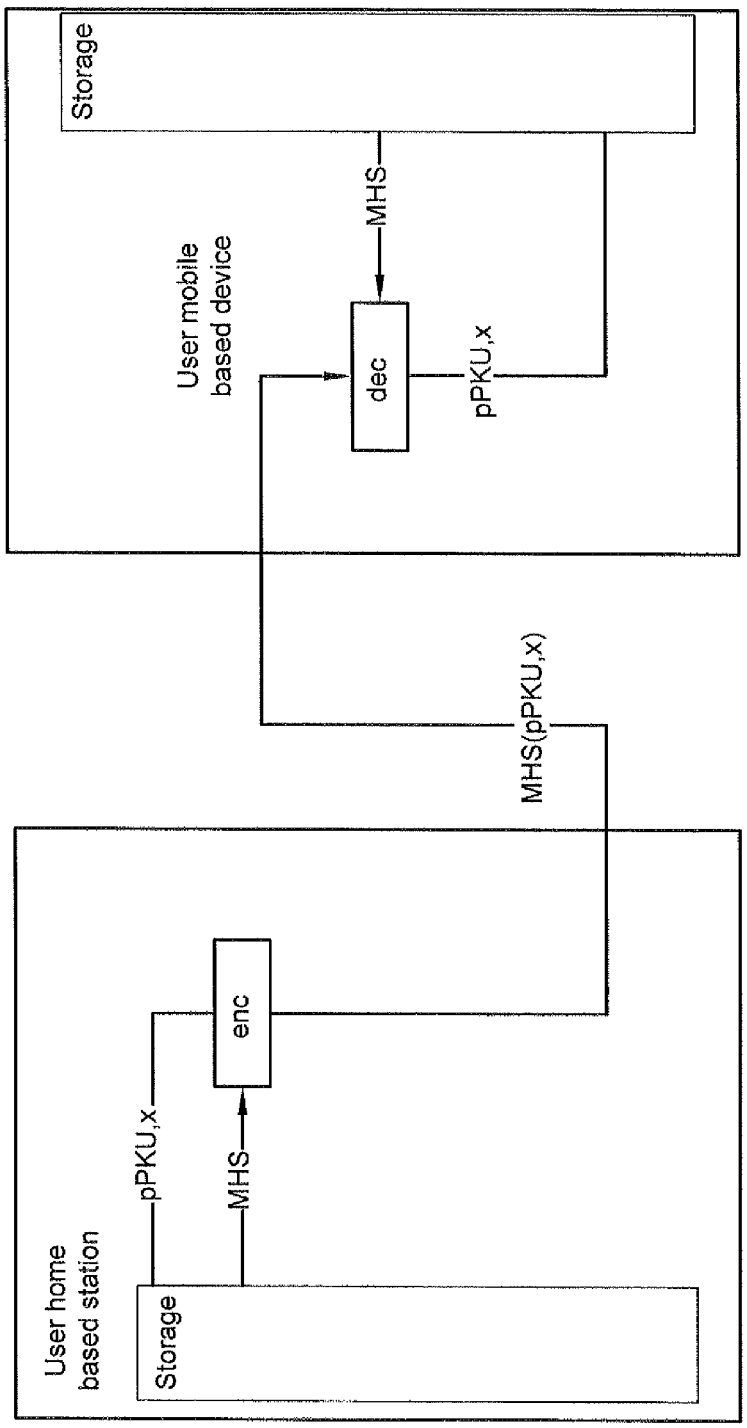
FIG. 32 is an exemplary withdrawal process, part 6, according to the fourth embodiment.

Referring to FIG. 32, the user's home-based machine encrypts the value of the new cumulative amount of digital cash x and the user's pseudonym public key pPKU by encryption program using the mobile-home based shared secret key MHS and sends MHS(pPKU,x) to the user's mobile based device.

The user's mobile-based device receives the encrypted value of the new cumulative amount of digital cash and the user's pseudonym public key MHS(pPKU,x) decrypts the information by decryption program using the mobile-home based shared secret key MHS and match the user's pseudonym public key to authenticate the user's home based station is the user's pseudonym public key matches the user stores the new cumulative amount of digital cash in the storage device of the user's mobile based device.

Figure 33:
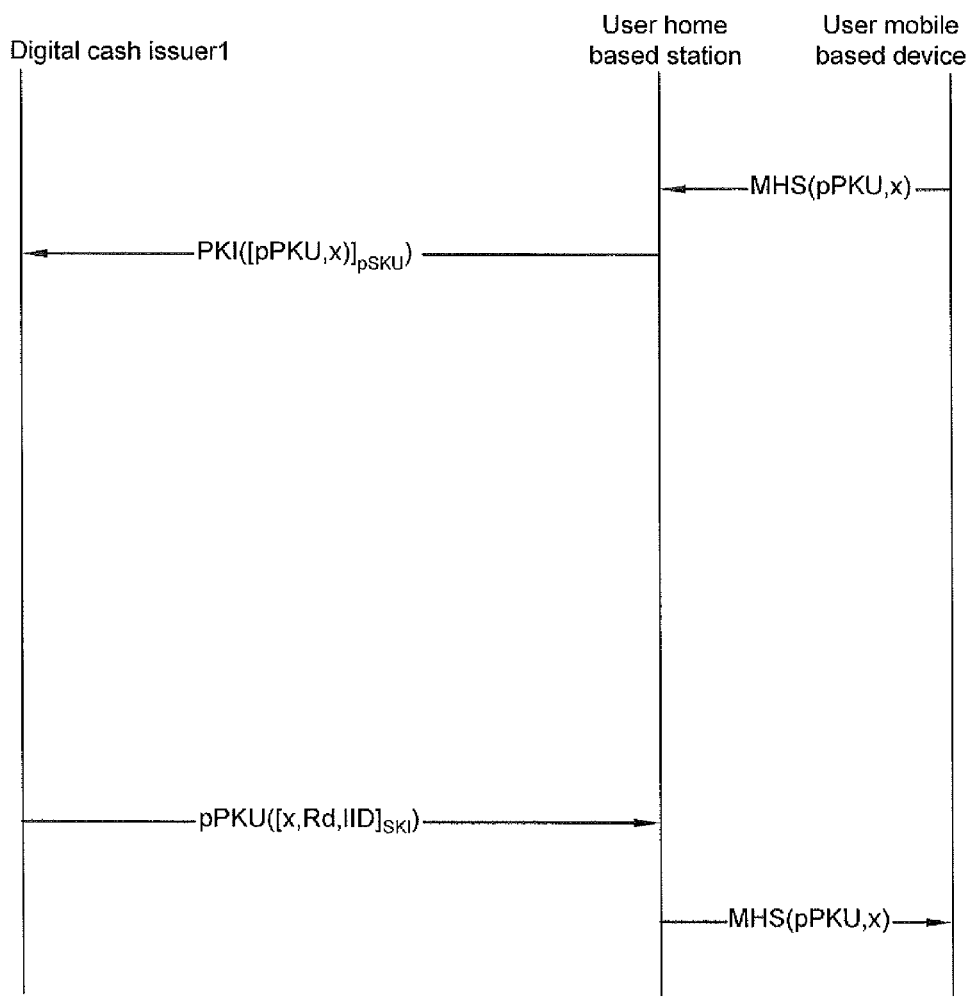
FIG. 33 is an exemplary withdrawal digital cash token protocol according to the fourth embodiment.
Figure 34:
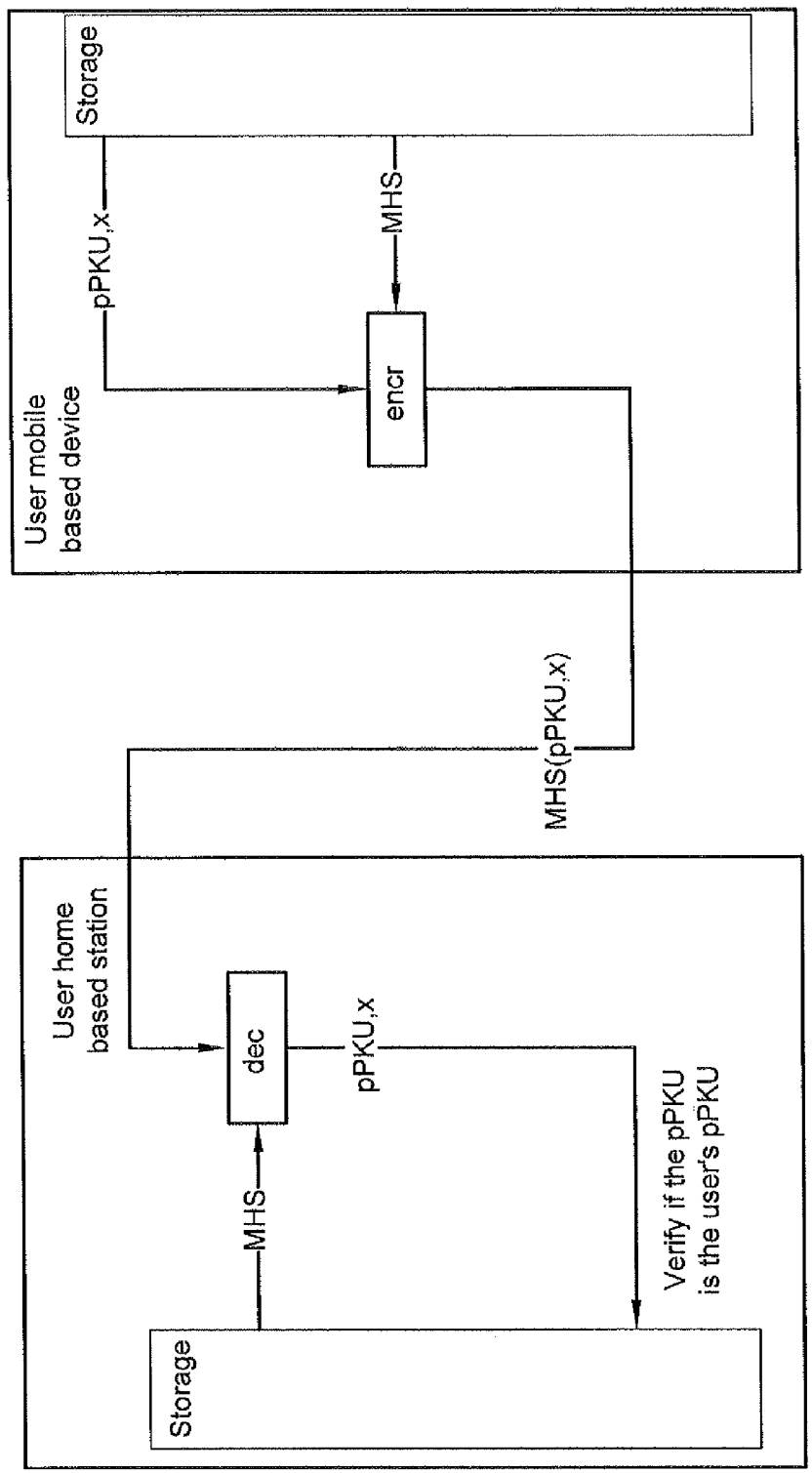
FIG. 34 is an exemplary withdrawal digital cash token process, part 1, according to the fourth embodiment.

FIG. 33 shows the diagrammatic representation of the digital cash token withdrawal protocol. Referring to FIG. 34, the user's mobile device encrypts the user's pseudonym public key pPKU and the amount of digital cash x by encryption program using the mobile-home based shared secret key MHS and sends the information MHS(pPKU,x) to the user's home based station.

Figure 35:
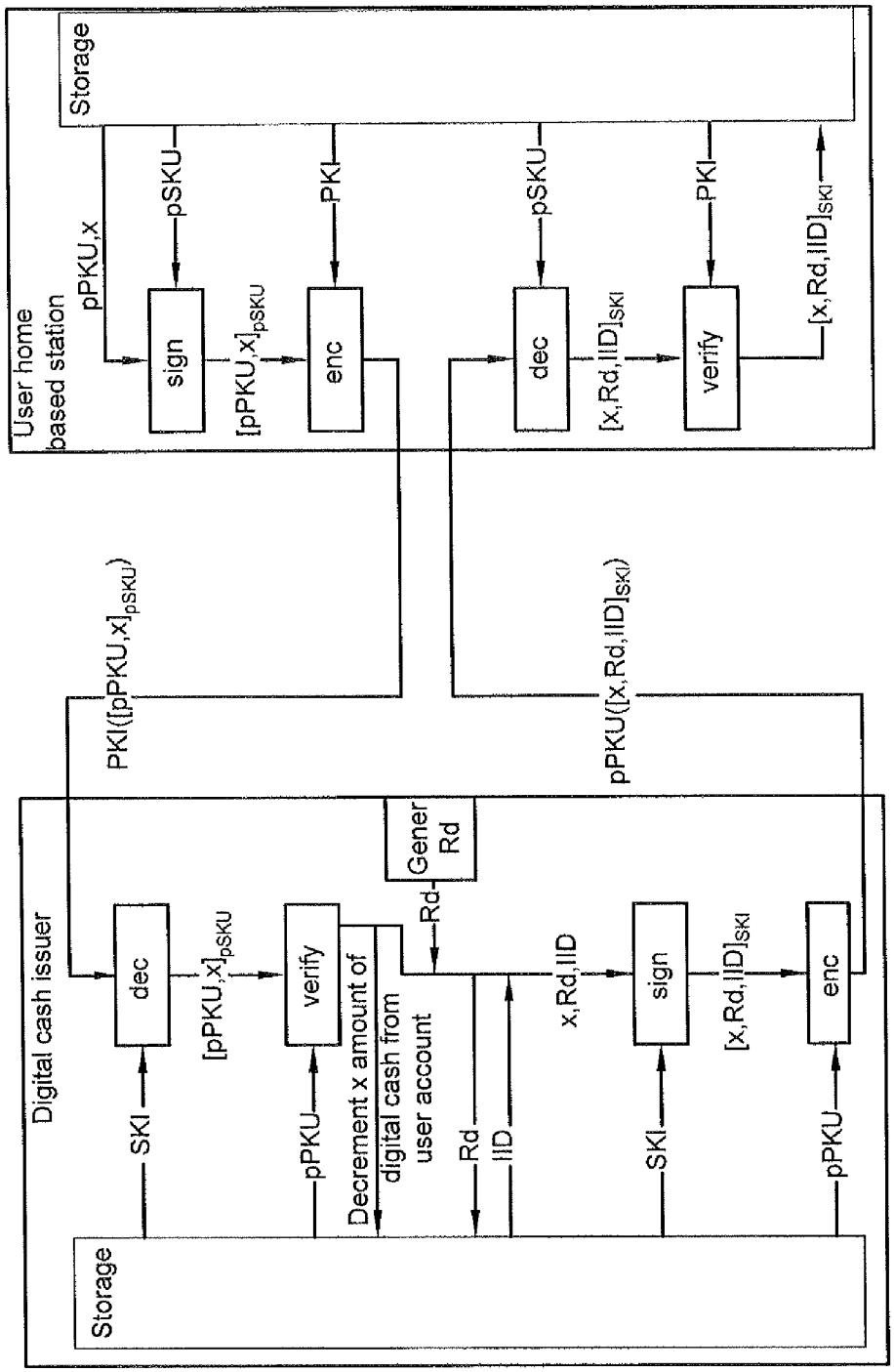
FIG. 35 is an exemplary withdrawal digital cash token process, part 2, according to the fourth embodiment.

The user's home-based station receives the encrypted user's pseudonym public key and the amount of digital cash MHS(pPKU,x) and decrypts the information by decryption program using the mobile-home based shared secret key MHS and matches the user's pseudonym public key if they are equal the user's mobile device is authenticated by the user's home based then Referring to FIG. 35, the user's home-based station signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x,Rd,IID]SKI) to the user's home based station.

The user's home-based station receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user's home based station stores the digital cash token [x,Rd,IID]SKI and the cumulative amount of digital cash is decremented by the amount of the digital cash token x then stores the new cumulative amount of digital cash in the storage device by the user.

Figure 36:
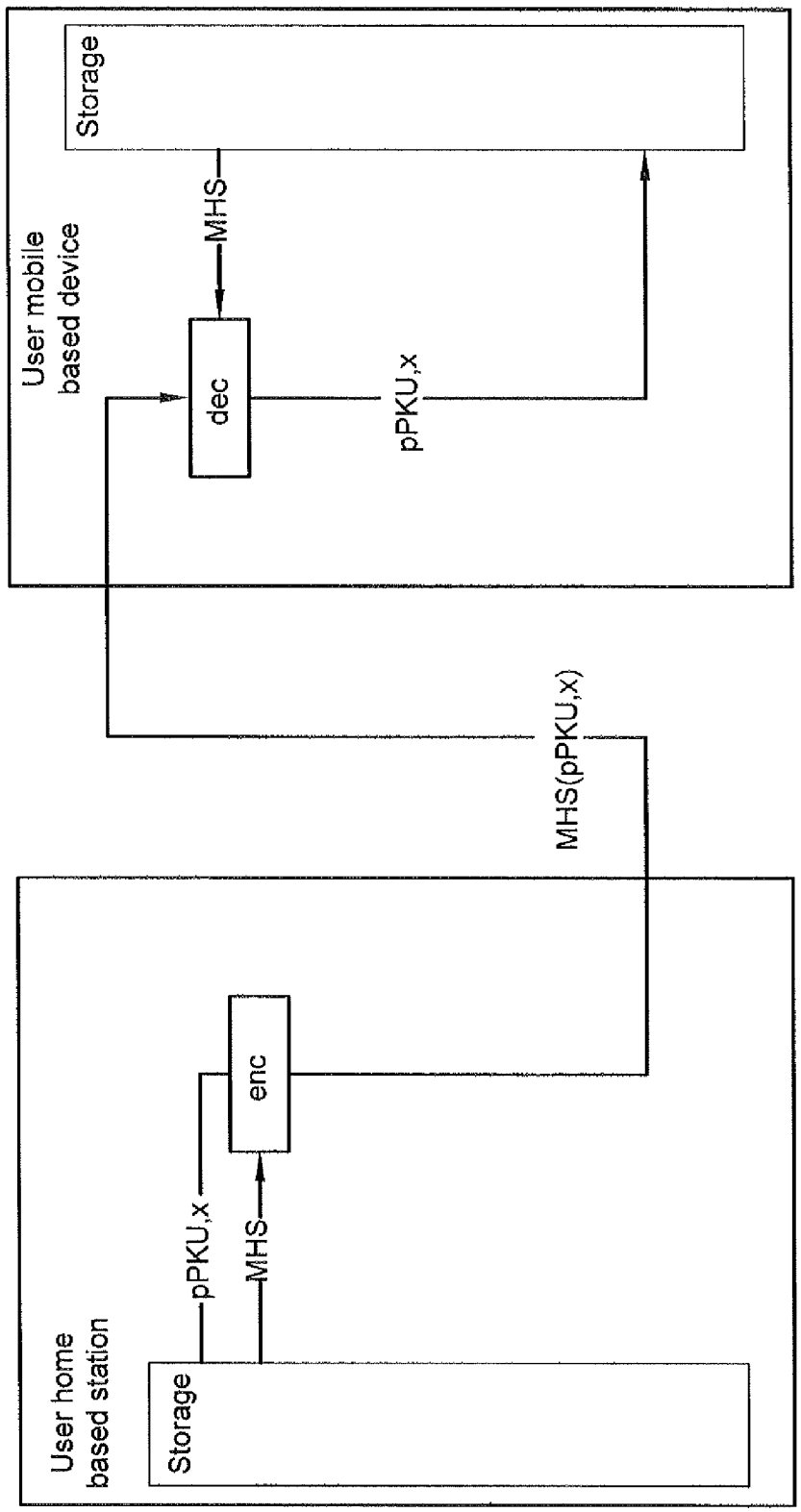
FIG. 36 is an exemplary withdrawal digital cash token process, part 3, according to the fourth embodiment.

Referring to FIG. 36 The user's home based machine encrypts the value of the digital cash token x, the new cumulative amount of digital cash z and the user's pseudonym public key pPKU by encryption program using the mobile-home based shared secret key MHS and sends MHS(pPKU,z,x) to the user's mobile based device.

The user's mobile-based device receives the encrypted value of the digital cash token, the new cumulative amount of digital cash z and the user's pseudonym public key MHS(pPKU,z,x) decrypts the information by decryption program using the mobile-home based shared secret key MHS and match the user's pseudonym public key to authenticate the user's home based station is the user's pseudonym public key matches the user stores the value of digital cash token and the new cumulative amount of digital cash in the storage device of the user's mobile-based device.

The user can easily transfer the issued digital cash token to another user who has certified pseudonym public key.

Figure 37:
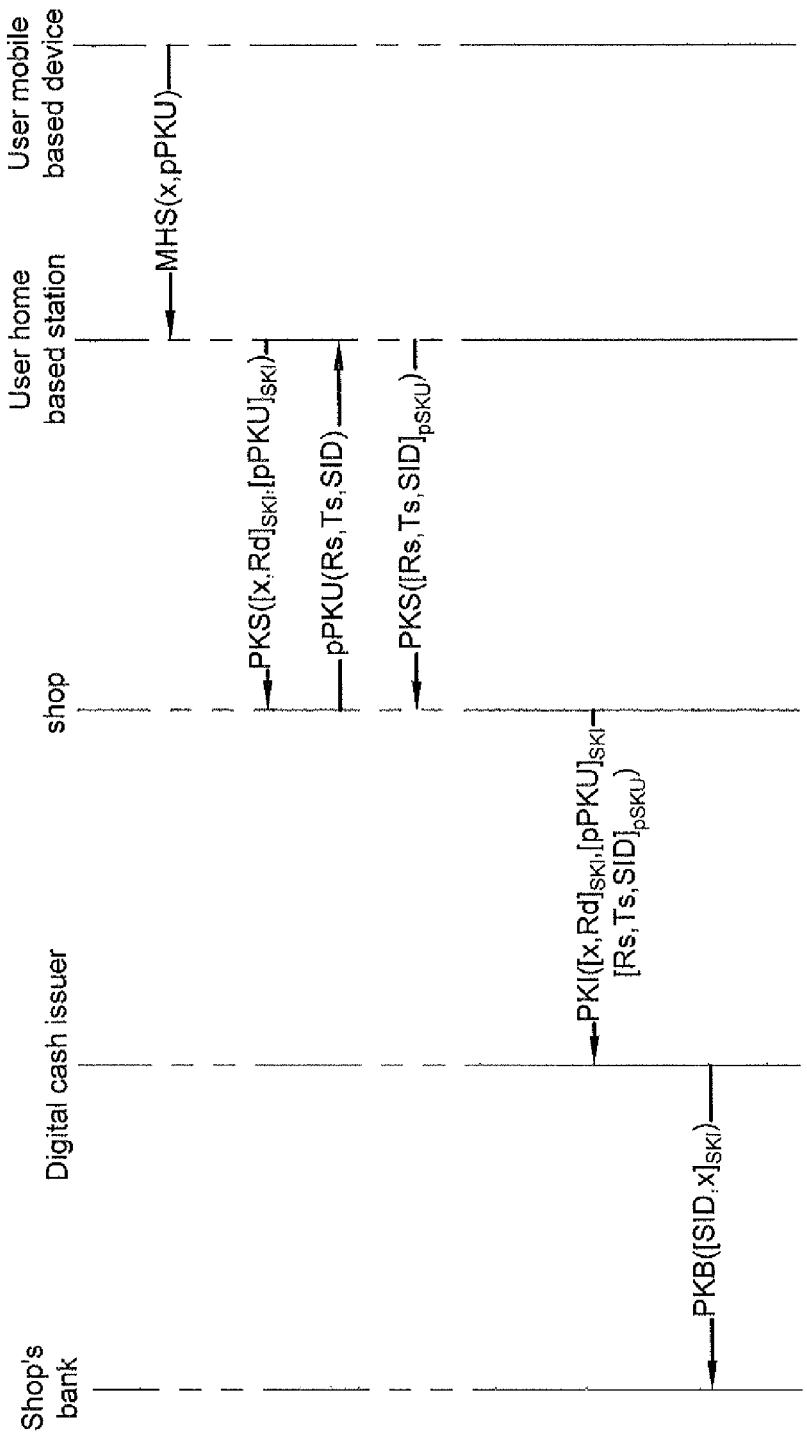
FIG. 37 is an exemplary payment protocol according to the fourth embodiment.

FIG. 37 shows the diagrammatic representation of the payment protocol. The shop comprises a storage device, a signature verifying program encryption program, decryption program, a signature generating program, a random number generating program and a time generating program the shop public key PKS is known to all entities.

Figure 38:
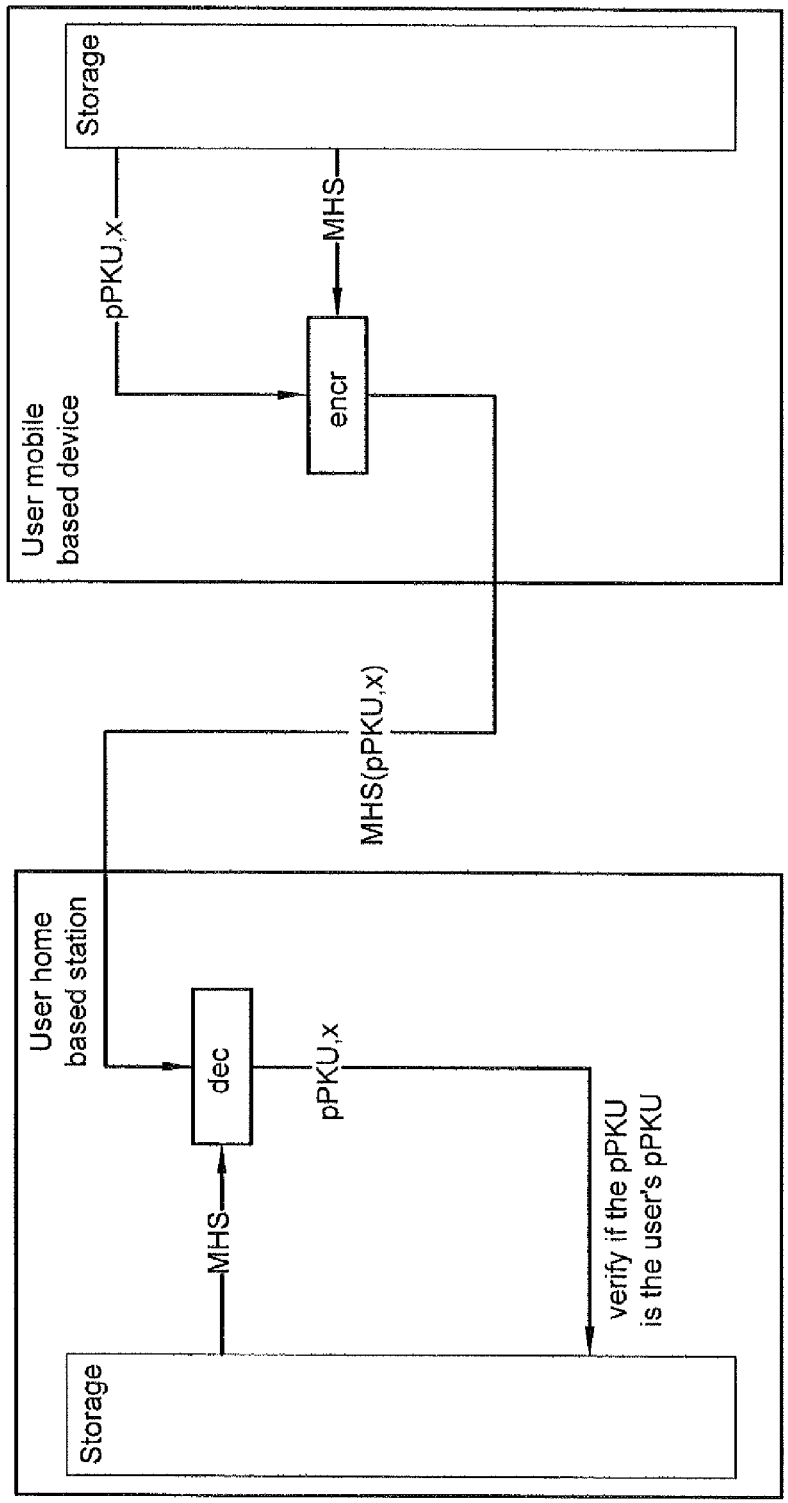
FIG. 38 is an exemplary payment process, part 1, according to the fourth embodiment.

Referring to FIG. 38, the user's mobile-based device chooses the value of the digital cash token x and encrypts it also encrypts the user's pseudonym public key pPKU by encryption program using the mobile-home based shared secret key MHS and sends MHS(pPKU,x) to the user's home based station.

The user's home-based station receives MHS(pPKU,x) and decrypts the information by decryption program using the mobile-home based shared secret key MHS, and match the user's pseudonym public key to authenticate the user's mobile based device, if the user's pseudonym public key is matches, the user's home-based station find the digital cash token that equivalent to the value that is sent by the user's mobile device.

Figure 39:
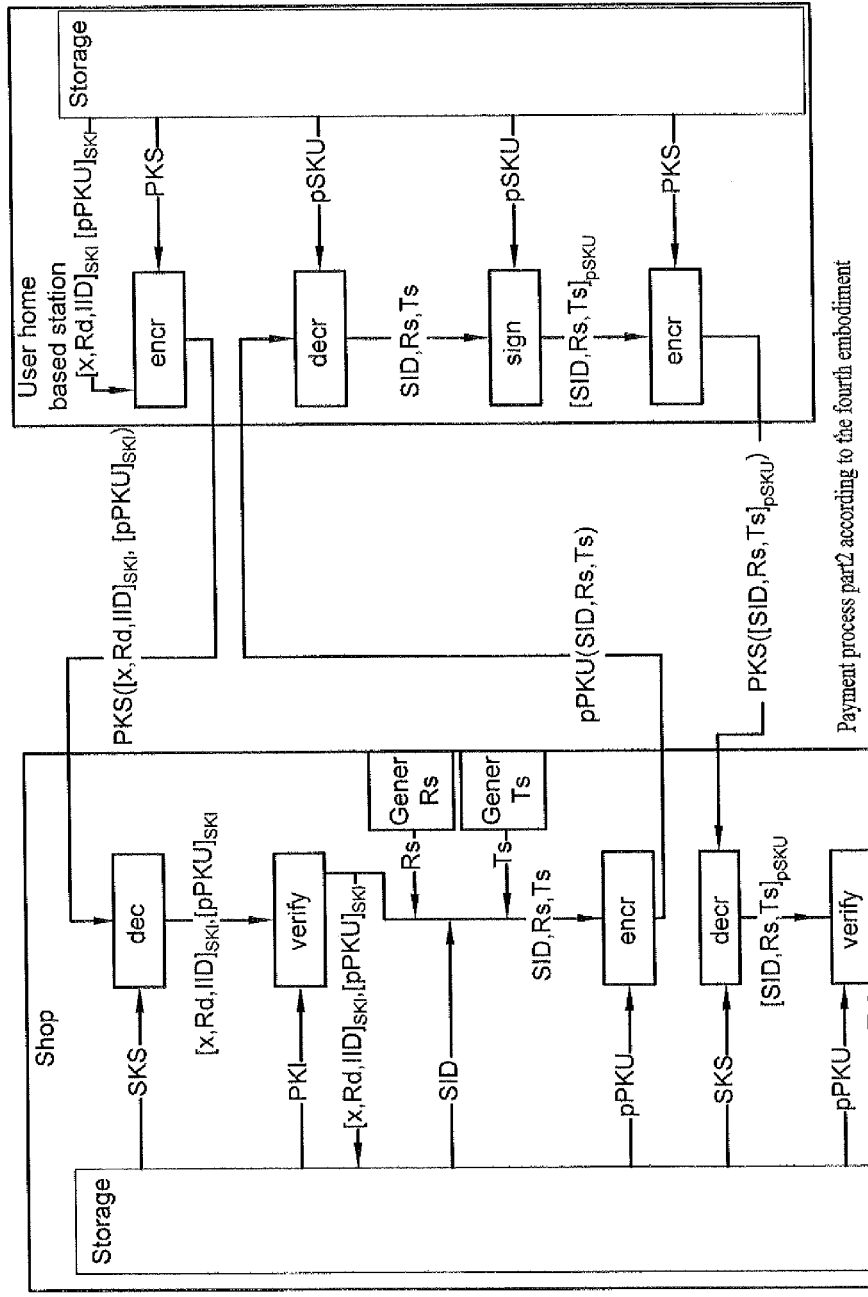
FIG. 39 is an exemplary payment process, part 2, according to the fourth embodiment.

Referring to FIG. 39, the user's home based station encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypts Rs, Ts, and the shop identification SID by encryption program using the user's pseudonym public key pPKU and sends pPKU(Rs,Ts,SID) to the user's home-based station.

The user's home-based station receives pPKU(Rs,Ts,SID) and decrypts it by decryption program using the user's pseudonym secret key pSKU and signs the random number Rs, the time Ts, and the shop identification SID by signature generating program using the user's pseudonym secret key pSKU and encrypts the information by encryption program using the public key of the shop PKS then sends PKS([Rs,Ts,SID]pSKU) to the shop.

The shop receives the information PKS([Rs,Ts,SID]pSKU) and decrypts it by decryption program using the shop's secret key SKS and verifies the signature by signature verifying program using the user's pseudonym public key pPKU if it is valid the shop stores the challenge and the shop regards the payment as valid.

Figure 40:
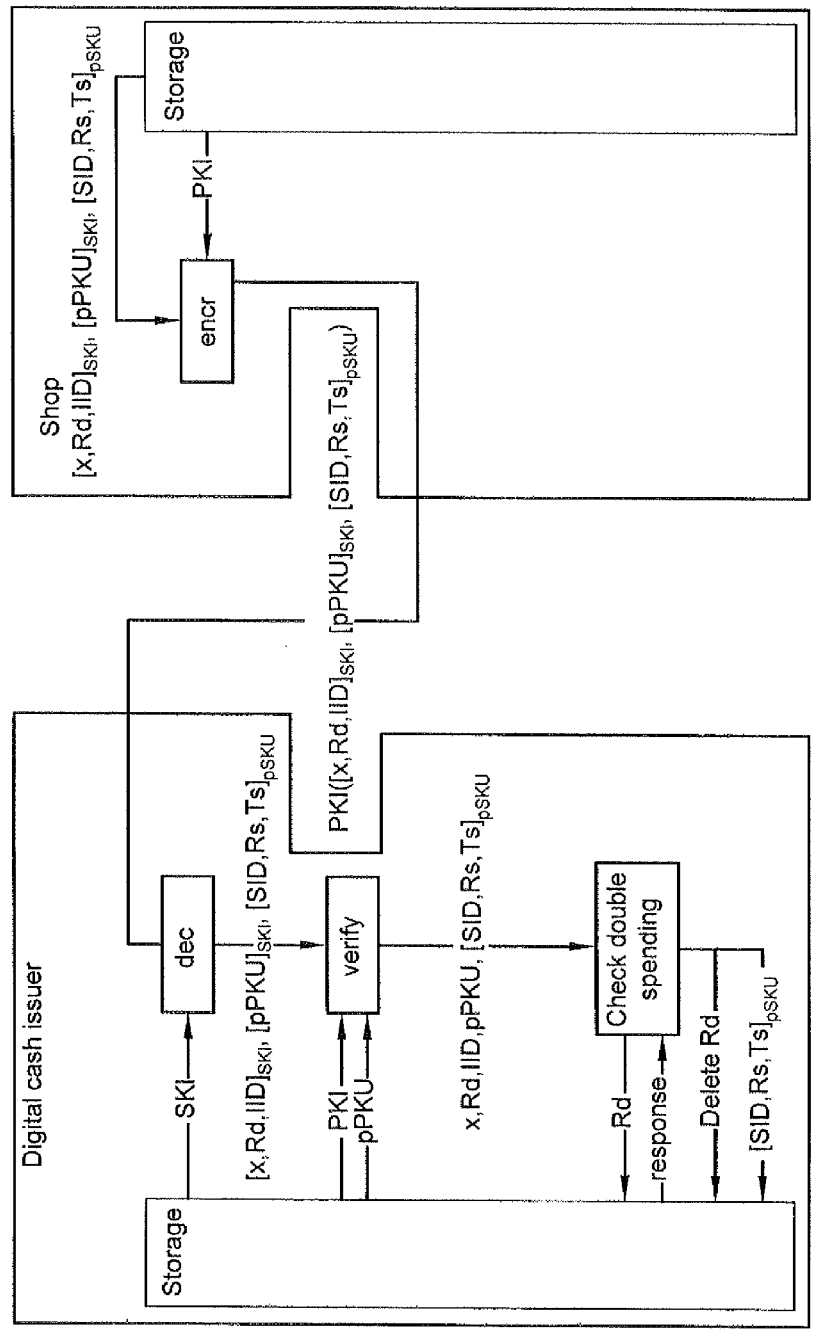
FIG. 40 is an exemplary payment process, part 3, according to the fourth embodiment.

Referring to FIG. 40, after a period of time, the shop encrypts the information that contains the challenge that was signed by the user [Rs,Ts,SID]pSKU, the digital cash token [x,Rd,ID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID]pSKU, [z,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by x then the digital cash issuer stores the challenge [Rs,Ts,SID]pSKU in the storage device.

Figure 41:
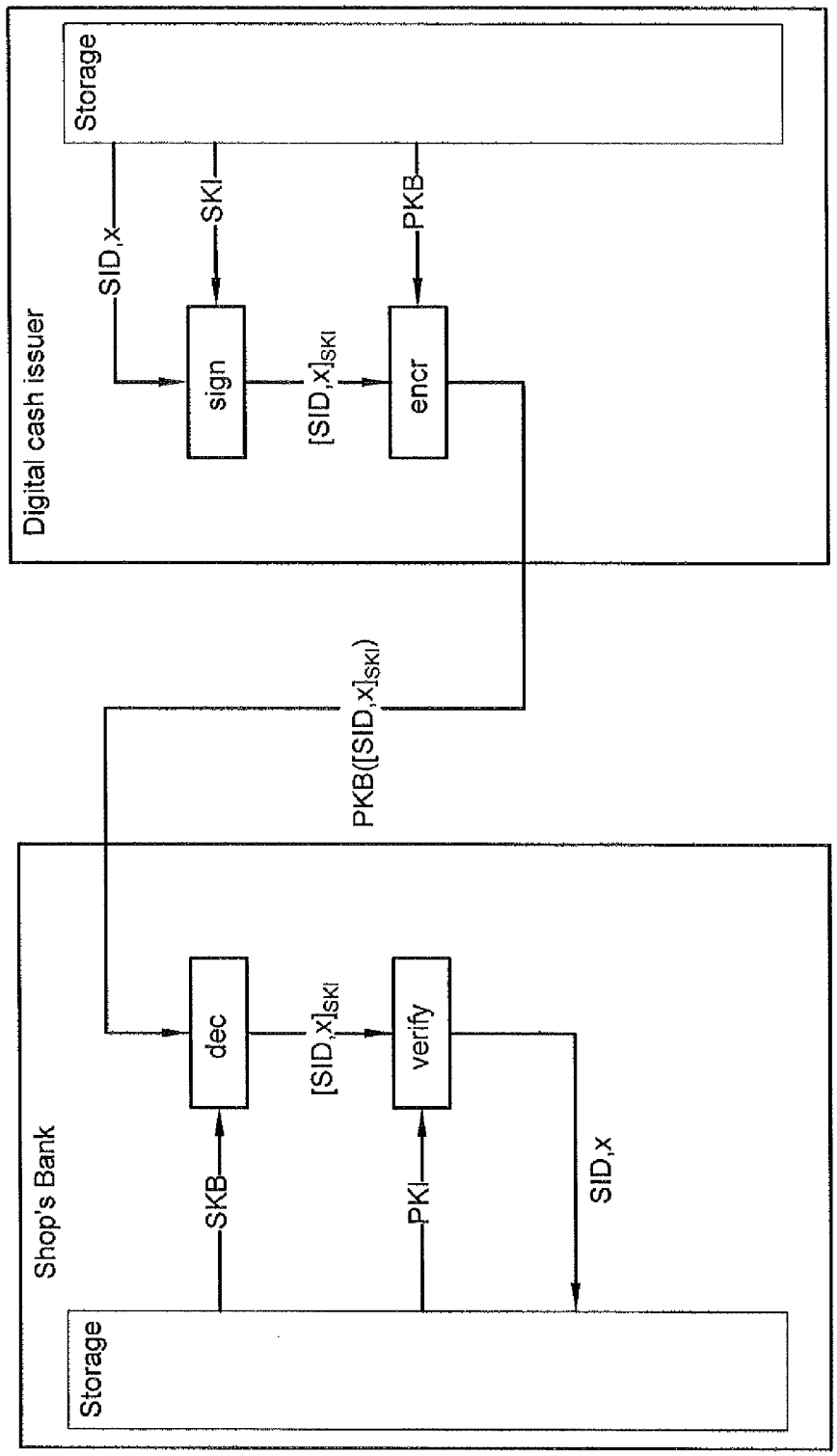
FIG. 41 is an exemplary payment process, part 4, according to the fourth embodiment.

Referring to FIG. 41, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's hank will add x amount of money in the shop account.

Fifth Embodiment

In the fifth embodiment, a mobile-based device is used by the user and the digital cash issuer and the digital cash token can be more than the price of the good.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pFKU]SKC) to the user.

The user receives the encrypted license mPKU([pPKU] SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU] SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU] SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

FIG. 26 shows the diagrammatic representation of the withdrawal protocol. The user's bank comprises a storage device, a signature verifying program encryption program, decryption program and a signature generating program. The bank's public key PKB are known to all entities.

Referring to FIG. 27, the user's mobile device encrypts the user's pseudonym public key pPKU and the amount of digital cash x by encryption program using the mobile-home based shared secret key MHS and sends the information MHS(pPKU,x) to the user's home based station.

The user's home-based station receives the encrypted user's pseudonym public key and the amount of digital cash MHS(pPKU,x) and decrypts the information by decryption program using the mobile-home based shared secret key MHS and matches the user's pseudonym public key if they are equal the user's mobile device is authenticated by the user's home based then, referring to FIG. 28, the user's home-based station blinds the amount of digital cash x using any proposed blinding signature scheme then signs the blinded amount of digital cash Blind{x}, the user real identification UID, the amount of money to be withdrawn x, by the signature generating program using the user's master secret key mSKU and encrypts the information by encryption program using the public key of the user's bank PKB then sends PKB([Blind{x},UID,x]mSKU) to the user's bank.

The user's bank decrypts PKB([Blind{x}UID,x]mSKU) by decryption program using the user's bank's secret key SKB and verifies the validity of the signature for authentication by the signature verifying program using the master public key of the user mPKU, if it is valid withdraw the amount of money x from the user account and signs the blinded information and the amount of digital cash amount Blind(info,x), which is created by the cooperation between the user's bank and the user's home based station using any proposed blind signature scheme, by the signature generating program using the bank's secret key SKB, then encrypts [Blind{info,x}]SKB by encryption program using the master public key of the user mPKU then sends mPKU ([BLIND{info,x}]SKB) to the user's home based station.

The user's home-based station receives mPKU ([BLIND{info,x}]SKB) and decrypts it by decryption program using the user's master secret key mSKU, then unblind the signed blinded information and the amount of digital cash using any proposed blind signature scheme, then the user's home based station verifies the validity of the bank's signature by signature verifying program using the public key of the user's bank PKB if it is valid the user's home based station stores the signed information and the amount of digital cash [info,x]SKB as a check in the storage device.

Referring to FIG. 29, the user's home based station signs the check [info,x]SKB and the user's pseudonym public key pPKU by signature generating program using the user's pseudonym secret key pSKU and then encrypts [[info,x]SKB,pPKU]pSKU by encryption program using the digital cash issuer's public key PKI and send PKI([[info,x]SKB,pPKU]pSKU) to the digital cash issuer.

The digital cash issuer receives PKI([[info,x]SKB,pPKU]pSKU), then decrypts the information by decryption program using the digital cash issuer's secret key SKI and verifies the signature of the user, for authentication, by signature verifying program using the user's pseudonym public key pPKU if it is valid the digital cash issuer verifies the signature of the bank [info,x]SKB by signature generating program using the public key of the user's bank PKB if it valid, the digital cash issuer sign the check [info,x]SKB by signature generating program using the digital cash issuer's secret key SKI and encrypts [[info,x]SKB]SKI by encryption program using the public key of the user's bank PKB then sends PKB([[info,x]SKI]SKI) to the user's bank.

Referring to FIG. 30, the user's bank receives PKB([[info,x]SKB]SKI) and decrypts the information by decryption program using the secret key of the user's bank then verifies the signature of the digital cash issuer signature by signature verifying program using the digital cash issuer's public key PKI if it is valid verifies the signature of the user's bank by signature verifying program using the public key of the user's bank if it is valid, the bank checks if the check [info,x]SKB was used if it was not used the user's bank stores the check in the storage device and signs the check [info,x]SKB by signature generating program using the secret key of the user's bank SKB then encrypts [[info,x]SKB]SKB by encryption program using the digital cash issuer's public key PKI then sends PKI([[info,x]SKB]SKB) to the digital cash issuer.

Referring to FIG. 31, the digital cash issuer receives PKI([[info,x]SKB]SKB) and decrypts the information by decryption program using the digital cash issuer's secret key SKI then verify the signature of the user's bank twice if they are valid, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then sends pPKU([pPKU,x]SKI) to the user's home based station.

The user's home-based station receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user's home based station.

Referring to FIG. 32, the user's home-based machine encrypts the value of the new cumulative amount of digital cash x and the user's pseudonym public key pPKU by encryption program using the mobile-home based shared secret key MHS and sends MHS(pPKU,x) to the user's mobile based device.

The user's mobile-based device receives the encrypted value of the new cumulative amount of digital cash and the user's pseudonym public key MHS(pPKU,x) decrypts the information by decryption program using the mobile-home based shared secret key MHS and match the user's pseudonym public key to authenticate the user's home based station is the user's pseudonym public key matches the user stores the new cumulative amount of digital cash in the storage device of the user's mobile-based device.

(3) Withdrawal Digital Cash Token Procedure (Electronic Cash Issuing Procedure)

FIG. 33 shows the diagrammatic representation of the digital cash token withdrawal protocol. Referring to FIG. 34, the user's mobile device encrypts the user's pseudonym public key pPKU and the amount of digital cash x by encryption program using the mobile-home based shared secret key MHS and sends the information MES(pPKU,x) to the user's home based station.

The user's home-based station receives the encrypted user's pseudonym public key and the amount of digital cash MHS(pPKU,x) and decrypts the information by decryption program using the mobile-home based shared secret key MHS and matches the user's pseudonym public key if they are equal the user's mobile device is authenticated by the user's home based then referring to FIG. 35, the user's home based station signs the user's pseudonym public key pPKU and the amount of digital cash x by the signature generating program using the user's pseudonym secret key pSKU then encrypts the signed user's pseudonym public key and the amount of digital cash [pPKU,x]pSKIII by encryption program using the digital cash issuer's public key PKI, and then sends PKI([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x,Rd,IID]SKI) to the user's home based station.

The user's home based station receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user's home based station stores the digital cash token [x,Rd,IID]SKI and the cumulative amount of digital cash is decremented by the amount of the digital cash token x then stores the new cumulative amount of digital cash in the storage device by the user.

Referring to FIG. 36, the user's home-based machine encrypts the value of the digital cash token x, the new cumulative amount of digital cash z and the user's pseudonym public key pPKU by encryption program using the mobile-home based shared secret key MHS and sends MHS(pPKU,z,x) to the user's mobile based device.

The user's mobile-based device receives the encrypted value of the digital cash token, the new cumulative amount of digital cash z and the user's pseudonym public key MHS (pPKU,z,x) decrypts the information by decryption program using the mobile-home based shared secret key MHS and match the user's pseudonym public key to authenticate the user's home based station if the user's pseudonym public key matches the user stores the value of digital cash token and the new cumulative amount of digital cash in the storage device of the user's mobile based device. The user can easily transfer the issued digital cash token to another user who has certified pseudonym public key.

Figure 42:
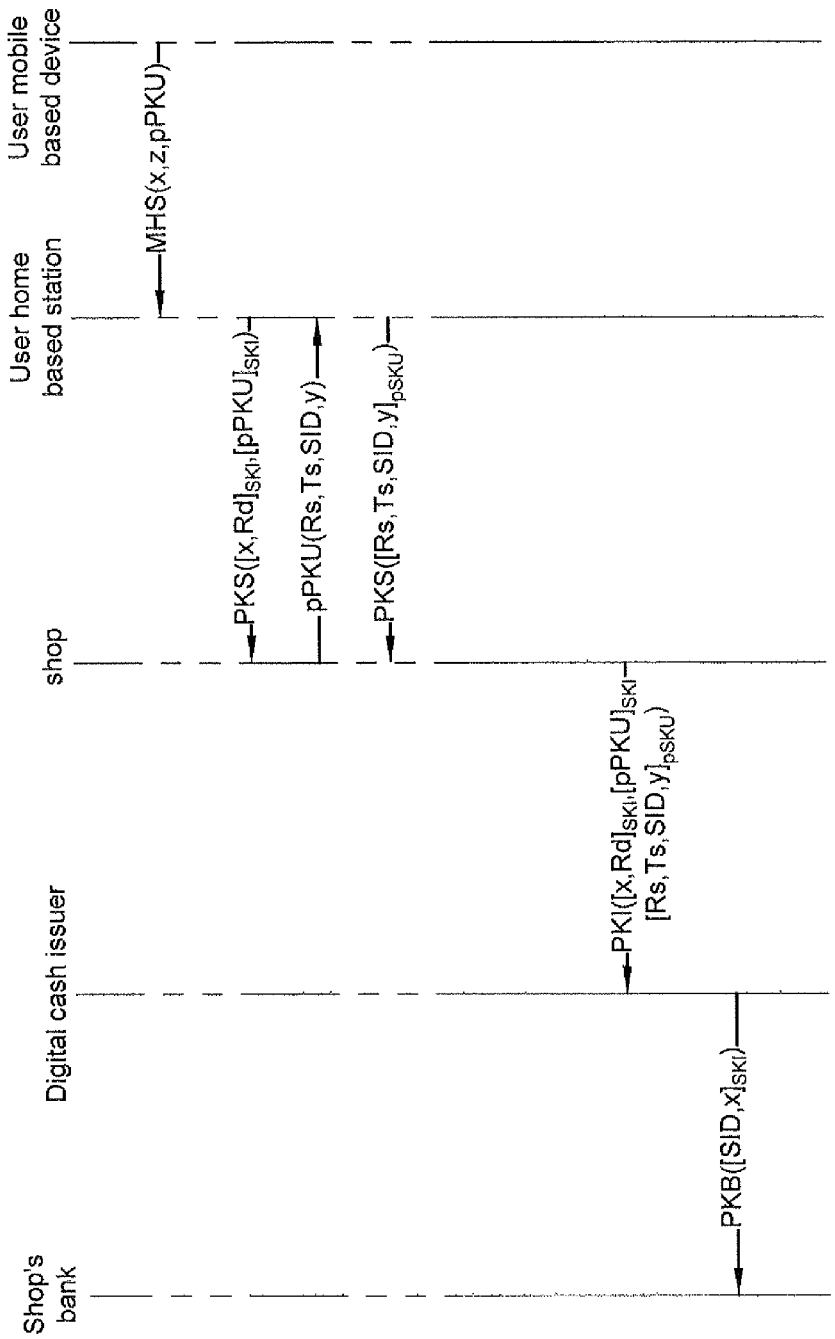
FIG. 42 is an exemplary payment protocol according to a fifth embodiment of virtual account and token-based digital cash protocols according to the present invention.

FIG. 42 shows the diagrammatic representation of the payment protocol. The shop comprises a storage device, a signature verifying program encryption program, decryption program, a signature generating program, a random number generating program and a time generating program the shop public key PKS is known to all entities.

Figure 43:
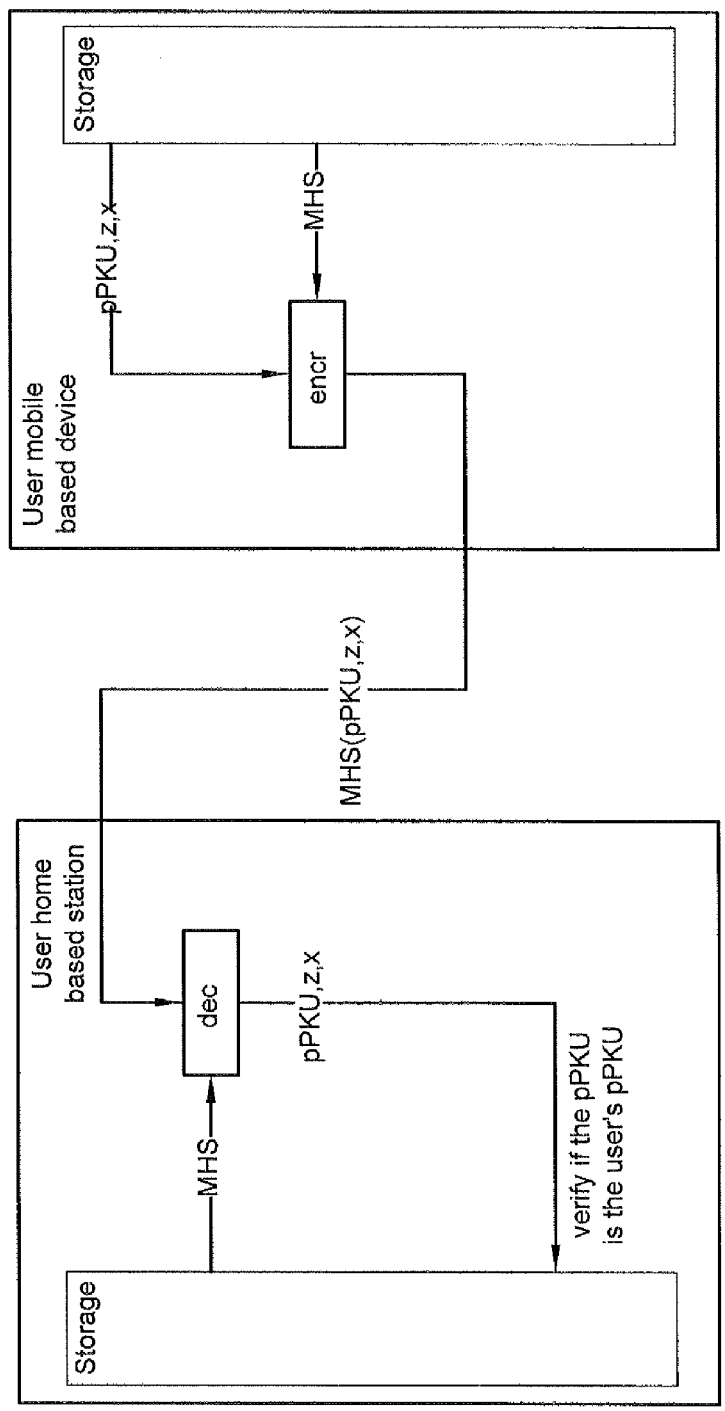
FIG. 43 is an exemplary payment process, part 1, according to the fifth embodiment.

Referring to FIG. 43, the user's mobile-based device chooses the value of the digital cash token x and encrypts it also encrypts the user's pseudonym public key pPKU and the price of the good z by encryption program using the mobile-home based shared secret key MHS and sends MHS(pPKU,z,x) to the user's home based station.

The user's home-based station receives MHS(pPKU,z,x) and decrypts the information by decryption program using the mobile-home based shared secret key MHS, and match the user's pseudonym public key to authenticate the user's mobile based device, if the user's pseudonym public key is matches, the user's home based station find the digital cash token that equivalent to the value that is sent by the user's mobile device.

Figure 44:
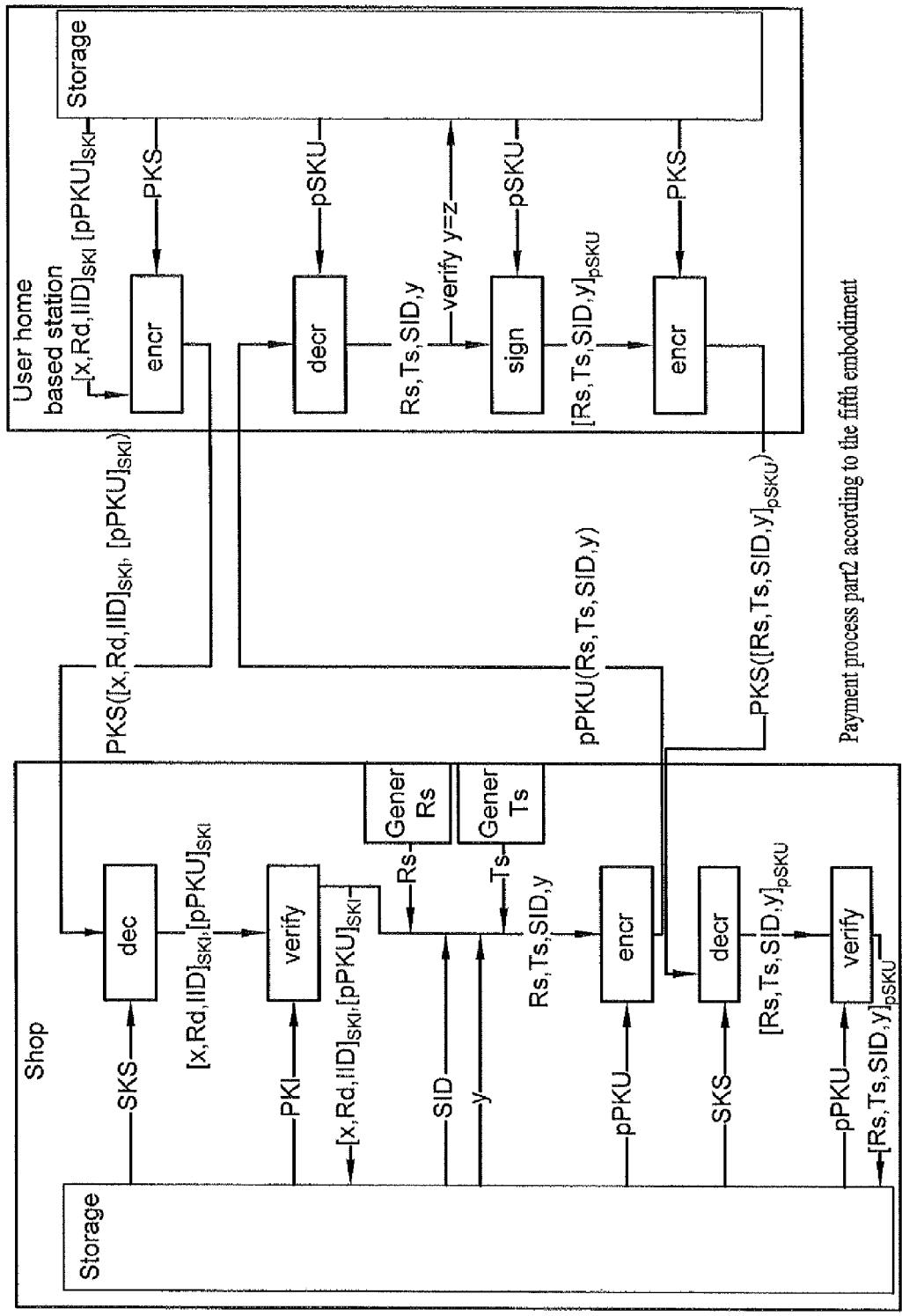
FIG. 44 is an exemplary payment process, part 2, according to the fifth embodiment.

Referring to FIG. 44, the user's home-based station encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, the shop identification SID and the price of the good y by encryption program using the user's pseudonym public key pPKU and sends pPKU(Rs,Ts,SID,y) to the user's home based station.

The user's home-based station receives pPKU(Rs,Ts,SID,y) and decrypts it by decryption program using the user's pseudonym secret key pSKU and verify the equality of the price of the good y and z, if they are equal, signs the random number Rs, the time Ts, the shop identification SID and the price of the good y by signature generating program using the user's pseudonym secret key pSKU and encrypts the information by encryption program using the public key of the shop PKS then sends PKS([Rs,Ts,SID,y]pSKU) to the shop.

The shop receives the information PKS([Rs,Ts,SID,y]pSKU) and decrypts it by decryption program using the shop's secret key SKS and verifies the signature by signature verifying program using the user's pseudonym public key pPKU if it is valid the shop stores the challenge and the shop regards the payment as valid.

Figure 45:
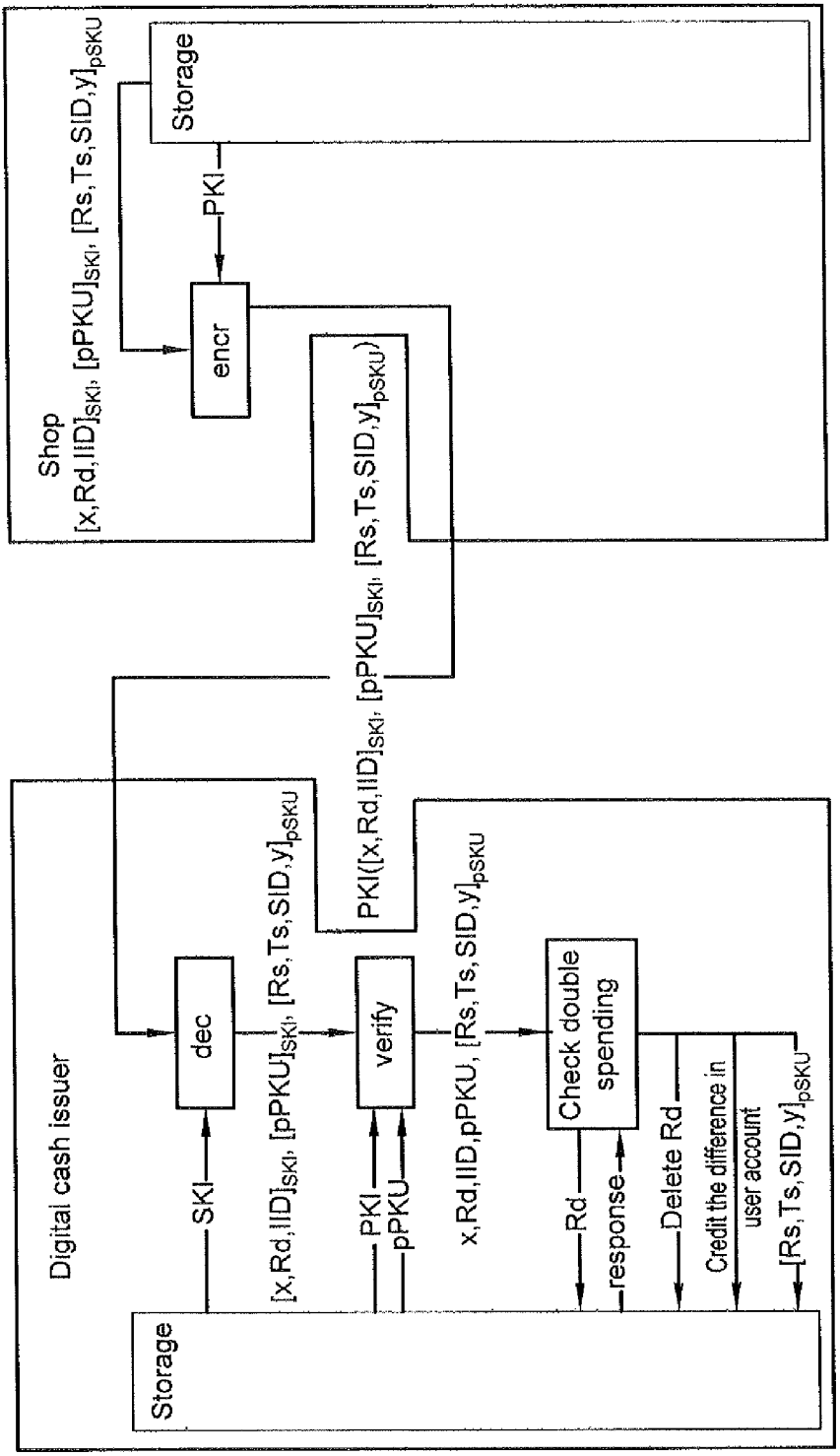
FIG. 45 is an exemplary payment process, part 3, according to the fifth embodiment.

Referring to FIG. 45, after a period of time, the shop encrypts the information that contains the challenge that was signed by the user [Rs,Ts,SID,y]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID,y]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU in the storage device.

Figure 46:
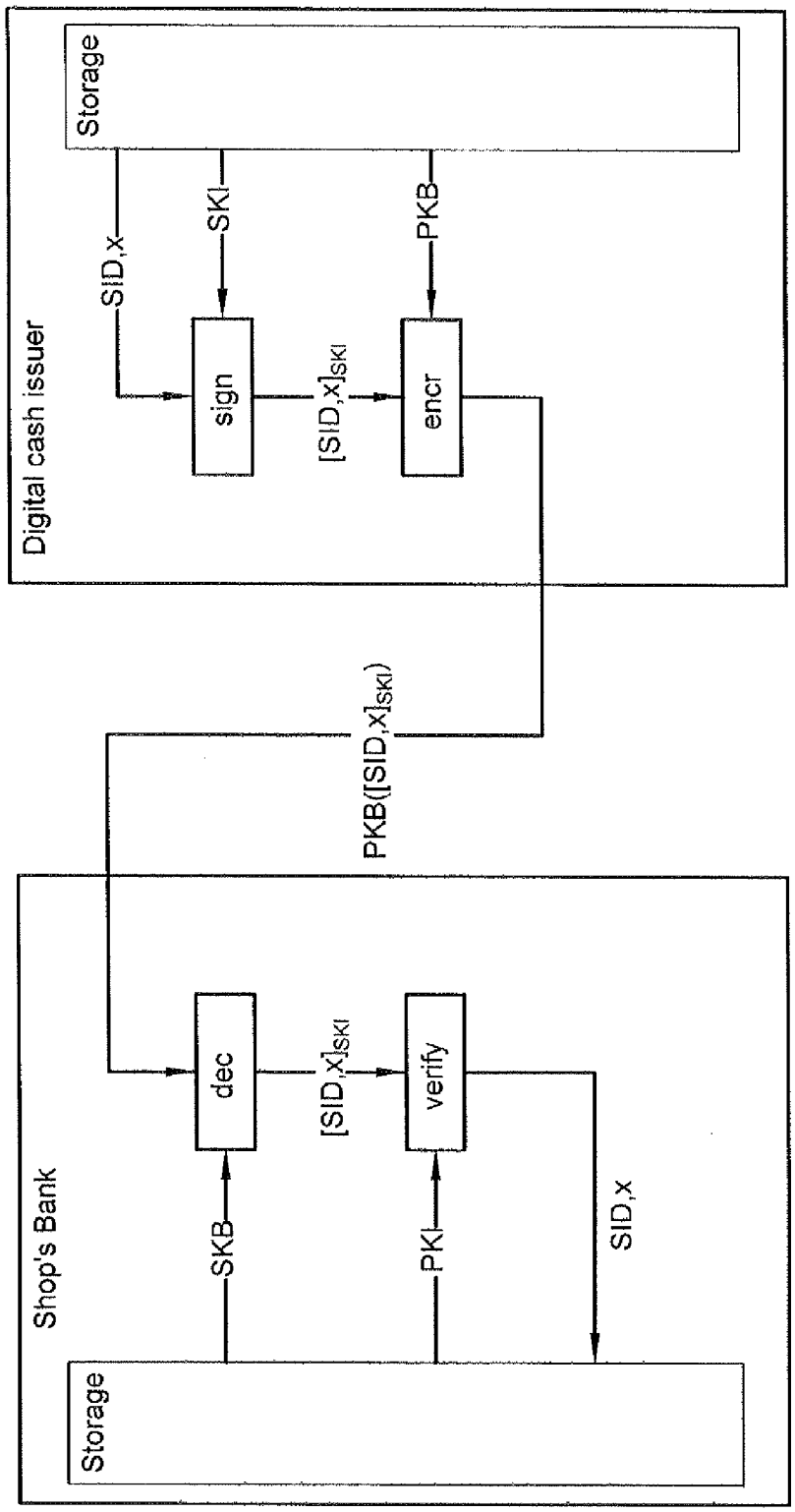
FIG. 46 is an exemplary payment process, part 4, according to the fifth embodiment.

Referring to FIG. 46, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Generating program using the user's pseudonym secret key pSKU and encrypts the information by encryption program using the public key of the shop PKS then sends PKS([Rs,Ts,SID,y]pSKU) to the shop.

The shop receives the information PKS([Rs,Ts,SID,y]pSKU) and decrypts it by decryption program using the shop's secret key SKS and verifies the signature by signature verifying program using the user's pseudonym public key pPKU if it is valid the shop stores the challenge and the shop regards the payment as valid.

Referring to FIG. 45, after a period of time, the shop encrypts the information that contains the challenge that was signed by the user [Rs,Ts,SID,y]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID,y]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer cheek the Rd if the random number Rd does not exist, this mean there is double spending and the real identity will be revealed by sending the user's pseudonym public key pPKU to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU in the storage device.

Referring to FIG. 46, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Sixth Embodiment

In the sixth embodiment, a mobile-based device is used by the user, the digital cash token can be more than the price of the good and the user can transfer digital cash between two virtual account opened by different digital cash issuer also to divide digital cash token in smaller tokens as needed.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer1 and the issuer2 comprises a storage device, an encryption program, a decryption program, a signature generating program, a signature verifying program, and a random number generating program. The public key PKI1 and PKI2 is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU1]mSKU by encryption program using the public key of the certificate authority and sends PKC([UID,pPKU1]mSKU) to the certificate authority as a request for certified pseudonym public key (a request for the issuance of a license).

The certificate authority receives the request (PKC([UID, pPKU1]mSKU)) then decrypts it by decryption program using the secret key of the certificate authority SKC and verifies the validity of the user signature by the signature verifying program using the user's master public key mPKU. If it is valid the certificate authority generates a signature (license) [pPKU1]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU1]SKC by encryption program using the user's master public key mPKU then sends mPKU([pPKU1]SKC) to the user.

The user receives the encrypted license in PKU([pPKU1] SKC) then decrypts it by decryption program using the user's master secret key mSKU then verifies the validity of the license [pPKU1]SKC by the signature verifying program using the public key of the certificate authority PKC, if it is valid stores the license in the storage device.

Referring to FIG. 7, the user encrypts the license [pPKU1] SKC, pseudonym public key pPKU1 by the encryption program using the public key of the digital cash issuer1 PKI1 then sends PKI1([pPKU1]SKC,pPKU1) to the digital cash issuer1 as a request for registration in the digital cash issuer1 and for the digital cash issuer license.

The digital cash issuer1 receives PKI([pPKU1]SKC, pPKU1) and decrypts this information by decryption program using the secret key of the digital cash issuer1 SKI1. The digital cash issuer1 searches for pPKU1 in the storage, this will prevents the uses of other users' pseudonym public key, if this user's pseudonym public key pPKU1 is not already registered the digital cash issuer verifies the validity of the license [pPKU1]SKC by the signature verifying program using the certificate authority's public key PKC, if it is valid the digital cash issuer1 sets an empty space storage to the user and stores the user's pseudonym public key pPKU1 in the storage device. The digital cash issuer1 signs the user's pseudonym public key pPKU1 by the signature generating program using the secret key of the digital cash issuer1 SKI1 and encrypts the information by encryption program using the user's pseudonym public key pPKU1 then sends pPKU1 ([pPKU1]SKI1) as a license to the user.

The user receives pPKU1([pPKU1]SKI1), and decrypts this information by the decryption program using the user's pseudonym secret key pSKU1 then verifies the validity of the digital cash issuer signature by the signature verifying program using the digital cash issuer1's public key PKI1 if it is valid, store the license [pPKU1]SKI1 in the storage device.

The user registers using a second pseudonym public key pPKU2 with the second digital cash issuer2 by the same procedures described above.

FIG. 26 shows the diagrammatic representation of the withdrawal protocol. The user's bank comprises a storage device, a signature verifying program encryption program, decryption program and a signature generating program. The bank's public key PKB are known to all entities. Referring to FIG. 27, The user's mobile device encrypts the user's pseudonym public key pPKU1 and the amount of digital cash x by encryption program using the mobile-home based shared secret key MHS and sends the information MHS(pPKU1,x) to the user's home based station.

The user's home-based station receives the encrypted user's pseudonym public key and the amount of digital cash MHS(pPKU1,x) and decrypts the information by decryption program using the mobile-home based shared secret key MHS and matches the user's pseudonym public key if they are equal the user's mobile device is authenticated by the user's home based then, referring to FIG. 28, the user's home based station blind the amount of digital cash x using any proposed blinding signature scheme then signs the blinded amount of digital cash Blind{x}, the user real identification UID, the amount of money to be withdrawn x, by the signature generating program using the user's master secret key mSKU and encrypts the information by encryption program using the public key of the user's bank PKB then sends PKB([Blind{x},UID,x]mSKU) to the user's bank.

The user's bank decrypts PKB([Blind{x},UID,x]mSKU) by decryption program using the user's bank's secret key SKB and verifies the validity of the signature for authentication by the signature verifying program using the master public key of the user mPKU, if it is valid withdraw the amount of money x from the user account and signs the blinded information and the amount of digital cash amount Blind(info,x), which is created by the cooperation between the user's bank and the user's home based station using any proposed blind signature scheme, by the signature generating program using the bank's secret key SKB, then encrypts [Blind{info,x}]SKB by encryption program using the master public key of the user mPKU then sends mPKU ([BLIND{info,x}]SKB) to the user's home based station.

The user's home-based station receives mPKU ([BLIND{info,x}]SKB) and decrypts it by decryption program using the user's master secret key mSKU, then unblind the signed blinded information and the amount of digital cash using any proposed blind signature scheme, then the user's home based station verifies the validity of the bank's signature by signature verifying program using the public key of the user's bank PKB if it is valid the user's home based station stores the signed information and the amount of digital cash [info,x]SKB as a check in the storage device.

Referring to FIG. 29, the user's home-based station signs the check [info,x]SKB and the user's pseudonym public key pPKU1 by signature generating program using the user's pseudonym secret key pSKU1 and then encrypts [[info,x] SKB,pPKU1]pSKU1 by encryption program using the digital cash issuer public key PKI1 and send PKI1([[info,x]SKB, pPKU1]pSKU1) to the digital cash issuer1.

The digital cash issuer1 receives PKI1([[info,x]SKB, pPKU1]pSKU1), then decrypts the information by decryption program using the digital cash issuer1's secret key SKI1 and verifies the signature of the user, for authentication, by signature verifying program using the user's pseudonym public key pPKU1 if it is valid the digital cash issuer1 verifies the signature of the bank [info,x]SKB by signature generating program using the public key of the user's bank PKB if it valid, the digital cash issuer1 sign the check [info,x]SKB by signature generating program using the digital cash issuer1's secret key SKI1 and encrypts [[info,x]SKB]SKI1 by encryption program using the public key of the user's bank PKB then sends PKB([[info,x]SKB]SKI1) to the user's bank.

Referring to FIG. 30, the user's bank receives PKB([[info, x]SKB]SKI1) and decrypts the information by decryption program using the secret key of the user's bank then verifies the signature of the digital cash issuer1 signature by signature verifying program using the digital cash issuer1's public key PKI1 if it is valid verifies the signature of the user's bank by signature verifying program using the public key of the user's bank if it is valid, the bank checks if the check [info,x]SKB was used if it was not used the user's bank stores the check in the storage device and signs the check [info,x]SKB by signature generating program using the secret key of the user's bank SKB then encrypts [[info,x]SKB]SKB by encryption program using the digital cash issuer1's public key PKI1 then sends PKI1([[info,x]SKB]SKB) to the digital cash issuer1.

Referring to FIG. 31, the digital cash issuer1 receives PKI1 ([[info,x]SKB]SKB) and decrypts the information by decryption program using the digital cash issuer1's secret key SKI1 then verify the signature of the user's bank twice if they are valid, the digital cash issuer1 will increments the user's virtual account by the amount x of digital cash, then signs the pseudonym public key pPKU1, digital cash amount x, by the signature generating program using the digital cash issuer1's secret key SKI1 then encrypts the signed pseudonym public key and the amount of the digital cash [pPKU1,x]SKI1 by encryption program using the user's pseudonym public key pPKU1 then sends pPKU1([pPKU1,x]SKI1) to the user's home based station.

The user's home-based station receives pPKU1([pPKU1, x]SKI1), then decrypts the information by the decryption program using the user's pseudonym secret key then verifies the validity of the digital cash issuer1 signature by the signature verifying program with the digital cash issuer1's public key PKI1. If the signature is valid, the cumulative amount of digital cash is incremented by the amount of digital cash x then stores the new cumulative amount of digital cash in the storage device by the user's home based station.

Referring to FIG. 32, the user's home-based machine encrypts the value of the new cumulative amount of digital cash x and the user's pseudonym public key pPKU1 by encryption program using the mobile-home based shared secret key MHS and sends MHS(pPKU1,x) to the user's mobile based device.

The user's mobile-based device receives the encrypted value of the new cumulative amount of digital cash and the user's pseudonym public key MHS(pPKU1,x) decrypts the information by decryption program using the mobile-home based shared secret key MHS and match the user's pseudonym public key to authenticate the user's home based station if the user's pseudonym public key matches the user stores the new cumulative amount of digital cash in the storage device of the user's mobile-based device.

FIG. 33 shows the diagrammatic representation of the digital cash token withdrawal protocol. Referring to FIG. 34, the user's mobile device encrypts the user's pseudonym public key pPKU1 and the amount of digital cash x by encryption program using the mobile-home based shared secret key MHS and sends the information MHS(pPKU1,x) to the user's home based station.

The user's home-based station receives the encrypted user's pseudonym public key and the amount of digital cash MHS(pPKU1,x) and decrypts the information by decryption program using the mobile-home based shared secret key MHS and matches the user's pseudonym public key if they are equal the user's mobile device is authenticated by the user's home based, then, referring to FIG. 35, the user's home-based station signs the user's pseudonym public key pPKU1 and the amount of digital cash x by the signature generating program using the user's pseudonym secret key pSKU1 then encrypts the signed user's pseudonym public key and the amount of digital cash [pPKU1,x]pSKU1 by encryption program using the digital cash issuer1's public key PKI1, and then sends PKI1([pPKU1,x]pSKU1) to the digital cash issuer1.

The digital cash issuer1 receives PKI1([pPKU1,x] pSKU1), then decrypts PKI1([pPKU1,x]pSKU1) by decryption program using the digital cash issuer1's secret key and verifies the signature of the user by signature verifying program using the user's pseudonym public key pPKU1, to authenticate the user, if it is valid, the digital cash issuer will issues digital cash token which contains the following information: (i) digital cash amount, (ii) random number, (iii) the issuer identity, the digital cash issuer1 generates random number Rd and stores it in the storage device, then signs digital cash amount x, random number Rd and the issuer identity IID1 by signature generating program using the digital cash issuer1's secret key SKI1 and encrypts the information by encryption program using the user's pseudonym public key pPKU1 then decrements the user's virtual account by x then sends pPKU1([x,Rd,IID1]SKI1) to the user's home based station.

The user's home-based station receives pPKU1([x,Rd, IID1]SKI1), then decrypts the information by the decryption program using the user's pseudonym secret key then verifies the validity of the digital cash issuer1 signature by the signature verifying program with the digital cash issuer1's public key PKI1. If the signature is valid, the user's home based station stores the digital cash token [x,Rd,IID1]SKI1 and the cumulative amount of digital cash is decremented by the amount of the digital cash token x then stores the new cumulative amount of digital cash in the storage device by the user's home based station.

Referring to FIG. 36, the user's home-based machine encrypts the value of the digital cash token x, the new cumulative amount of digital cash z and the user's pseudonym public key pPKU by encryption program using the mobile-home based shared secret key MHS and sends MHS(pPKU, z,x) to the user's mobile-based device.

The user's mobile-based device receives the encrypted value of the digital cash token, the new cumulative amount of digital cash z and the user's pseudonym public key MHS (pPKU,z,x) decrypts the information by decryption program using the mobile-home based shared secret key MHS and match the user's pseudonym public key to authenticate the user's home based station if the user's pseudonym public key matches the user stores the value of digital cash token and the new cumulative amount of digital cash in the storage device of the user's mobile based device.

The user can easily transfer the issued digital cash token to another user who has certified pseudonym public key.

Figure 47:
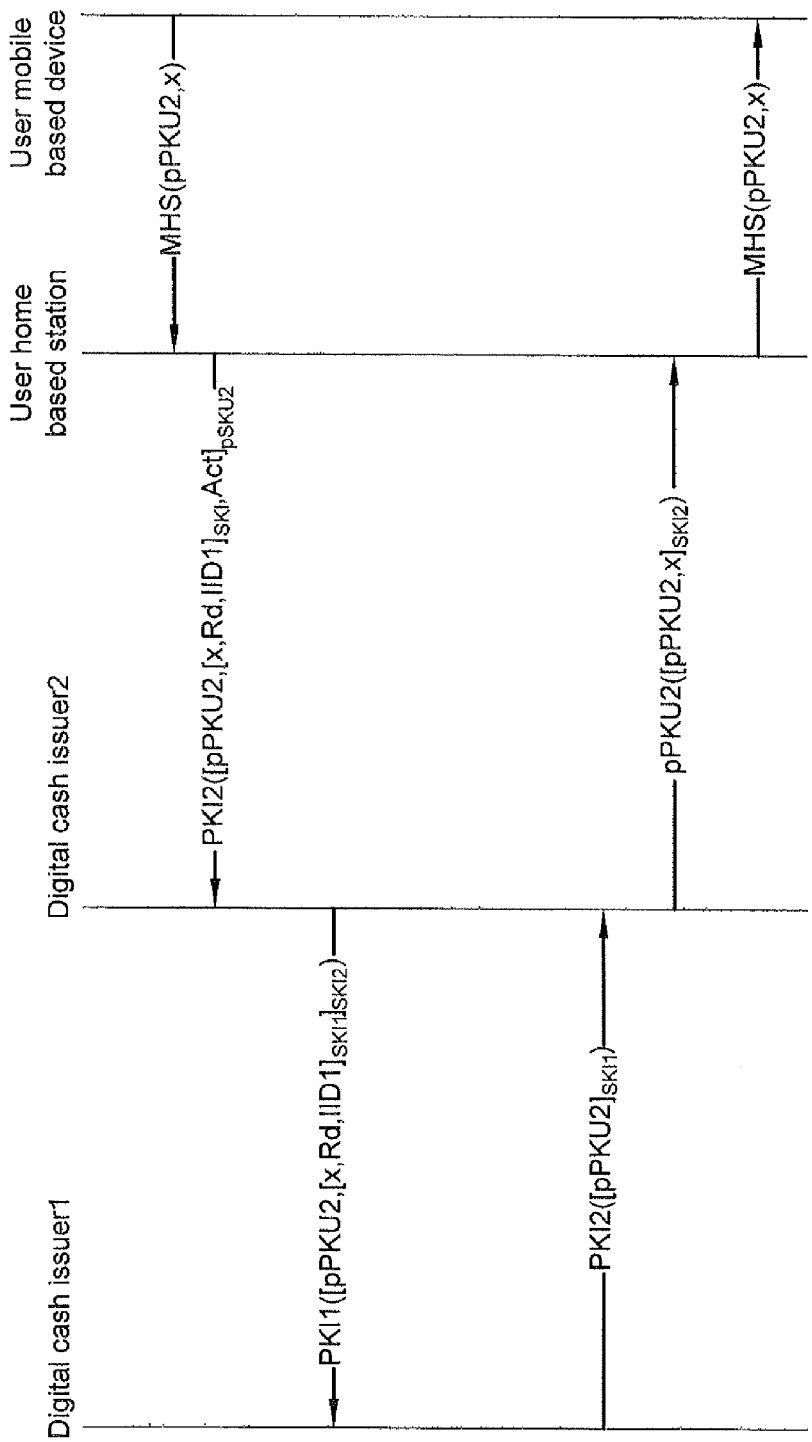
FIG. 47 is an exemplary transferring protocol according to a sixth embodiment of virtual account and token-based digital cash protocols according to the present invention.
Figure 49:
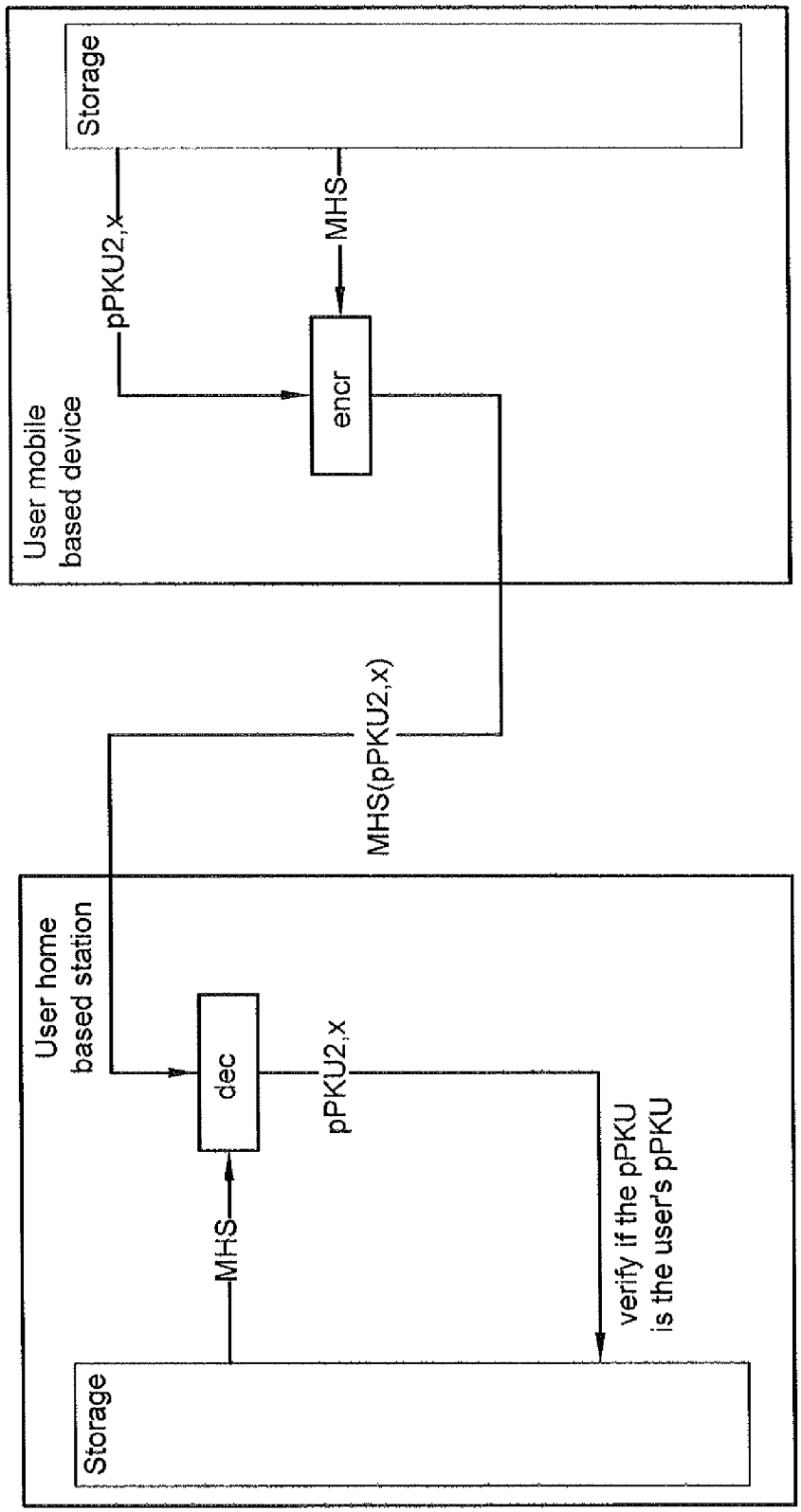
FIG. 49 is an exemplary transferring process, part 1, according to the sixth embodiment.

FIG. 47 shows the diagrammatic representation of the transferring protocol. Referring to FIG. 49, the user's mobile-based device chooses the value of the digital cash token x and encrypts it also encrypts the user's pseudonym public key pPKU2 by encryption program using the mobile-home based shared secret key MHS and sends MHS(pPKU2,x) to the user's home based station.

The user's home-based station receives MHS(pPKU2,x) and decrypts the information by decryption program using the mobile-home based shared secret key MHS, and match the user's pseudonym public key to authenticate the user's mobile based device, if the user's pseudonym public key is matches, the user's home-based station find the digital cash token that equivalent to the value that is sent by the user's mobile device.

Figure 50:
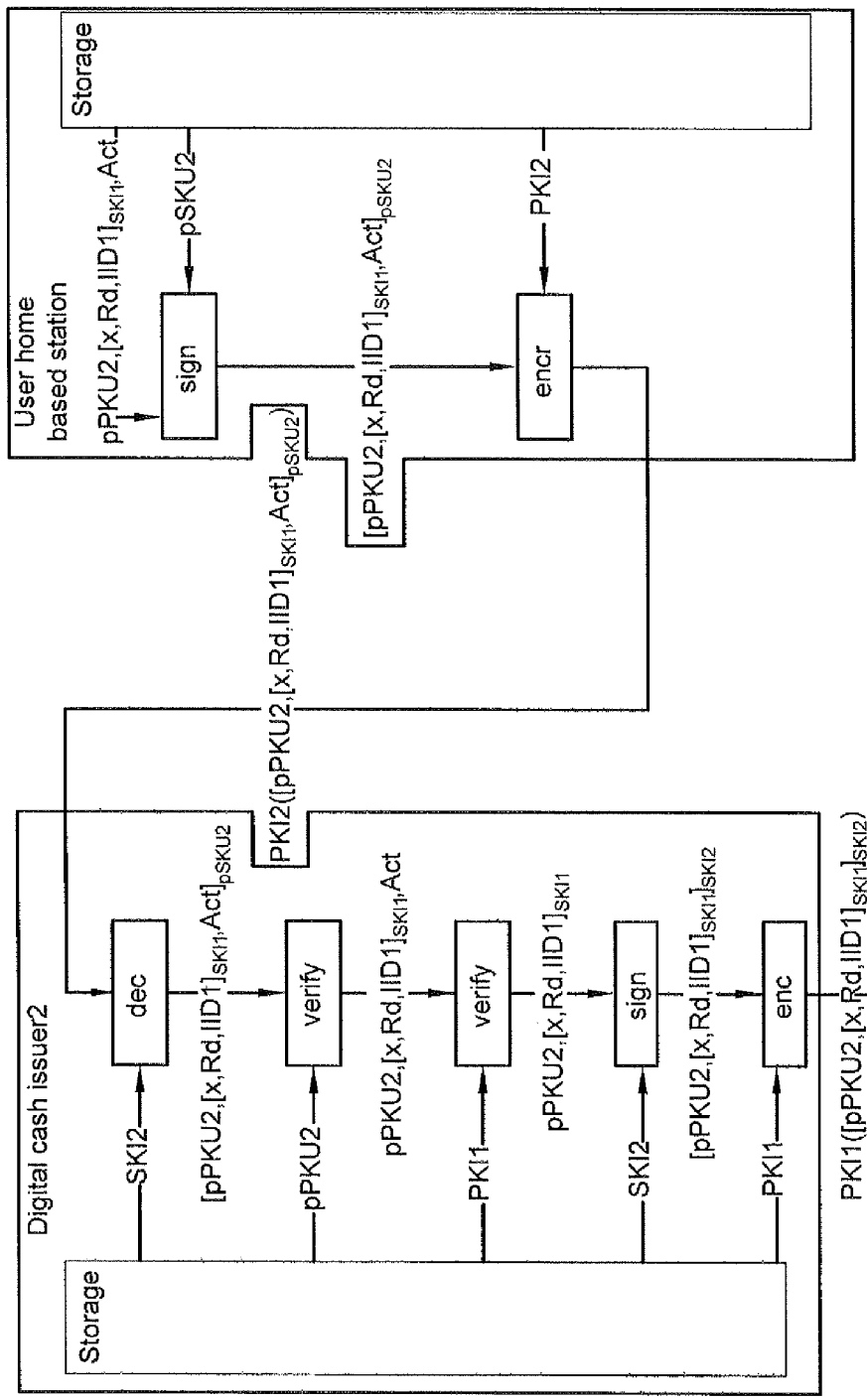
FIG. 50 is an exemplary transferring process, part 2, according to the sixth embodiment.

Referring to FIG. 50, the user's home-based station signs the user's pseudonym public key pPKU2, the digital cash token [x,Rd,IID1]SKI1 and the action to be taken Act by signature generating program using the user's secret pseudonym key pSKU2 then encrypts [pPKU2, [x,Rd,IID1]SKI1, Act]pSKU2 by encryption program using the public key of the digital cash issuer2 PKI2 then sends it to the digital cash issuer2 as request for transfer digital cash.

The digital cash issuer2 receives PKI2([PKU2,[x,Rd, IID1]SKI1,Act]pSKU2), then decrypts the information by decryption program using the digital cash issuer2's secret key and verifies the signature of the user by signature verifying program using the user's pseudonym public key pPKU2, to authenticate the user, if it is valid, the digital cash issuer2 signs the user's pseudonym public key pPKU2 and the digital cash token [x,Rd,IID1]SKI1 by signature generating program using the digital cash issuer2 secret key SKI2 then encrypts [pPKU2,[x,Rd,IID1]SKI1]SKI2 by encryption program using the digital cash issuer1's public key PKI1 then sends PKI1([pPKU2,[x,Rd,IID1]SKI1]SKI2) to the digital cash issuer1

Figure 51:
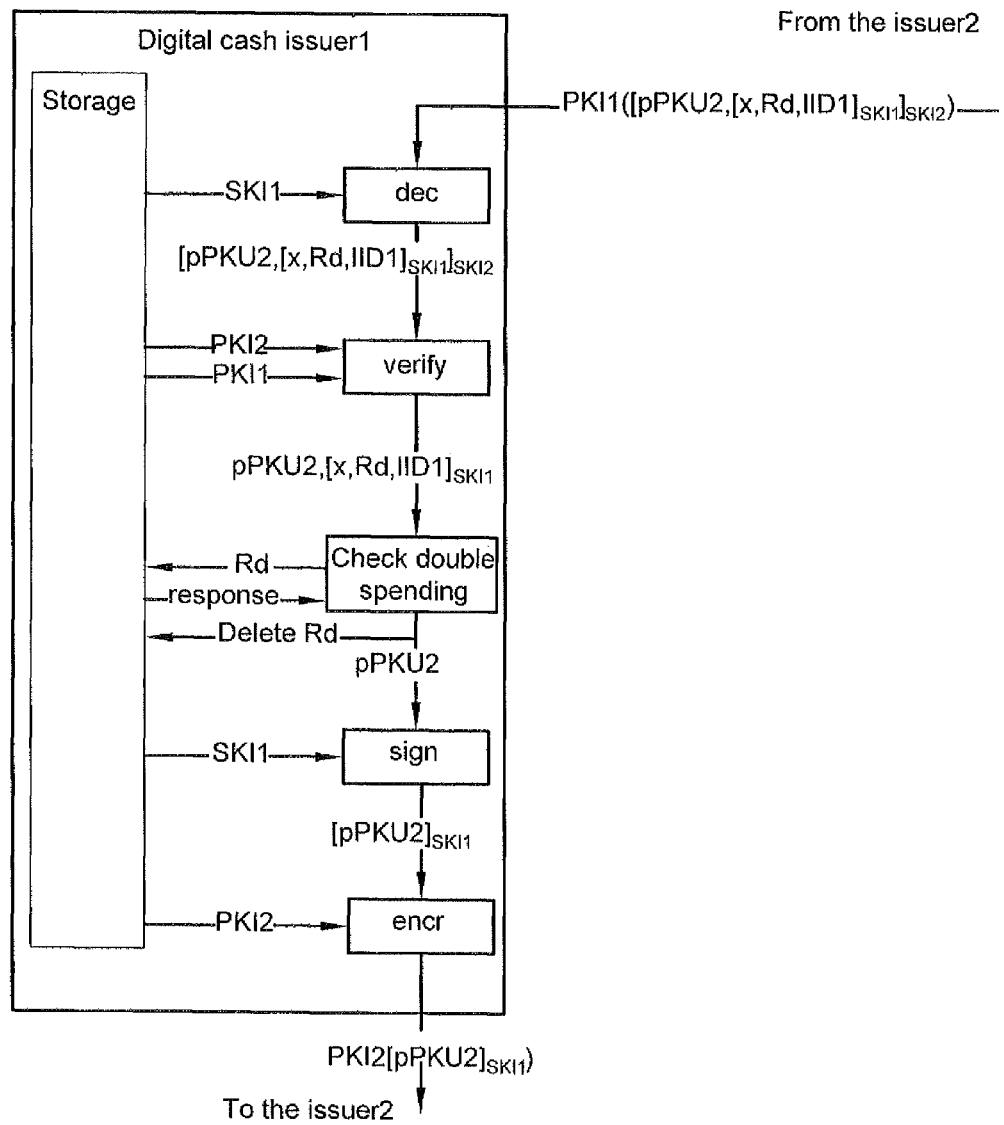
FIG. 51 is an exemplary transferring process, part 3, according to the sixth embodiment.

Referring to FIG. 51, the digital cash issuer1 receives PKI1 ([pPKU2,[x,Rd,IID1]SKI1]SKI2) and decrypts it by decryption program using the digital cash issuer1 secret key SKI1 and verifies the digital cash issuer2 signature by signature verifying program using the digital cash issuer2's public key PKI2 if it is valid, check the Rd if the random number Rd does not exist, this mean there is double spending and the real identity will be revealed by sending the user's pseudonym public key pPKU2 to the certificate authority, if it is not, the digital cash issuer1 signs the pseudonym public key pPKU2 by signature generating program using the digital cash issuer1's secret key SKI1 then encrypts [pPKU2]SKI1 by encryption program using the digital cash issuer2's public key PKI2 and sends it to the digital cash issuer2.

Figure 52:
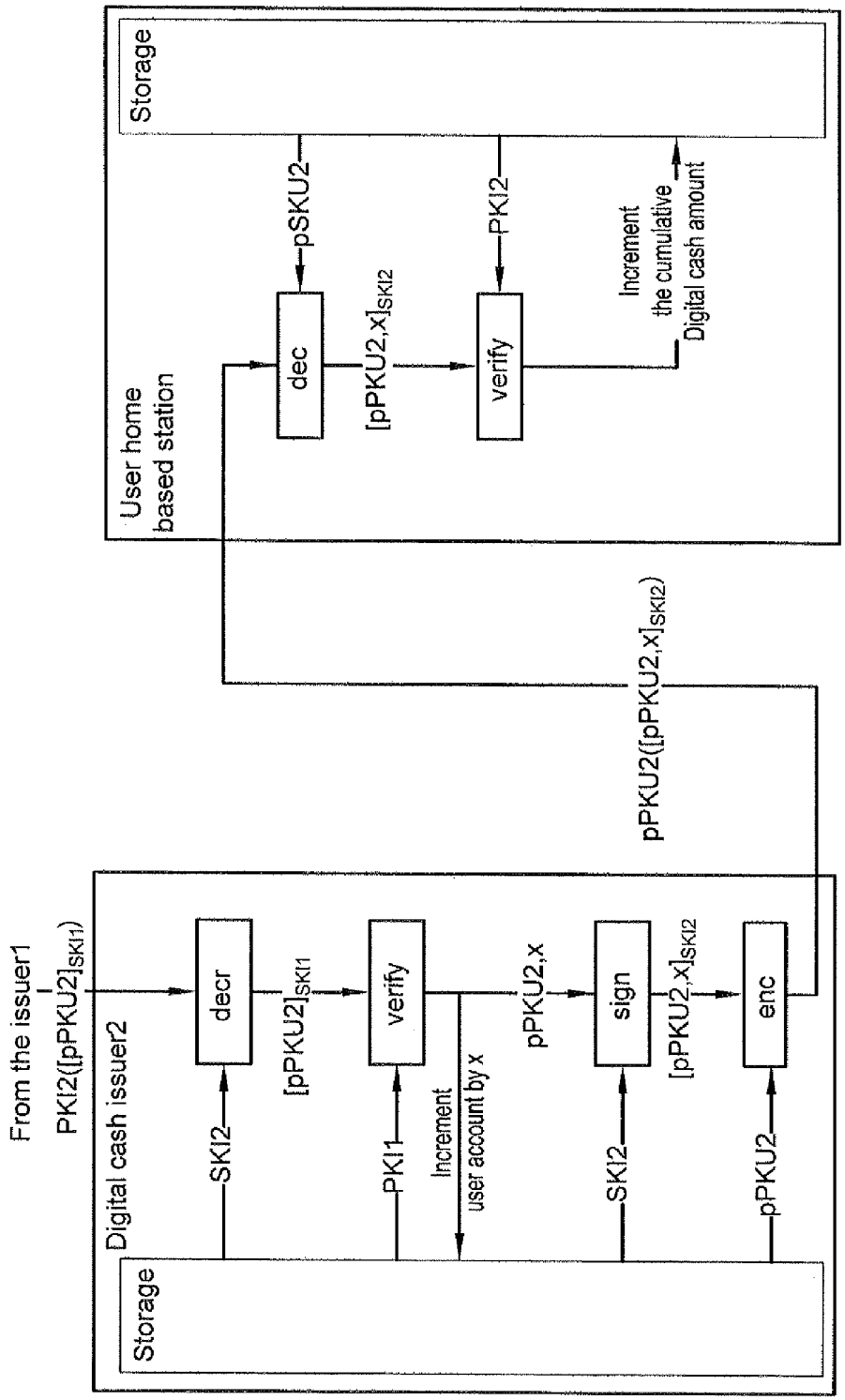
FIG. 52 is an exemplary transferring process, part 4, according to the sixth embodiment.

Referring to FIG. 52, the digital cash issuer2 receives PKI2 ([pPKU2]SKI1) and decrypts it by decryption program using the digital cash issuer2 secret key SKI2 and verifies the digital cash issuer1 signature by signature verifying program using the digital cash issuer1's public key pKI1 if it is valid, the digital cash issuer2 increments the user's virtual account by the amount x of digital cash, then signs the pseudonym public key pPKU2, digital cash amount x, by the signature generating program using the digital cash issuer2's secret key SKI2 then encrypts [pPKU2,x]SKI2 by encryption program using the user's pseudonym public key pPKU2 then sends pPKU2 ([pPKU2,x]SKI2) to the user's home based station.

The user's home-based station receives pPKU2([pPKU2, x]SKI2), then decrypts the information by the decryption program using the user's pseudonym secret key then verifies the validity of the digital cash issuer2 signature by the signature verifying program with the digital cash issuer2's public key PKI2. If the signature is valid, the cumulative amount of digital cash is incremented by the amount of digital cash x then stores the new cumulative amount of digital cash in the storage device by the user.

Figure 53:
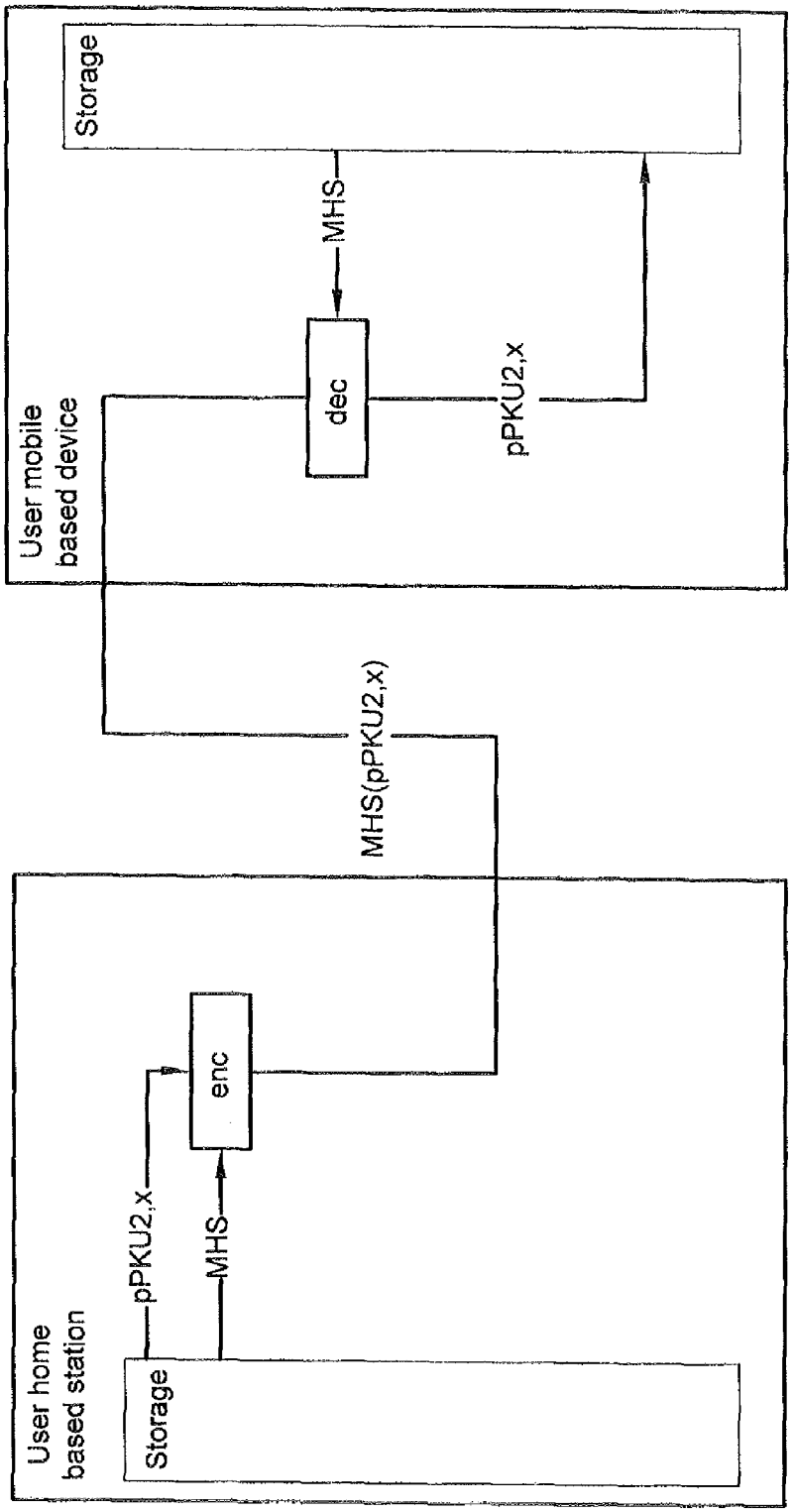
FIG. 53 is an exemplary transferring process, part 5, according to the sixth embodiment.

Referring to FIG. 53, the user's home-based machine encrypts the value of the new cumulative amount of digital cash x and the user's pseudonym public key pPKU2 by encryption program using the mobile-home based shared secret key MHS and sends MHS(pPKU2,x) to the user's mobile based device.

The user's mobile-based device receives the encrypted value of the new cumulative amount of digital cash and the user's pseudonym public key MHS(pPKU2,x) decrypts the information by decryption program using the mobile-home based shared secret key MHS and match the user's pseudonym public key to authenticate the user's home based station if the user's pseudonym public key matches the user stores the new cumulative amount of digital cash in the storage device of the user's mobile based device.

Figure 48:
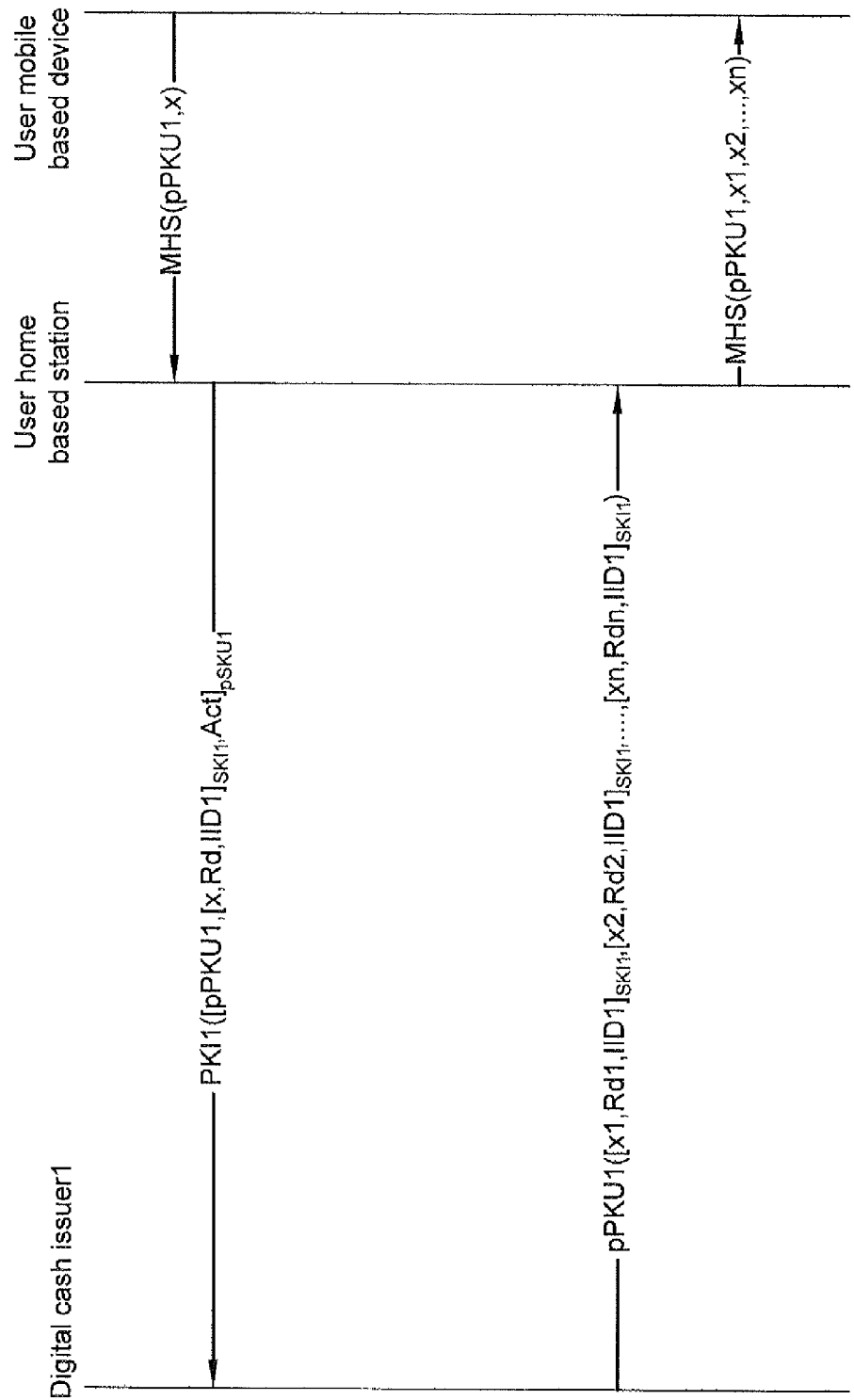
FIG. 48 is an exemplary dividing digital cash token protocol according to the sixth embodiment.
Figure 54:
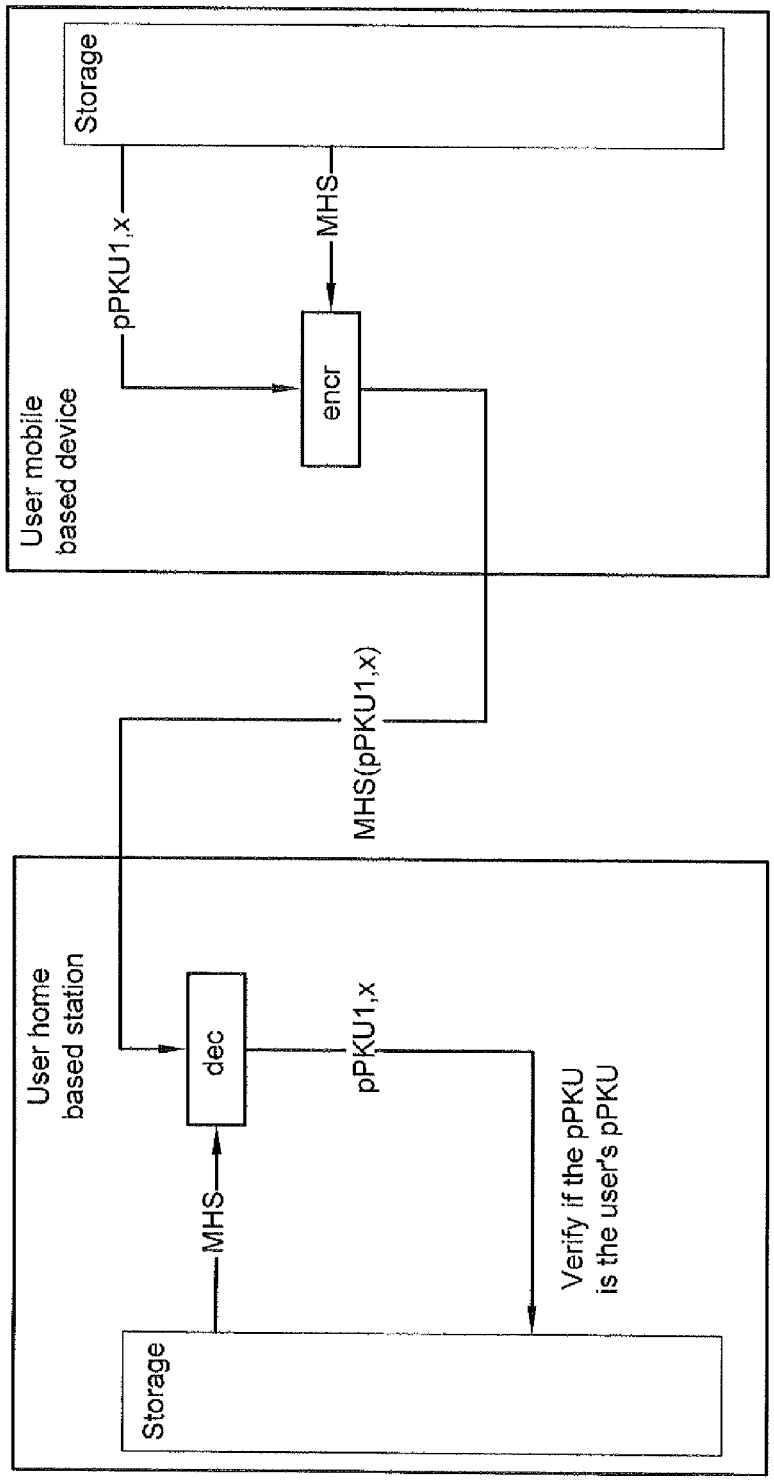
FIG. 54 is an exemplary dividing digital cash token process, part 1, according to the sixth embodiment.

FIG. 48 shows the diagrammatic representation of the dividing digital cash token protocol. Referring to FIG. 54, the user's mobile-based device chooses the value of the digital cash token x and encrypts it also encrypts the user's pseudonym public key pPKU1 by encryption program using the mobile-home based shared secret key MHS and sends MHS (pPKU1,x) to the user's home based station.

The user's home-based station receives MHS(pPKU1,x) and decrypts the information by decryption program using the mobile-home based shared secret key MHS, and match the user's pseudonym public key to authenticate the user's mobile based device, if the user's pseudonym public key is matches, the user's home-based station find the digital cash token that equivalent to the value that is sent by the user's mobile device.

Figure 55:
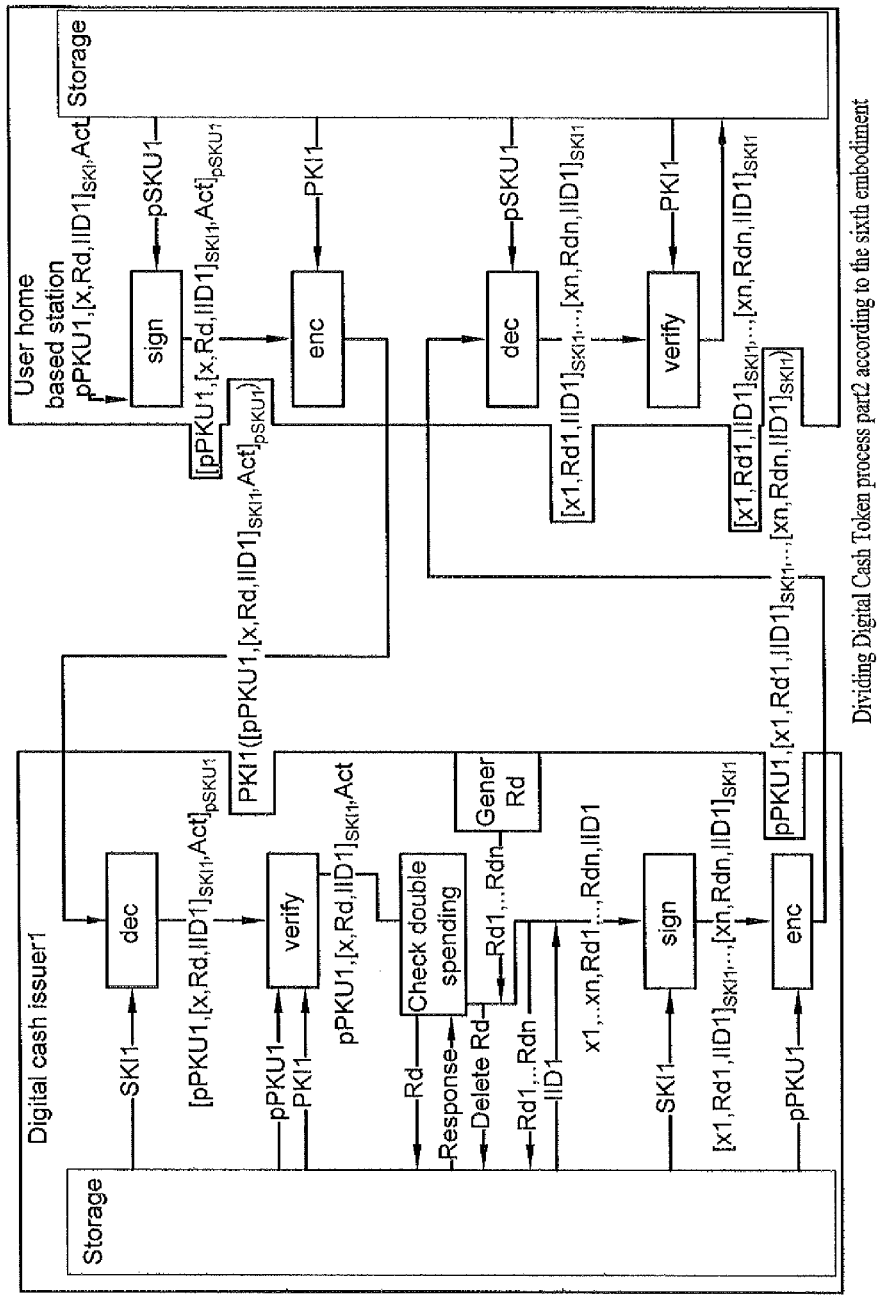
FIG. 55 is an exemplary dividing digital cash token process, part 2, according to the sixth embodiment.

Referring to FIG. 55, the user's home-based station signs the user's pseudonym public key pPKU1, the digital cash token [x,Rd,IID1]SKI1 and the action to be taken Act by signature generating program using the user's secret pseudonym key pSKU1 then encrypts [pPKU1, [x,Rd,IID1]SKI1, Act]pSKU1 by encryption program using the public key of the digital cash issuer1 PKI1 then sends it to the digital cash issuer1 as request for transfer digital cash.

The digital cash issuer1 receives PKI1([pPKU1,[x,Rd, IID1],SKI1,Act]pSKU1), then decrypts the information by decryption program using the digital cash issuer1's secret key and verifies the signature of the user by signature verifying program using the user's pseudonym public key pPKU1, to authenticate the user, if it is valid, the digital cash issuer1 check the Rd if the random number Rd does not exist, this mean there is double spending and the real identity will be revealed by sending the user's pseudonym public key pPKU1 to the certificate authority, if it is not, the digital cash issuer1 deletes the random number Rd and will issues smaller digital cash tokens which contains the following information; (i) digital cash amount, (ii) random number, (iii) the issuer identity, the digital cash issuer1 generates random numbers Rd, Rd2, . . . Rdn and stores them in the storage device, then signs digital cash amounts x1, x2, . . . , xn, random numbers Rd1, Rd2, . . . Rdn and the issuer identity IID1 by signature generating program using the digital cash issuer1's secret key SKI1 and encrypts the information by encryption program using the user's pseudonym public key pPKU1 then sends pPKU1([x1,Rd1,IID1]SKI1, [x2,Rd2,IID1]SKI1, . . . , [xn, Rdn,IID1]SKI1) to the user's home based station.

The user's home-based station receives pPKU([x1,Rd1, IID1]SKI1, [x2,Rd2,IID1]SKI1, . . . , [xn,Rdn,IID1]SKI1), then decrypts the information by the decryption program using the user's pseudonym secret key then verifies the validity of the digital cash issuer1 signature by the signature verifying program with the digital cash issuer1's public key PKI1. If the signature is valid, the user stores the digital cash tokens [x1,Rd1,IID1]SKI1, [x2,Rd2,IID1]SKI1, . . . , [xn, Rdn,IID1]SKI1) in the storage device.

Figure 56:
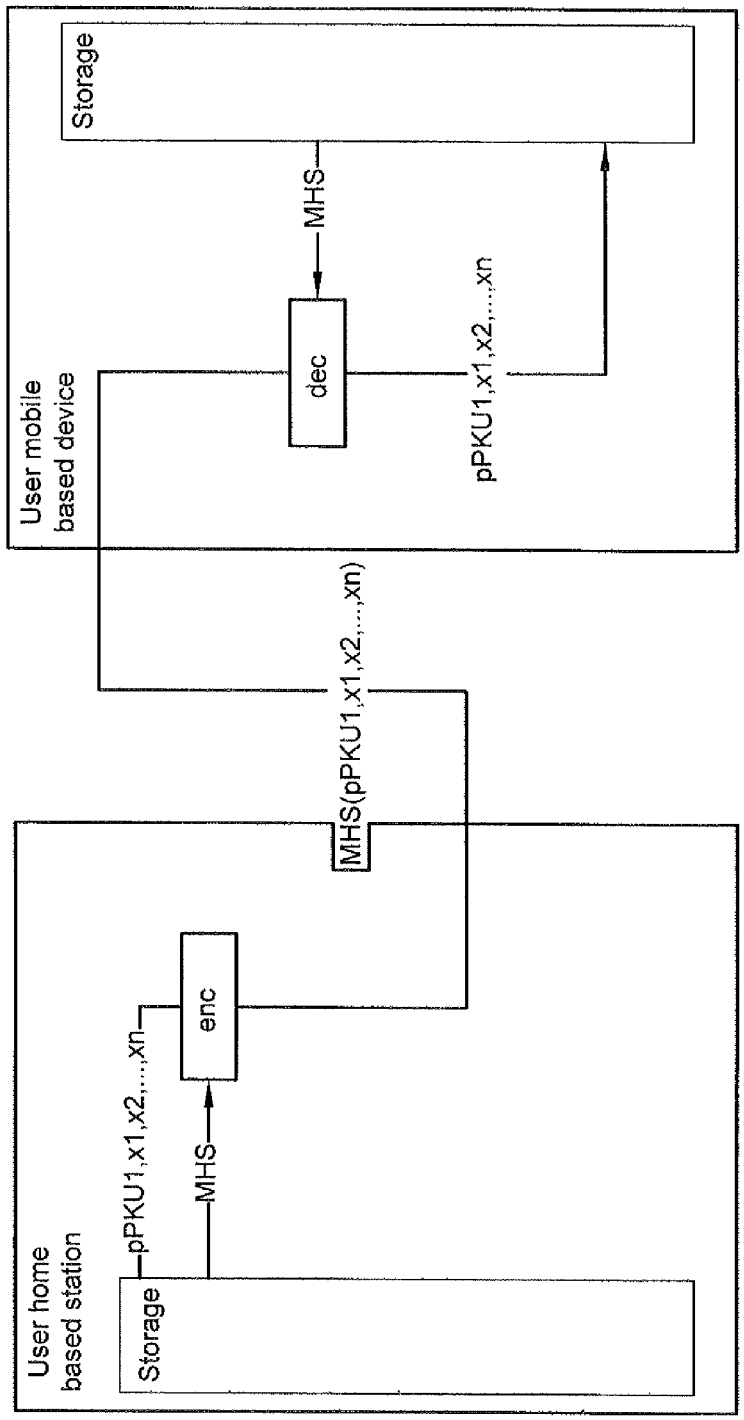
FIG. 56 is an exemplary dividing digital cash token process, part 3, according to the sixth embodiment.

Referring to FIG. 56, the user's home-based machine encrypts the value of the digital cash tokens values x1, x2, . . . xn and the user's pseudonym public key pPKU1 by encryption program using the mobile-home based shared secret key MHS and sends MHS(pPKU1, x1, x2, . . . xn) to the user's mobile based device.

The user's mobile-based device receives the encrypted value of the digital cash tokens and the user's pseudonym public key MHS(pPKU1, x1, x2, . . . xn) decrypts the information by decryption program using the mobile-home based shared secret key MHS and match the user's pseudonym public key to authenticate the user's home based station if the user's pseudonym public key matches the user stores the values of digital cash tokens in the storage device of the user's mobile based device. The user can easily transfer the issued digital cash token to another user who has certified pseudonym public key.

FIG. 42 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 43, the user's mobile-based device chooses the value of the digital cash token x and encrypts it also encrypts the user's pseudonym public key pPKU1 and the price of the good z by encryption program using the mobile-home based shared secret key MHS and sends MHS (pPKU1,z,x) to the user's home-based station.

The user's home-based station receives MHS(pPKU1,z,x) and decrypts the information by decryption program using the mobile-home based shared secret key MHS, and match the user's pseudonym public key to authenticate the user's mobile-based device, if the user's pseudonym public key is matches, the user's home-based station find the digital cash token that equivalent to the value that is sent by the user's mobile device.

Referring to FIG. 44, the user's home-based station encrypts the digital cash token [x,Rd,IID1]SKI1 and the digital cash issuer license [pPKU1]SKI1 by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer1 license PKS([x,Rd,IID1]SKI1, [pPKU1] SKI1) by decryption program using the shop's secret key SKS then verify the signature of the issuer by the signature verifying program with the digital cash issuer1 public key PKI1 if the signatures are valid the shop stores the user's digital cash issuer1 license, the digital cash token and generates a random number Rs by random number generating program and generates the time Ts by the time generating program then encrypt Rs,Ts, the shop identification SID and the price of the good y by encryption program using the user's pseudonym public key pPKU1 and sends pPKU1(Rs,Ts,SID, y) to the user's home based station.

The user's home-based station receives pPKU1(Rs,Ts, SID,y) and decrypts it by decryption program using the user's pseudonym secret key pSKU1 and verify the equality of the price of the good y and z, if they are equal, signs the random number Rs, the time Ts, the shop identification SID and the price of the good y by signature generating program using the user's pseudonym secret key pSKU1 and encrypts the information by encryption program using the public key of the shop PKS then sends PKS([Rs,Ts,SID,y]pSKU1) to the shop.

The shop receives the information PKS([Rs,Ts,SID,u] pSKU1) and decrypts it by decryption program using the shop's secret key SKS and verifies the signature by signature verifying program using the user's pseudonym public key pPKU1 if it is valid the shop stores the challenge and the shop regards the payment as valid.

Referring to FIG. 45, after a period of time, the shop encrypts the information that contains the challenge that was signed by the user [Rs,Ts,SID,y]pSKU1, the digital cash token [x,Rd,IID1]SKI1, and the user's digital cash issuer1 license [pPKU1]SKI1, by encryption program using the public key of the digital cash issuer1 PKI1 and sends the information to the digital cash issuer1.

The digital cash issuer1 decrypts PKI([Rs,Ts,SID,y] pSKU1, [x,Rd,IID1]SKI1, [pPKU1]SKI1) by decryption program using the digital cash issuer1's secret key SKI1 and verifies the signature by the signature verifying program using the digital cash issuer1's public key PKI1 and the user's pseudonym public key pPKU1, if the signatures are valid the issuer1 check the Rd if the random number Rd does not exist, this mean there is double spending and the real identity will be revealed by sending the user's pseudonym public key pPKU1 to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU1 in the storage device.

Referring to FIG. 46, the digital cash issuer1 signs the shop identification SID, and the amount x to be deposited for the shop by the signature generating program with the digital cash issuer1's secret key SKI1 and encrypts the information by encryption program using the public key of the shop's bank PKB, then sends PKB([SID,x]SKI1) to the shop's bank.

The shop's bank receives PKB([SID,x]SKI1) and decrypts the information by decryption program using the secret key SKB and verifies the signature by signature verifying program with the public key of the issuer1 PKI1 if the signature is valid the shop's bank will add x amount of money in the shop account.

It is to be understood that the present invention is not limited to the embodiments described above, but encompasses any and all embodiments within the scope of the following claims.

We claim:

1. A virtual account and token-based digital cash protocol method implementing digital cash for a user having multiple pairs of user keys, the multiple pairs including at least a first pair of keys linked to the real identity of the user, the first pair including a master public key and a master secret key, and the multiple pairs including at least a second pair of keys linked to a pseudonym identity of the user, the second pair including a pseudonym public key and a pseudonym secret key, the multiple pairs of user keys facilitating exchange of information among a network of servers and a user's computing device, the network of servers including a first digital cash issuer server, a certificate authority server, a bank server, and a shop server, the method comprising the steps of:

the user, via the user's computing device, transmitting a request for a license to the certificate authority server;

the certificate authority server issuing the license and transmitting the license to the user's computing device;

the user's computing device forwarding the license to the digital cash issuer server along with a request for registration with the digital cash issuer;

upon successful registration with the digital cash issuer, the user computing device transmitting a request for a digital check to user's bank server for digital spending, the request including a blind digital signature;

the user's bank server processing the request for digital check by verifying valid registration of the user with the digital cash issuer via two-way communication with the digital cash issuer's server, the user's bank utilizing the user's master key pair and the user's blind digital signature to authenticate the request;

the user's bank server transmitting a blinded check to the user's computing device upon successful validation of the user registration with the digital cash issuer;

the user's computing device forwarding the blinded check to the digital cash issuer server, the user's computing device transmitting the at least one pair of pseudonym keys associated with the pseudonym identity of the user to maintain privacy of the user;

the digital cash issuer server, responsive to receiving the blinded check from the user's computing device, transmitting digital cash to the user, the digital cash being a primary virtual account having at least one digital cash token;

the user, via the user's computing device, transmitting a request for payment to the shop's server;

the shop's server forwarding the user's request for payment to the digital cash issuer;

the digital cash issuer's server decrementing the user's virtual account and spending the user's digital cash token therefrom;

the digital cash issuer's server causing an account of the shop maintained by the shop's bank server to increment;

wherein, the request for payment transaction initiated by the user is honored utilizing the digital cash as payment to the shop from the user;

the network of servers and said user's computing device utilizing public-key encryption cryptography for all communication among said network of servers and said user's computing device;

the digital cash issuer server performing verification that no double usage of said digital check is being attempted;

terminating, unblinding, and reporting said transaction if said verification step of claim is unsuccessful;

wherein said step of transmitting the request for a license further comprises the steps of:

said user's computing device generating said pseudonym key pair;

said user's computing device signing said pseudonym public key and a real identification of said user; and transmitting to said certificate of authority said signed pseudonym public key and said real identification of said user as a request for a certified pseudonym public key;

wherein said step of the digital cash issuer server transmitting digital cash to the user further comprises the steps of:

generating and storing on the digital cash issuer server a random number associated with said transaction;

signing a digital cash amount x, the random number Rd, and an issuer identity IID; and transmitting the digital cash amount x, the random number Rd, and the issuer identity IID to said user's computing device for cumulative storage of said digital cash therein;

wherein said step of the user's computing device transmitting a request for payment further comprises the step of utilizing said certified pseudonym public key to maintain privacy in said transaction;

the digital cash issuer server transmitting a digital cash token to said user's computing device, the token exceeding the value of goods being purchased from the shop by the user;

the digital cash issuer server crediting the difference between the value of the digital cash token and the value of the goods being purchased to said user's virtual account under the pseudonym of the user;

the user's computing device forwarding said license to a second digital cash issuer server along with a request for registration with the second digital cash issuer;

the second digital cash issuer opening a second virtual account credited with a second amount of digital cash tokens according to a second blinded check forwarded by said user's computing device to the second digital cash issuer server;

transferring digital cash tokens between said primary virtual account and said second virtual account;

wherein said at least a second pair of keys linked to a pseudonym identity of the user comprises a third pair of keys linked to a pseudonym identity of the user;

the user's computing device sending to said second digital cash issuer an action request with amount to be transferred, the action request being formulated and authenticated using the third pair of keys;

the second cash issuer forwarding said action request with amount to be transferred to said first digital cash issuer;

the first digital cash issuer authenticating said action request with amount to be transferred, and then sending said authenticated action request with amount to be transferred back to said second digital cash issuer; and the second digital cash issuer, upon verification of said first digital cash issuer authentication, incrementing said user's virtual account by the amount of digital cash specified in said action request and causing said new cumulative amount of digital cash to be stored in said user's computing device;

wherein said user's computing device comprises a combination of a fixed user's computing device and a mobile user's computing device, the mobile user's computing device initiating user requested digital cash transactions, the fixed user's computing device mediating communication between the mobile user's computing device and said network of servers.

2. The virtual account and token-based digital cash protocol method according to claim 1, further comprising the step of repeating said step of transmitting the request for a license to the certificate authority server until the user has obtained a desired number of certified pseudonym public keys.

3. The virtual account and token-based digital cash protocol method according to claim 1, further comprising the step of combining crediting and withdrawal from said virtual account using digital cash tokens to divide a digital cash token into several smaller tokens.

4. The virtual account and token-based digital cash protocol method according to claim 3, further comprising the steps of:

said user's computing device sending to said primary digital cash issuer a digital cash token and a divide token action request specifying a number of smaller tokens desired by the user, the action request being formulated and authenticated using said at least a second pair of keys linked to a pseudonym identity of the user;

said first digital cash issuer authenticating said divide token action request;

said first digital cash issuer, upon successful authentication of said divide token action request, registering the smaller tokens and transferring the smaller tokens back to said user's computing device; and said user's computing device, upon authentication of the smaller tokens being transferred from said first digital cash issuer, storing the smaller digital tokens in said user's computing device.

* * * * *